United States Patent
Bryll et al.

(10) Patent No.: US 8,534,113 B2
(45) Date of Patent: Sep. 17, 2013

(54) OPTICAL ABERRATION CORRECTION FOR MACHINE VISION INSPECTION SYSTEMS

(71) Applicant: Mitutoyo Corporation, Kawasaki (JP)

(72) Inventors: Robert K. Bryll, Bothell, WA (US); Mark L. Delaney, Shoreline, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 13/674,917

(22) Filed: Nov. 12, 2012

(65) Prior Publication Data

US 2013/0061650 A1 Mar. 14, 2013

Related U.S. Application Data

(60) Division of application No. 12/264,850, filed on Nov. 4, 2008, now Pat. No. 8,311,311, which is a continuation-in-part of application No. 11/263,002, filed on Oct. 31, 2005, now Pat. No. 7,724,942.

(51) Int. Cl.
*G01B 21/02* (2006.01)

(52) U.S. Cl.
USPC .......................................... 73/1.81

(58) Field of Classification Search
USPC ................... 73/1.81, 1.79, 1.82; 702/86
See application file for complete search history.

(56) References Cited

U.S. PATENT DOCUMENTS

| | | | |
|---|---|---|---|
| 5,151,609 A | 9/1992 | Nakagawa | |
| 5,329,469 A * | 7/1994 | Watanabe | 700/259 |
| 6,076,915 A | 6/2000 | Gast | |
| 6,137,893 A | 10/2000 | Michael | |
| 6,269,197 B1 | 7/2001 | Wallack | |
| 6,420,892 B1 | 7/2002 | Krivy | |
| 6,630,681 B1 | 10/2003 | Kojima | |
| 6,677,565 B1 | 1/2004 | Wahl | |
| 6,703,634 B2 * | 3/2004 | Ono | 250/559.19 |
| 6,778,275 B2 | 8/2004 | Bowes | |
| 6,796,240 B2 | 9/2004 | Sainio | |
| 6,816,625 B2 | 11/2004 | Lewis, Jr. | |
| 6,915,007 B2 * | 7/2005 | Beaty et al. | 382/145 |
| 7,030,351 B2 | 4/2006 | Wasserman | |

(Continued)

OTHER PUBLICATIONS

Pitter, M., et al., "Focus Errors and Their Correction in Microscopic Deformation Analysis Using Correlation," Optics Express 10(23):1361-1367, Nov. 18, 2002.

(Continued)

*Primary Examiner* — J M Saint Surin
(74) *Attorney, Agent, or Firm* — Christensen O'Connor Johnson Kindness PLLC

(57) ABSTRACT

A system and method for correcting surface height measurements for optical aberration is provided. Heights determined by an autofocus tool, which may depend on surface feature angles in a focus region of interest (ROI) and on the ROI location in the field of view, are corrected based on a novel error calibration. Error calibration data includes height corrections for different feature angles in images, and for multiple locations in a field of view. Height corrections are determined by weighting and combining the angle dependent error calibration data, e.g., based on a gradient (edge) angle distribution determined in the ROIs. When Z-heights are determined for multiple ROIs in a field of view, storage of image data from particular images of a global image stack may be efficiently controlled based on determining early in processing whether a particular image is a sufficiently focused "near-peak" focused image or not.

20 Claims, 27 Drawing Sheets

(56) References Cited

U.S. PATENT DOCUMENTS

| | | |
|---|---|---|
| 7,075,633 B2 | 7/2006 | Wegmann |
| 7,119,351 B2 * | 10/2006 | Woelki ........................ 250/559.4 |
| 7,202,938 B2 | 4/2007 | Modderman |
| 7,277,810 B2 * | 10/2007 | Schumacher et al. ........ 702/104 |
| 7,454,053 B2 | 11/2008 | Bryll |
| 7,466,466 B2 * | 12/2008 | Ehrmann et al. ........... 359/205.1 |
| 7,570,795 B2 | 8/2009 | Yu |
| 8,120,780 B2 * | 2/2012 | Bridges et al. ................. 356/482 |
| 8,384,878 B2 * | 2/2013 | Sato ................................ 355/55 |
| 2003/0156297 A1 | 8/2003 | Skunes |
| 2004/0240750 A1 | 12/2004 | Chauville |
| 2005/0133718 A1 | 6/2005 | Miyamoto |
| 2006/0253220 A1 | 11/2006 | McPherson |
| 2006/0289751 A1 | 12/2006 | Watanabe |
| 2007/0112535 A1 | 5/2007 | Bryll |
| 2008/0019683 A1 | 1/2008 | Yu |

OTHER PUBLICATIONS

Suchkov, A. A., et al., "Long-Term and Short-Term Variations of NICMOS Foci," 1997 HST Calibration Workshop, Space Telescope Science Institute, Baltimore, Maryland, Sep. 22-24, 1997, pp. 308-313.

"QVPAK 3D CNC Vision Measuring Machine Operation Guide," Version 2.0, Manual No. 4911GB, Series No. 359, Mitutoyo Corporation & Micro Encoder Inc., Kanagawa, Japan, Sep. 1996, 86 pages.

"QVPAK 3D CNC Vision Measuring Machine User's Guide," Version 7.0, 1st ed., Manual No. 99MCB225A, Series No. 359, Mitutoyo Corporation & Micro Encoder Inc., Kanagawa, Japan, Jan. 2003, 370 pages.

* cited by examiner

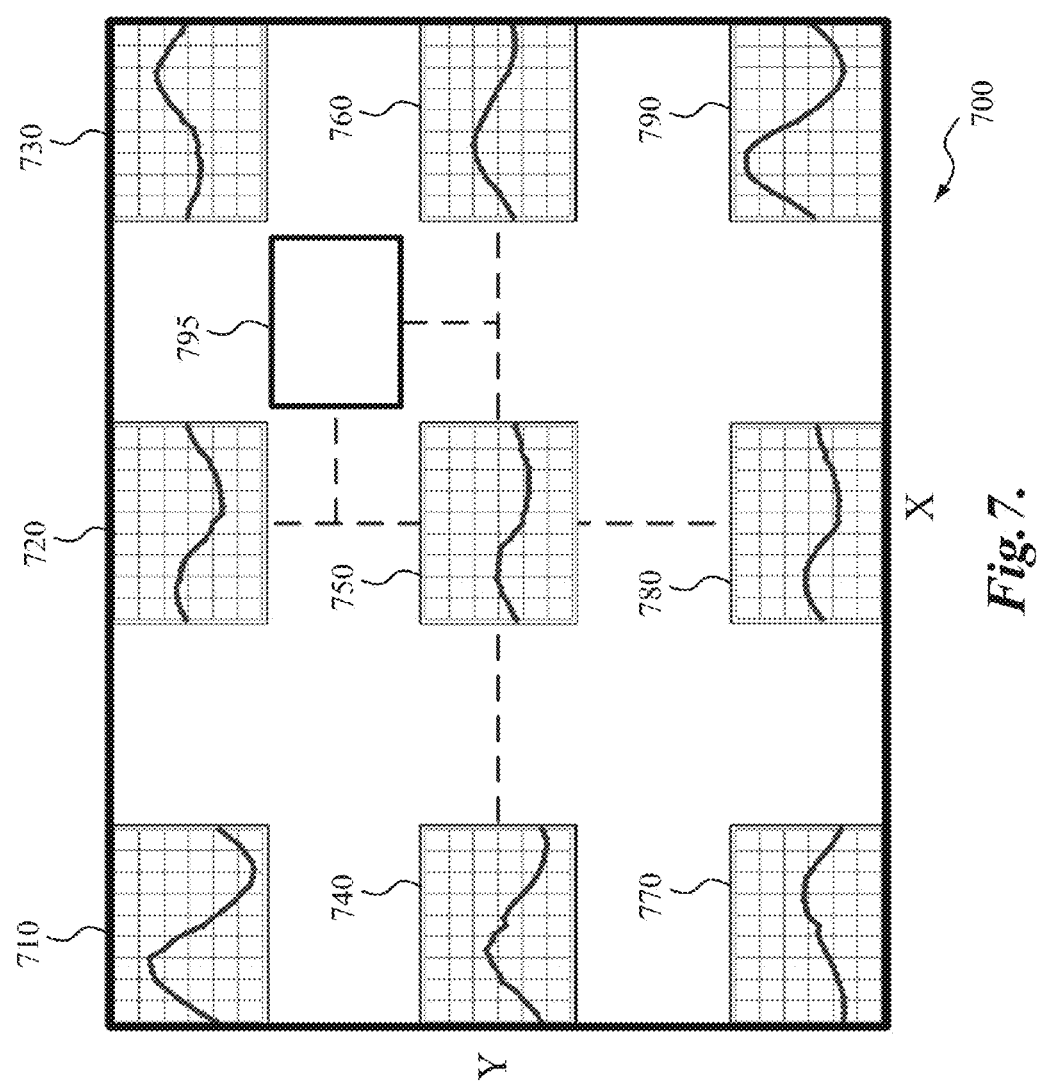

OPTICAL ABERRATION CORRECTION FOR MACHINE VISION INSPECTION SYSTEMS

CROSS-REFERENCE TO RELATED APPLICATIONS

This application is a divisional of U.S. patent application Ser. No. 12/264,850 filed Nov. 4, 2008, which is a continuation-in-part of U.S. patent application Ser. No. 11/263,002, filed Oct. 31, 2005, now U.S. Pat. No. 7,724,942, issued May 25, 2010, both of which are hereby incorporated by reference.

FIELD

The present application relates to machine vision metrology systems, and more particularly, to a high-accuracy optical aberration correction system and method which corrects for errors (e.g., Z-height measurement errors) caused by lens aberrations such as astigmatism.

BACKGROUND

Precision machine vision inspection systems (or "vision systems" in short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image.

Accuracies in the micron range are often desired in such systems. Z-height measurements (along the optical axis of the camera system) are generally derived from a "best focus" position. The level of precision and reliability achieved for Z-height measurements is often less than that achieved for other measurement axes. It would be desirable for a machine vision inspection system to be able to obtain Z-height measurements with improved accuracy and reliability. Furthermore, in certain machine vision inspection systems, an autofocus tool may be utilized to obtain the best focus position and the resulting Z-height measurement. It would be desirable for an autofocus tool to operate automatically with improved accuracy and reliability. The present application is directed to providing a system and method that can overcome the foregoing and other disadvantages.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A high-accuracy optical aberration correction system and method are provided. More specifically, the present application is directed to a high-accuracy optical aberration correction system and method that corrects for focus errors and/or Z-height measurement errors that include a dependence on the orientation of "directional" features in the field of view. Such errors may be caused by lens aberrations such as astigmatism, as well as other features or imperfections of the machine vision optical system. In astigmatism, the focal length of the lens is different for rays crossing the lens in different planes (which corresponds to features—e.g., edges—located at different angles in the field of view). As a result, the focus (Z) position of the lens is different for different (dominant) directions of edges in the field of view.

More specifically, the inventor has found that significant Z-height measurement variations (errors) may occur when measuring a surface or feature that exhibits "directional" features in the field of view. The variations depend on the orientation of the directional features (e.g., the orientation of striated textures, lines, edges, and the like in the field of view.) Such directional surfaces and features are referred to as anisotropic surfaces and features herein. Such variations (errors) that depend on the orientation of directional features are generally referred to as astigmatism errors herein, regardless of the underlying physical processes responsible for the errors.

When the focus position corresponding to a focus region of interest (ROI) in the field of view is characterized as a function of the direction (angle) of edges or texture visible in the focus ROI, and measured surfaces are then characterized in terms of their dominant edge (or gradient) direction, the appropriate Z compensation can be applied for each surface measured in that focus ROI, canceling the focus position error corresponding to the dominant edge direction in the focus ROI. This makes all Z measurements less dependent on, and nominally independent of, the direction of the edges or texture in the focus ROI.

In many cases, the stronger or more apparent are the texture or line edges and/or directionality, the more significant are the astigmatism errors. Furthermore, it has been found that astigmatism errors may vary significantly over the camera field of view. That is, given a uniform directional texture throughout the field of view, a focus operation based on image data from one part of the field of view (from one ROI) may result in a different Z-height measurement than a focus operation based on image data from another part of the field of view (from another ROI). Such ROI-dependent astigmatism errors may be at least partially compensated or corrected by the systems and methods disclosed herein, to improve Z-height measurement accuracy and decrease measurement variability throughout a field of view.

The error correction systems and methods disclosed herein may also generally correct for focus variations and/or Z-height variations that depend on the location of the measurement in the field of view, independent of any astigmatism errors. For example, such variations may be due to lens field curvature, due to the imperfect perpendicularity of the camera CCD to the optical axis of the system, due to curvature of the CCD, due to the imperfect perpendicularity of the optical axis of the vision system to the vision system stage, and similar error sources that may cause the best focus position to vary over the field of view. Such errors are generally collectively referred to as static optical errors herein, regardless of the underlying physical processes responsible for the errors.

Static optical errors result in varying Z-height measurements for a workpiece surface having a static height, when it is measured at different locations in the camera field of view, even for surfaces or patterns that do not exhibit directional features. Such "non-directional" surfaces and patterns are referred to as isotropic surfaces and patterns herein.

In accordance with one aspect of the application, astigmatism errors are characterized using a directional pattern that is oriented at different respective calibration angles as the basis for respective Z-height measurements that include respective astigmatism error components. Such Z-height measurements of directional patterns are also referred to as anisotropic measurements herein.

It will be appreciated that anisotropic measurements generally include both an astigmatism error component and a static optical error component, that is, combined errors. Such combined errors in an anisotropic measurement are referred to as anisotropic errors herein. In accordance with one aspect of the application, anisotropic errors may be determined, and the resulting anisotropic error calibration data may be stored for compensating or correcting the anisotropic error of future Z-height measurements.

In accordance with a further aspect of the application, the difference between a Z-height measurement using a directional pattern (an anisotropic measurement) and an isotropic Z-height measurement (described further below) at the same location in the field of view may determine the astigmatism error component or astigmatism error calibration data at that location. The resulting astigmatism error calibration data may be stored for compensating or correcting the astigmatism error component of future Z-height measurements.

In accordance with a further aspect of the application, anisotropic errors and/or astigmatism errors are characterized at a plurality of locations within the field of view. The resulting calibration data is stored for compensating or correcting future Z-height measurement errors, including basing the correction on the location within the field of view that provides the data used to determine a Z-height measurement. In various embodiments, a plurality of anisotropic measurements and/or anisotropic errors and/or astigmatism errors may be determined corresponding to precisely known positions in the field of view, and interpolation can then be done to estimate anisotropic measurements and/or anisotropic errors and/or astigmatism errors associated with any particular location in the field of view.

In accordance with a further aspect of the application, anisotropic errors and/or astigmatism errors are characterized for each particular lens or lens combination (or magnification) used in a machine vision system. The resulting calibration data is stored for compensating or correcting future Z-height measurement errors when using that particular lens or lens combination (or magnification).

In accordance with another aspect of the application, a calibration target may be utilized for obtaining the calibration data. A calibration target may consist of a plurality of respective anisotropic target elements, each of which includes a directional pattern oriented in a different respective angular direction. In one embodiment the respective anisotropic target elements may provide different respective angular directions that cover 0°-180° in discrete angular steps. The step size can vary depending on the desired granularity of the calibration data. As examples, the granularity may correspond to a step size of 5°, or 7.5°, or 15°, etc.

In accordance with another aspect of the application, static optical errors may be characterized using Z-height measurement data provided using the calibration target. In one embodiment, the static optical errors are characterized based on averaging a series of measurements of the anisotropic target elements, to provide a Z-height measurement wherein the astigmatism error component(s) have, in effect, been removed by the averaging. Such averaging provides a first type of isotropic or non-directional measurement usable to determine static optical errors.

In accordance with a further aspect of the application, static optical errors are characterized at a plurality of locations within the field of view. The resulting calibration data is stored for compensating or correcting future Z-height measurement errors, including basing the correction on the location within the field of view that provides the data used to determine the static optical errors. In one embodiment, a plurality of isotropic measurements and/or static optical errors may be determined corresponding to precisely known positions in the field of view, and interpolation can then be done to estimate isotropic measurements and/or static optical errors associated with any particular location in the field of view.

In accordance with another aspect of the application, isotropic target elements, that is, target elements consisting of a pattern that lacks "directionality", may be provided on the calibration target. Since astigmatism errors are minimized or eliminated when measuring isotropic patterns, by focusing on one of these patterns, a Z-height measurement may be obtained that nominally includes only static optical errors, if any. Such isotropic target element measurements provide a second type of isotropic or non-directional measurement usable to determine static optical errors. A plurality of isotropic target elements may be provided, and since their positions on the calibration target are known precisely, interpolation can be done to estimate isotropic measurements and/or static optical errors associated with any particular location on the calibration target.

In accordance with another aspect of the application, as outlined in greater detail below, it is possible to determine a "true" or reference Z-height measurement based on a set of isotropic measurements. That is, a "true" or reference Z-height measurement may be estimated, that nominally includes no static optical errors and no astigmatism errors. The difference between a "true" or reference Z-height estimate and an anisotropic Z-height measurement at the same location determines an anisotropic error or anisotropic error calibration data at that location. The difference between a "true" or reference Z-height estimate and an isotropic Z-height measurement at the same location determines a static optical error component or static optical error calibration data at that location. Static optical errors may also be referred to as "isotropic errors" herein.

In accordance with another aspect of the application, a calibration target may consist of multiple differently-sized sets of respective target elements. Within each set, each of the respective target elements may be designed to be slightly larger than the field of view at the lowest magnification for which that particular set of target elements is designed. In addition, within each set, the density or spacing of any anisotropic features within the target element patterns (and isotropic features, if included) may be selected to provide good calibration with the magnification(s) that it is designed for, for example, the features should be "thick" enough in comparison to the camera pixel spacing so as to prevent aliasing, and there should be enough features in the field of view (e.g., lines and spaces, texture "scratches", or the like) so as to provide a "strong" pattern in the field of view, particularly for the anisotropic target elements.

In accordance with another aspect of the application, after calibration data is obtained, during a subsequent Z-height measurement for a particular region of interest (ROI) within the field of view (e.g., by using an autofocus tool) the Z-height measurement is corrected by interpolating or extrapolating the calibration data to obtain a correction value that corresponds to that particular location of the region of interest. A first part of this process may include reconstructing or augmenting existing calibration error correction data, to estimate values corresponding to the particular position of an autofocus tool region of interest in the field of view. The reconstruction or estimation may be performed by interpolation (e.g., bilinear, biquadratic, bicubic, etc.) of the error correction data captured at discrete locations within the field of view during the calibration process. A second part of this process may include using the reconstructed or estimated error correction data to compute the Z correction to the initial or raw Z position determined by the autofocus routine.

In accordance with a further aspect of the application, after calibration data is obtained according to this application, during a subsequent Z-height measurement for a particular region of interest (ROI) within the field of view, for example based on an autofocus tool, a Z correction is computed and applied according to calibration error correction data weighted according to one or more characterizations or weighting factors that depend on the strength and/or orientation of features present in the region of interest. The characterization of the strength and/or orientation of features present in the region of interest in an image, regardless of its form, may be generically referred to as an orientation angle content characteristic(s), or alternatively as an angular content characteristic(s), or the like. In one embodiment, the strength and/or orientation of features present in the region of interest is determined in comparison to the strength and/or orientation of features of the anisotropic target elements used to determine the relevant calibration data.

In accordance with a further aspect of the application, in various embodiments, a histogram of gradient (edge) directions determined in the region of interest may be used to determine one or more "direction" weighting or interpolation factors. In various embodiments, a histogram of gradient (edge) strength determined in the region of interest may be used to determine one or more "strength" weighting factors.

In accordance with another aspect of the application, a histogram may be formed by computing both gradient magnitudes and directions (or rather directions that are in one embodiment perpendicular to gradient directions in order to make them consistent with the edge direction data in a set of error calibration data). The gradient computations may be performed corresponding to each pixel in an autofocus tool region of interest. The pixels for which gradient magnitudes are smaller than a certain (low) noise threshold may be discarded from consideration in embodiments where it is desirable to deal only with relatively "strong" edges, as compared to image noise. If the image noise is significant, the region of interest can be additionally smoothed with a spatially-small averaging filter before the gradient magnitude and direction computation. A histogram of the gradient directions may then be created for all the remaining "qualified" pixels (that is, the pixels for which the gradient magnitude exceeds the appropriate noise threshold), and the calibration data weighted accordingly.

According to various aspects of the application outlined above, the calibration data may distinguish static optical errors from astigmatism errors. In such a case, the static optical errors may be compensated directly from the static optical error calibration data, without the need for additional computations related to weighting factors or the like, when a measurement region of interest lacks significant directional content.

In various embodiments, to determine the anisotropic error and/or static optical error at various locations in the field of view, a realistic generic model is established for the calibration target substrate shape, based on analysis or experiment. For example, it may be assumed to be planar and potentially tilted relative to the optical system axis. Alternatively, it may also be assumed to have curvature along one or more directions. Depending on the model, straight lines, curved lines, or a plane, or a curved surface, may be fit to a plurality of isotropic Z-height measurements, as described in greater detail below. The resulting "best fit" substrate location may be used as an estimate of the reference or true Z-height measurement value at locations throughout its range of applicability. The difference between the anisotropic Z-height measurement and the true Z-height value at various locations may be used to determine the anisotropic errors and associated anisotropic error calibration data for the various locations. The difference between the isotropic Z-height measurement and the true Z-height value at various locations may be used to determine the static optical errors and associated static optical error calibration data for the various locations.

In accordance with another aspect of the application, the error correction systems and methods of the application may be applied to multiple primary regions of interest (e.g., a primary regions of interest may be a comprehensive region of interest bounded by a video tool region of interest boundary in a graphical user interface), and/or a plurality of subregions associated with points within a particular primary region of interest. Such may be required when certain types of autofocus tools are utilized (e.g., multi-region or multi-point autofocus tools.) A multi-region autofocus tool may perform operations associated with providing respective Z-focus positions and/or height coordinates for multiple respective primary focus regions of interest for the tool. A multi-point autofocus tool may perform analogous operations associated with providing respective Z-focus positions or height values for multiple respective secondary focus regions or sub-regions of interest, which may be associated with points located within the primary region of interest for the tool. Multi-region and multi-point autofocus tools may provide at least surface-type autofocus operations as a basis for Z height measurements.

In comparison to analyzing only a single region of interest (e.g., for an individual autofocus tool), it should be appreciated that various difficulties may arise with regard to analyzing the Z height of multiple regions and/or subregions of interest with high throughput (e.g., for multi-region or multi-point autofocus tools), and particularly when considering memory and/or processing operation required for correcting each Z height for anisotropic errors according to this application. For example, it should be appreciated that when multiple regions of interest are being analyzed there is no longer a single "in focus" position or "best focus" Z-height that universally applies to each region and/or sub-region of interest, since each of the multiple regions and/or sub-regions of interest can have different heights. Furthermore, it may be impractical to move the workpiece stage or camera repeatedly to provide separate sets of autofocus images (also referred to as an autofocus image stack), and/or separate final "best focused" autofocus images for each region and/or sub-region of interest, because providing the necessary mechanical motion is generally the most time-consuming (throughput limiting) aspect of an autofocus height determination. This could cause a speed bottleneck and the toll on inspection throughput may be prohibitive, particularly if there are a large number of regions and/or sub-regions of interest to be analyzed. Furthermore, in some embodiments or applications, the amount of memory and/or hardware operations required for analyzing multiple regions and/or sub-regions of interest may become impractical, or at least undesirably slow, in relation to reasonable throughput expectations and real-time inspection operations.

To avoid mechanical motion bottlenecks in various embodiments, it may be advantageous for a single global image stack (also referred to simply as a single, full, or global image stack, or the like) to be acquired and used as the basis for an entire multi-region and/or multi-subregion (e.g., multi-point tool subregions) height determination process, as described in greater detail below. In addition, it may be advantageous in various embodiments to base the orientation angle analysis operations outlined herein (in relation to respective Z height corrections) on respective image portions available within the global image stack, rather than on portions of additional "best possible" images acquired separately at the best possible focus position (e.g., separate images acquired at the determined Z-height or focus curve peak position).

With regard to determining respective Z height corrections based on respective image portions available within the global image stack, it should be appreciated that while a best possible focus image (e.g., one acquired at a focus curve peak) may be used allow the most accurate or repeatable determination of the orientation angle content characteristic that is used as the basis for Z height correction, in some embodiments or applications the orientation angle content characteristic may be determined or estimated with sufficient accuracy based on any sufficiently focused image. In some embodiments, a suitable sufficiently focused image portion may be insured by selecting from the global image stack an image portion that has a focus metric (e.g., an image contrast or sharpness metric of any known type, or any other suitable type of focus characterization) that exceeds a threshold value known to correspond to relatively good focus. In other embodiments, a sufficiently focused image portion may be insured by selecting from the global image stack the image portion that has the best focus metric available for that portion in comparison to other images in the image stack. In other embodiments, a sufficiently focused image portion may be insured by selecting the image portion included in an image of the image stack that is sufficiently close, or closest, to an uncorrected best focus Z height that has been determined for that portion. These alternative embodiments are described in greater detail below. In any case, it will be appreciated that any of the aforementioned methods may provide an angular content characteristic based on a region or subregion of interest from an image corresponding to a Z height that is sufficiently proximate to the best focus uncorrected Z-height for that region of interest, such that it may provide a sufficiently accurate Z height correction in various embodiments or applications according to this application. In various embodiments, the aforementioned operations may be associated with a near-peak operations control element (e.g., a circuit or routine) that identifies a sufficiently focused images corresponding to respective regions or subregions of interest. In some embodiments the near-peak operations control element may also be associated with determining the corresponding orientation angle content characteristic and/or Z height correction.

The near-peak operations control element may also be associated with certain conditional memory management operations, in some embodiments. Conditional memory management operations based on "near-peak" data and/or operations may be particularly advantageous for conserving memory in embodiments or applications such as those requiring large-region multipoint auto focus tools, and/or large megapixel camera images, and/or large autofocus and/or height-variation scanning ranges, and/or a large number of high-resolution (e.g., micron level) autofocus and/or height-variation scanning increments. Generally speaking, only "near-peak" data (that is, image data from images acquired at a height approximately corresponding to a focus curve peak) is needed in relation to Z height correction operations. In various embodiments, the near-peak operations control element may discriminate such near-peak data from unneeded data, and eliminate the unneeded data and/or related operations. In other words, certain data storage and/or processing may be suppressed or eliminated by the near-peak data control element, under the condition that the data is not "near-peak" data. In various embodiments, near-peak data may be discriminated from not near-peak data based on respective focus characterizations or focus metrics for a particular region or subregion of interest in respective images of the image stack. Various uses of focus characterization data to govern conditional operations are described below. However, it should be appreciated that, in various embodiments, some or all of the determined focus characterizations or metrics may also be used as data points that define a "focus curve" for a corresponding region or subregion of interest. As known to one skilled in the art, a focus curve may be defined corresponding to series of data points that each comprise a focus characterization or focus metric value (the dependent variable) determined for a region of interest in an image acquired at a corresponding known height (the independent variable). In general, the focus characterization or focus metric may be an image contrast or sharpness metric of any known type, or any other suitable type of focus characterization (e.g., a fuzzy logic type characterization, or the like). The interpolated peak of the focus curve (e.g., the peak of a curve fit to the focus curve data) may then be determined according to known autofocus and/or height determination techniques. As described elsewhere herein, such an interpolated peak of a focus curve may correspond to an uncorrected Z height measurement, which is combined with the corresponding anisotropic error correction to provide a corresponding corrected Z height according to this application.

Regarding the use of focus characterization data to govern certain conditional operations according to one aspect of this application, in various embodiments, conditional data storage and/or processing may be based on whether a focus characterization for a current region or subregion of interest that is analyzed for a "current" image of a global image stack is better than (e.g., nearer to a focus curve peak) a previously determined focus characterization for that region or subregion of interest in a "previous" image. In some embodiments, the conditional data storage and/or processing operations may also, or alternatively, be contingent on whether the focus characterization for a current region or subregion of interest exceeds a default or threshold value that is indicative of sufficiently good focus.

In some embodiments, if the current focus characterization is better than a previously determined "running best" focus characterization, (e.g., it has focus metric value that is greater than a previously determined "running best" focus metric value), then it is stored or otherwise identified as the new "running best" focus characterization for that region or subregion of interest. In some embodiments, after the entire global image stack has been analyzed for a region or subregion of interest, the final running best focus metric may be used to identify the best focused image in the image stack (for the corresponding region or subregion of interest), which may then be used to determine the corresponding orientation angle content characteristic that is used for determining the corresponding Z height correction. In other embodiments, when a new "running best" focus characterization is determined corresponding to a particular region or subregion in a particular image of the stack, that condition may trigger the storage of the corresponding portion of that particular image for potential later use for Z height correction. In such embodiments, the stored new "running best" data may supersede similar previously stored running best data, which may then be deleted to conserve memory.

In some embodiments, when a new "running best" focus characterization is determined corresponding to a particular region or subregion in a particular image that condition may also, or alternatively, trigger a determination and storage of the angular content characteristic and/or the resulting Z-height correction corresponding to that portion of that particular image. In some embodiments, when the angular content characteristic, or Z height correction corresponding to a new running best focus characterization is stored, the stored data may supersede similar previously stored running best data, which may then be deleted to conserve memory. It will be appreciated that when a running best angular content characteristic is stored or otherwise identified as outlined above, in various different embodiments this may either supplement, supersede, or replace one or more of the operations previously outlined above in relation to storing or otherwise identifying the corresponding "running best" image data. That is, since a running best orientation angle content characteristic is sufficient to provide a corresponding anisotropic error correction according to this application, the corresponding underlying image data may be deleted from memory at any advantageous time during processing. Similarly, when a new "running best" anisotropic error correction is stored, it may replace or supersede previously stored orientation angle content characteristic and/or previously stored anisotropic error correction, which may then be deleted at any advantageous time during processing, to conserve memory. In some embodiments, after the entire image stack has been analyzed for a region or subregion of interest, the resulting "running best" anisotropic error correction is immediately available for use in determining the corresponding corrected Z height for that region or subregion of interest.

It will be appreciated that each of the conditional operation methods outlined above, in comparison to prior art methods, may result in significantly reduced memory and storage requirements as images are acquired and processed during autofocus Z height determining operations. That is, image data (e.g., region or subregion data in various images in an image stack) may be suppressed or deleted at the earliest advantageous time (e.g., sequentially, during analysis), rather than acquired and retained until an entire image stack is completely analyzed. In one particular example embodiment, for non-overlapping regions or subregions of interest, the total amount of simultaneously stored information may be small enough to not exceed the size of a single image. In addition, the conditional operation methods outlined above may also significantly reduce processing time and increase throughput for Z height determining operations, particularly when providing anisotropic error correction for Z heights in multi-point auto focus tools with a large number of measurement subregions. Furthermore, the methods in certain embodiments integrate well with current autofocus tools in certain existing products.

In various embodiments, a routine is provided for defining a set of regions of interest ROI(k) to be measured and producing corrected Z-height measurements. The routine begins with the defining of a set of selected regions or subregions of interest ROI(k), for k=1 to P, for which Z-heights are to be determined. It will be appreciated that as described above the regions of interest ROI(k) may comprise overall or primary regions of interest (e.g., in the case of the multi-region autofocus tool) or may comprise secondary or sub-regions of interest (e.g., in the case of the multi-point autofocus tool.) An image stack set is then defined of images(i), for i=1 to N, that encompass the set of regions of interest ROI(k) and that span the Z-heights that are to be determined, and the image stack set is then acquired. Focus metrics (k,i) are determined for the regions or subregions of interest ROI(k) in the images(i). In one embodiment the focus metrics may include a sharpness measure for the regions of interest ROI(k) in the images(i). Best focus uncorrected Z-heights are determined for the regions of interest ROI(k), and angular content characteristics are determined for the regions of interest ROI(k) for images corresponding to the Z-heights proximate to the best focus uncorrected Z-heights for the regions of interest ROI(k). In one embodiment, the angular content characteristic may be determined based on a gradient (edge) angle histogram. Z-height correction values are determined for the regions of interest ROI(k), based on the angular content characteristics for the regions of interest ROI(k), and corrected Z-heights are determined for the regions of interest ROI(k) based on the Z-height correction values and the best focus uncorrected Z-heights for the regions of interest ROI(k). The routine may also include one or more of the data analysis and/or storage methods outlined previously and described in greater detail below.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a diagram illustrating different locations within a field of view of a lens and different anisotropic error calibration data results that may occur at the different locations for a directional pattern rotating in a [0,180°] interval;

DETAILED DESCRIPTION OF THE PREFERRED EMBODIMENT

Figure 1:
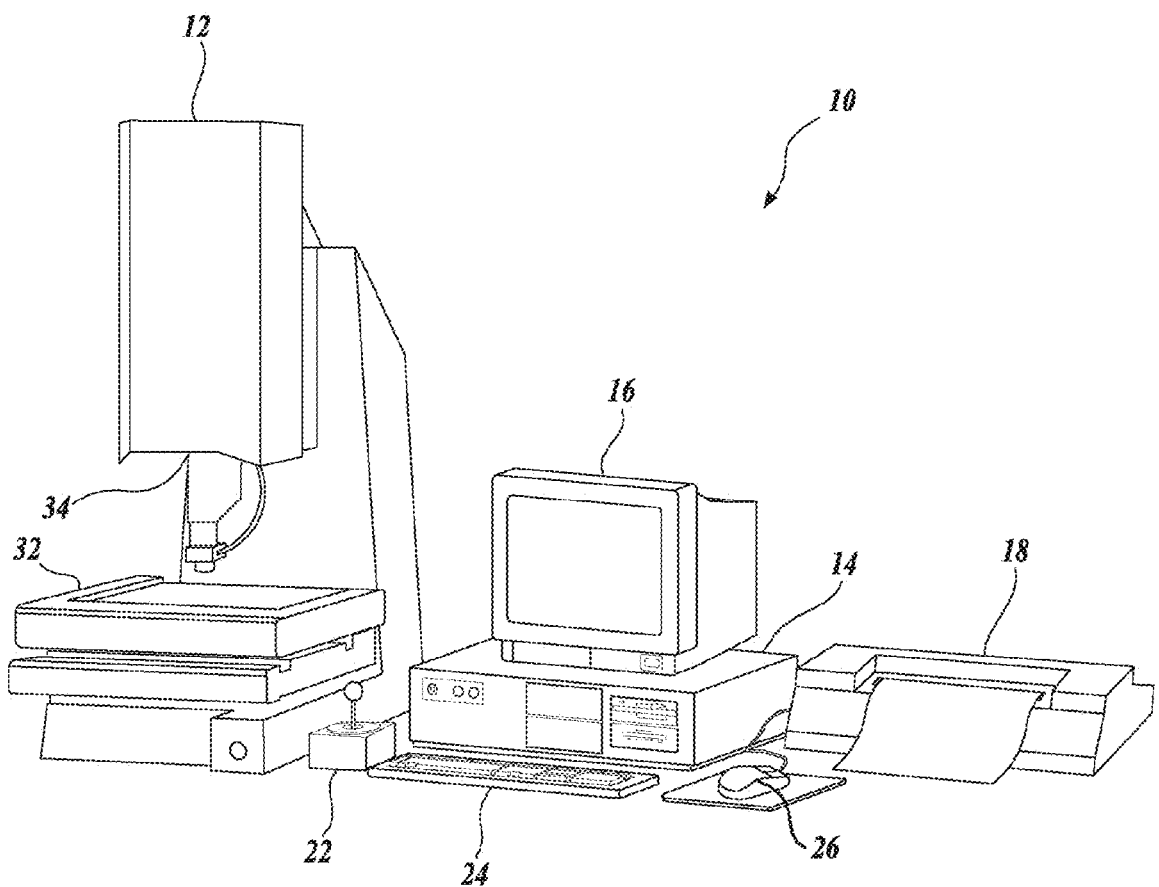
FIG. 1 is a diagram showing various typical components of a general-purpose machine vision inspection system.

FIG. 1 is a block diagram of one exemplary machine vision inspection system 10 in accordance with the present application. The machine vision inspection system 10 includes a vision measuring machine 12 that is operably connected to exchange data and control signals with a controlling computer system 14. The controlling computer system 14 is further operably connected to exchange data and control signals with a monitor 16, a printer 18, a joystick 22, a keyboard 24, and a mouse 26. The monitor or display 16, may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in U.S. patent application Ser. No. 10/978,227, which is incorporated herein by reference.

Figure 2:
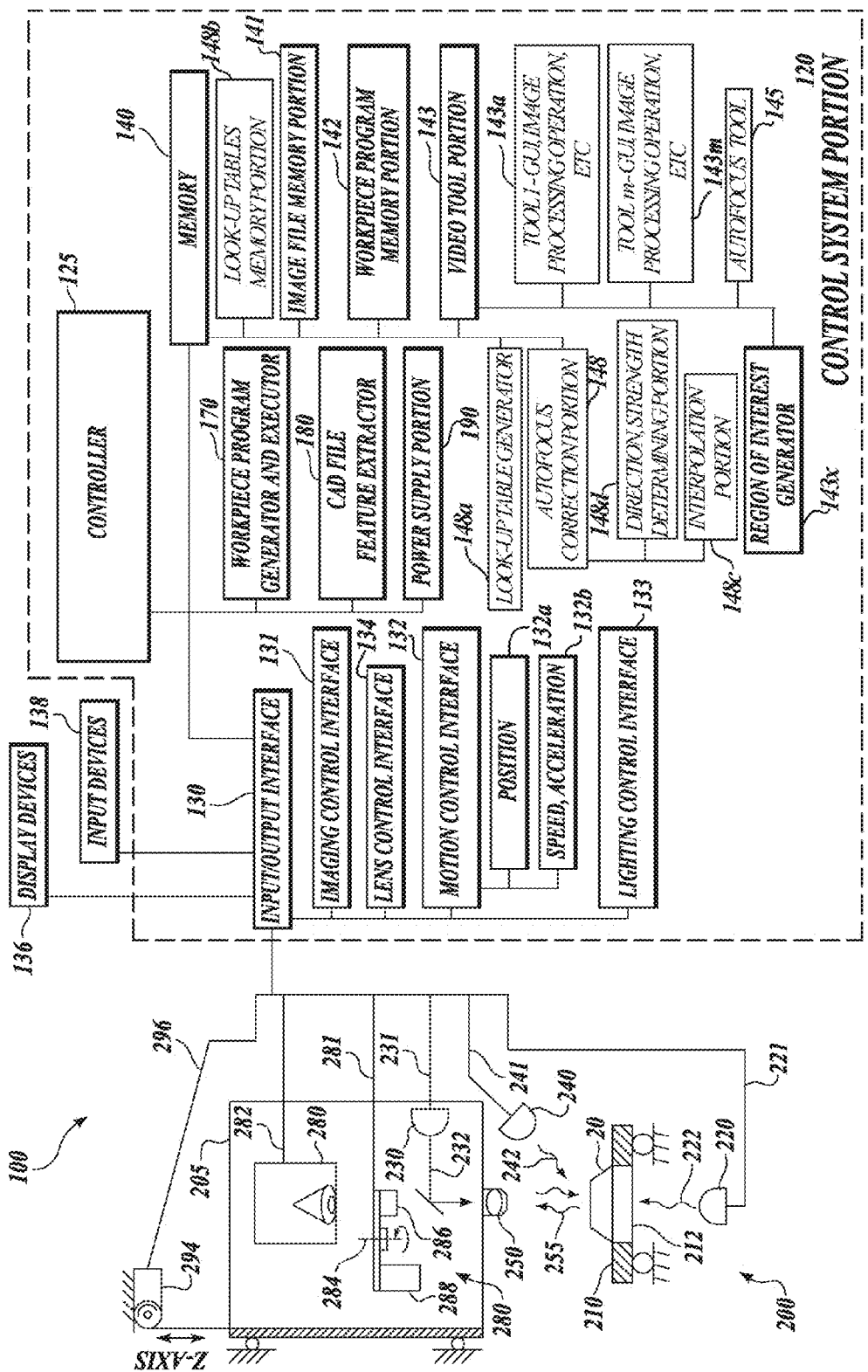
FIG. 2 is a diagram of a control system portion and a vision components portion of a machine vision inspection system.

FIG. 2 is a diagram of a control system portion 120 and a vision components portion 200 of a machine vision inspection system 100 in accordance with the present application. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20 that is to be imaged using the machine vision inspection system 100 is placed on the workpiece stage 210. One or more of the light sources 220, 230 and 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120.

The light sources 220, 230, and 240 that are used to illuminate the workpiece 20 can include a stage light 220, a coaxial light 230, and a surface light 240, such as a ring light or a programmable ring light, all connected to the control system portion 120 through signal lines or busses 221, 231 and 241, respectively. As a primary optical assembly of the machine vision inspection system 100, the optical assembly portion 205 may include, in addition to the previously discussed components, other lenses, and other optical elements such as apertures, beam-splitters and the like, such as may be needed for providing coaxial illumination, or other desirable machine vision inspection system features. When it is included as a secondary optical assembly of the machine vision inspection system 100, the turret lens assembly 280 includes at least a first turret lens position and lens 286 and a second turret lens position and lens 288. The control system portion 120 controls rotation of the turret lens assembly 280 along axis 284, between at least the first and second turret lens positions, through a signal line or bus 281.

The distance between the workpiece stage 210 and the optical assembly portion 205 can be adjusted to change the focus of the image of the workpiece 20 captured by the camera system 260. In particular, in various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, a CAD file feature extractor 180, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132A, and a speed/acceleration control element 132B. However, it should be appreciated that in various exemplary embodiments, such elements may be merged and/or indistinguishable. The lighting control interface 133 includes lighting control elements which control, for example, the selection, power, on/off switch, and strobe pulse timing if applicable, for the various corresponding light sources of the machine vision inspection system 100, such as the light sources 220, 230, and 240.

The memory 140 includes an image file memory portion 141, a workpiece program memory portion 142 that may include one or more part programs, or the like, and a video tool portion 143. The video tool portion 143 includes tool portions 143a-143m, which determine the GUI, image processing operations, etc., for each of the corresponding tools. In various exemplary embodiments of the present application, the video tool portion 143 also includes an autofocus tool 145, an autofocus correction portion 148, a look-up table generator portion 148A, a look-up table memory portion 148B, an interpolation portion 148C, and a direction-strength determining portion 148D. As will be described in more detail below, the autofocus correction portion 148 may correct for Z-height measurement errors that result during the operations of the autofocus tool 145, including correcting for astigmatism errors when they are present.

The look-up table generator portion 148A may prepare error correction calibration data (e.g., look-up tables or any other alternate form or arrangement of error correction calibration data) for each particular lens and/or particular magnification. In one embodiment, the calibration data for a lens includes a set of vertical (Z) corrections, including corrections for astigmatism errors over a 0-180° range of orientations of a directional pattern, for multiple spots in a lens/camera field of view. In one embodiment, the calibration data may include vertical (Z) corrections including a set of corrections for static optical errors and a set of corrections for astigmatism errors, for multiple spots in a field of view. In another embodiment, the calibration data may include vertical (Z) corrections including a set of corrections for anisotropic errors, for multiple spots in a field of view. The look-up tables are stored in the look-up table memory portion 148B. It should be appreciated that although error calibration data is generally described herein as being determined and stored in the form of "look-up tables", such embodiments are exemplary only, and not limiting. More generally, any element or method described herein as generating or storing a "look-up table" should be understood as representative of a more general element or method that may generate or store any other now-known or later-developed form or arrangement of error calibration data that is usable to correct Z-height measurements according to the principles of this application.

The interpolation portion 148C is utilized for the interpolation, extrapolation, or other estimate or reconstruction of the look-up table data for the position in the field of view corresponding to a current focus region of interest, for example, an autofocus tool region of interest. Generally, the reconstruction is performed by interpolation (e.g., bilinear, biquadratic, bicubic, etc.) of the error calibration values of the look-up tables, or the like, stored in the look-up tables memory portion 148B. The direction-strength (direction and strength) determining portion 148D is utilized for determining appropriate measures of the direction (nominal orientation) and/or strength (e.g., gradient magnitude) of the content of a focus region of interest. In one embodiment, the direction-strength determining portion 148D determines a histogram of the gradient (edge) directions present in the current focus region of interest, which, as will be described in more detail below, may be utilized with reconstructed (interpolated) error calibration data for computing and applying an appropriate correction to a Z-height measurement.

The video tool portion 143 still further includes a region of interest generator 143x that supports automatic, semi-automatic and/or manual operations that define various regions of interest that are operable in various video tools included in the video tool portion 143. In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to view, create and/or modify part programs, to view the images captured by the camera system 260, and/or to directly control the vision system components portion 200. In a fully automated system having a predefined part program (or workpiece program), the display devices 136 and/or the input devices 138 may be omitted.

With regard to the CAD file feature extractor 180, information, such as a CAD file representing a workpiece is frequently available in industrial applications of machine vision inspection systems. The locations of edges, boundaries and/or workpiece feature patterns in the CAD file representation may be determined manually, in a semi-automated fashion, or fully automatically, and such information may be useful for workpiece part programming or navigating to a desired workpiece feature.

In various exemplary embodiments, when a user utilizes the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture the training sequence. This process is repeated for multiple images in a set of images that are to be captured. These instructions, when executed, will cause the machine vision inspection system to manipulate the workpiece stage 210 and/or the camera system 260 at certain speed(s) such that a particular portion of the workpiece 20 is within the field of view of the camera system 260 and at a desired focus state for each of a set of images to be acquired. In addition to the program instructions that control the relative movement of the camera and the workpiece, the workpiece image acquisition program also needs to include program instructions that activate one or more of the light sources 220-240 to provide a desired illumination of the workpiece 20 during each image acquisition.

Once a set of workpiece image acquisition instructions are defined, in various exemplary embodiments of the present application, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136.

The control system portion 120 is further usable to recall captured and stored workpiece inspection images, to inspect and analyze workpiece features in such workpiece inspection images, and to store and/or output the inspection results. These methods are typically embodied in various video tools included in the video tool portion 143 of the memory 140, such as the autofocus tool 145, edge/boundary detection tools, dimension measuring tools, coordinate matching tools, and the like. Some of these tools are routinely used in a variety of commercially available machine vision inspection systems, such as the QUICK VISION® series of vision systems and the associated QVPAK® software.

After the image inspection/analysis operation using one or more of these video tools is completed, the control system 120 outputs the results of each analysis/inspection operation to the input/output interface for outputting to various display devices 136, such as a video display, printer, and the like. The control system 120 may also store the results of each inspection operation in the memory 140.

Figure 3A:
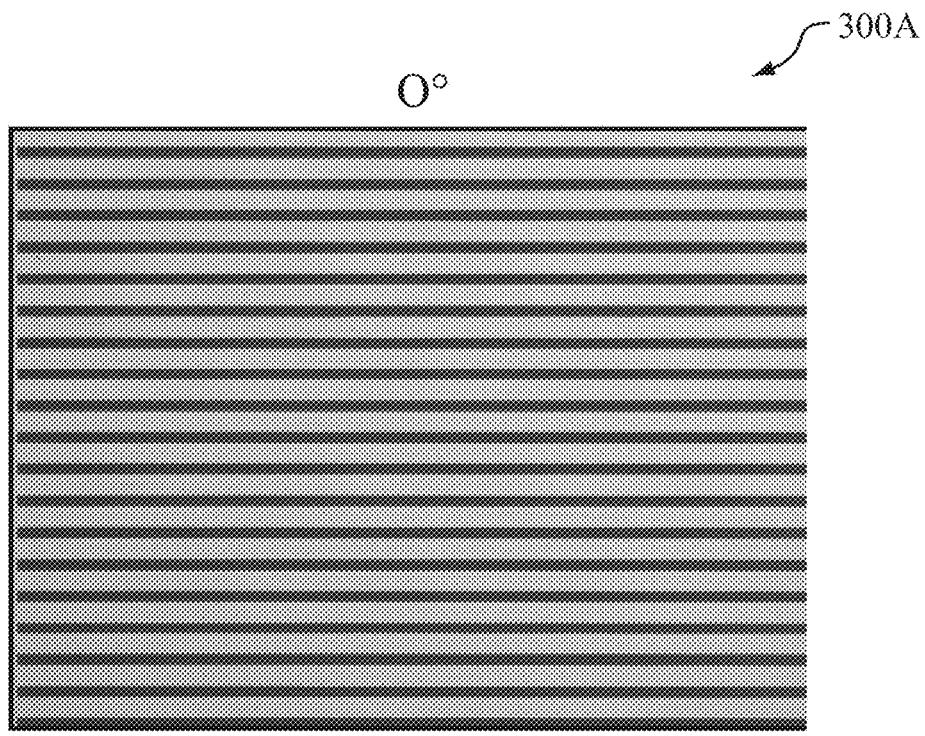
FIGS. 3A-3D are diagrams of flat surfaces with directionally striped, directionally textured and isotropically textured patterns.
Figure 3B:
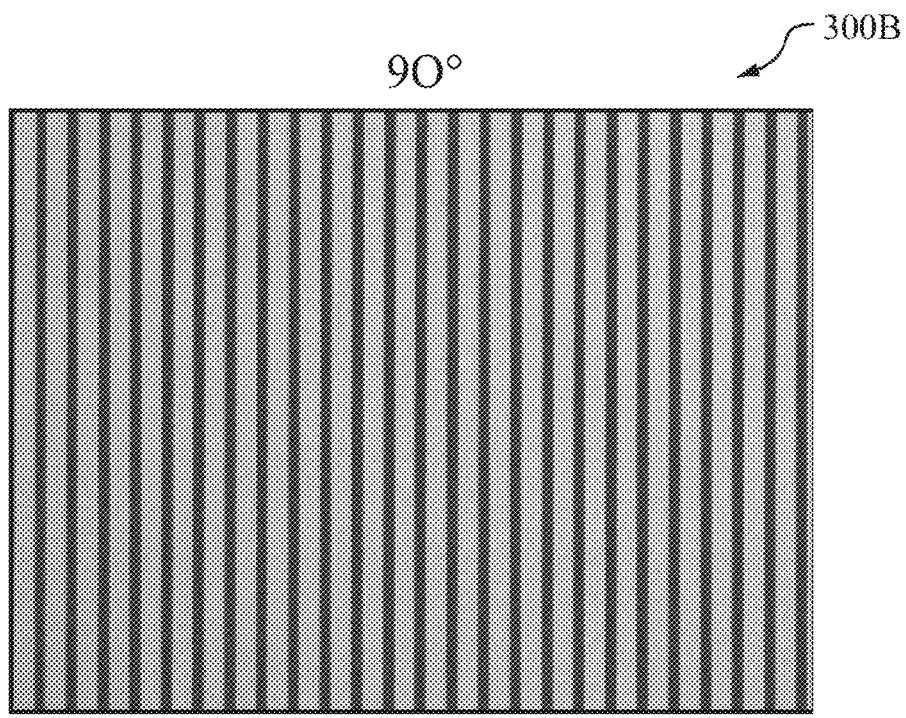
Figure 3C:
Figure 3D:
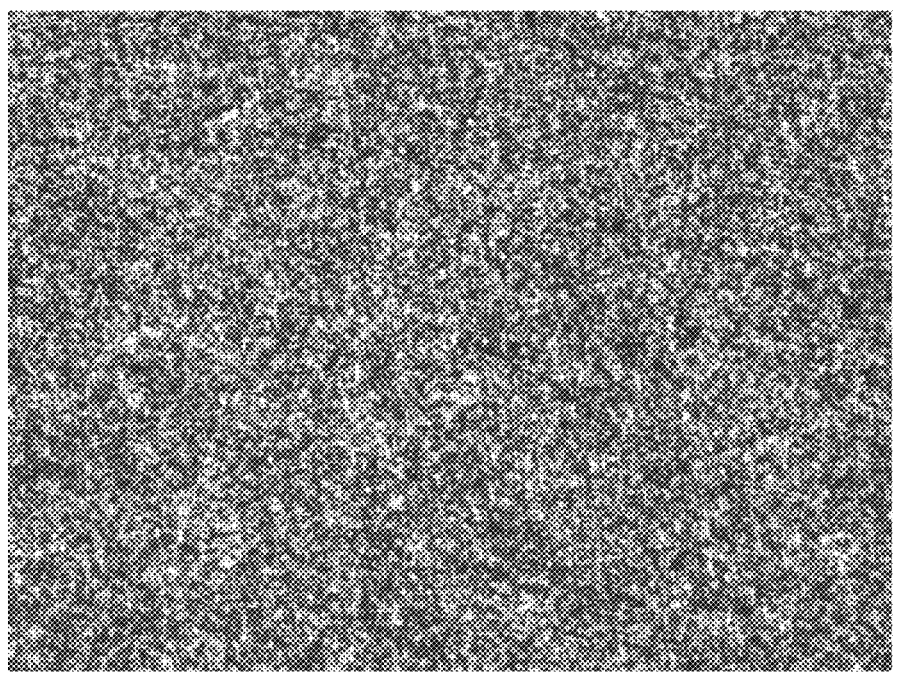

FIGS. 3A-3D are diagrams of example surfaces for which a Z-height may be measured and corrected in accordance with the present application. FIGS. 3A and 3B are diagrams of "ideal" striped surfaces 300A and 300B, respectively, which comprise a directional pattern at orientations assigned values of 0° and 90°, respectively. It will be appreciated that this orientation designation is arbitrary, and that other orientation conventions may be used, provided that a convention is applied consistently during calibration and later error corrections. FIG. 3C is a diagram of an anisotropic textured surface 300C (a surface that exhibits a significant directionality), while FIG. 3D is a diagram of an isotropic textured surface 300D (a surface that exhibits no significant directionality). Measurement results for the surfaces of FIGS. 3A-3D will be described in more detail below with respect to FIG. 4.

The ideal striped surfaces of FIGS. 3A and 3B illustrate a directional pattern that creates a basic measurement problem that the present application is intended to address. More specifically, it has been determined experimentally that for many actual machine vision systems, height measurements (Z position) that are performed based on a contrast metric or the like may vary significantly when measuring targets that present texture or lines that exhibit an apparent orientation. Conventional autofocus tools typically use such contrast metrics to determine their best focus position and the associated Z-height measurement. Therefore, as disclosed herein, the Z-height measurements determined using such tools may vary significantly when a target that includes a directional pattern is placed in different orientations, such as the 0° orientation of FIG. 3A when compared with the 90° orientation of FIG. 3B, even when the true Z-height of the target surface has not changed. Such unwanted measurement variations are described in more detail below with respect to FIG. 4.

Figure 4:
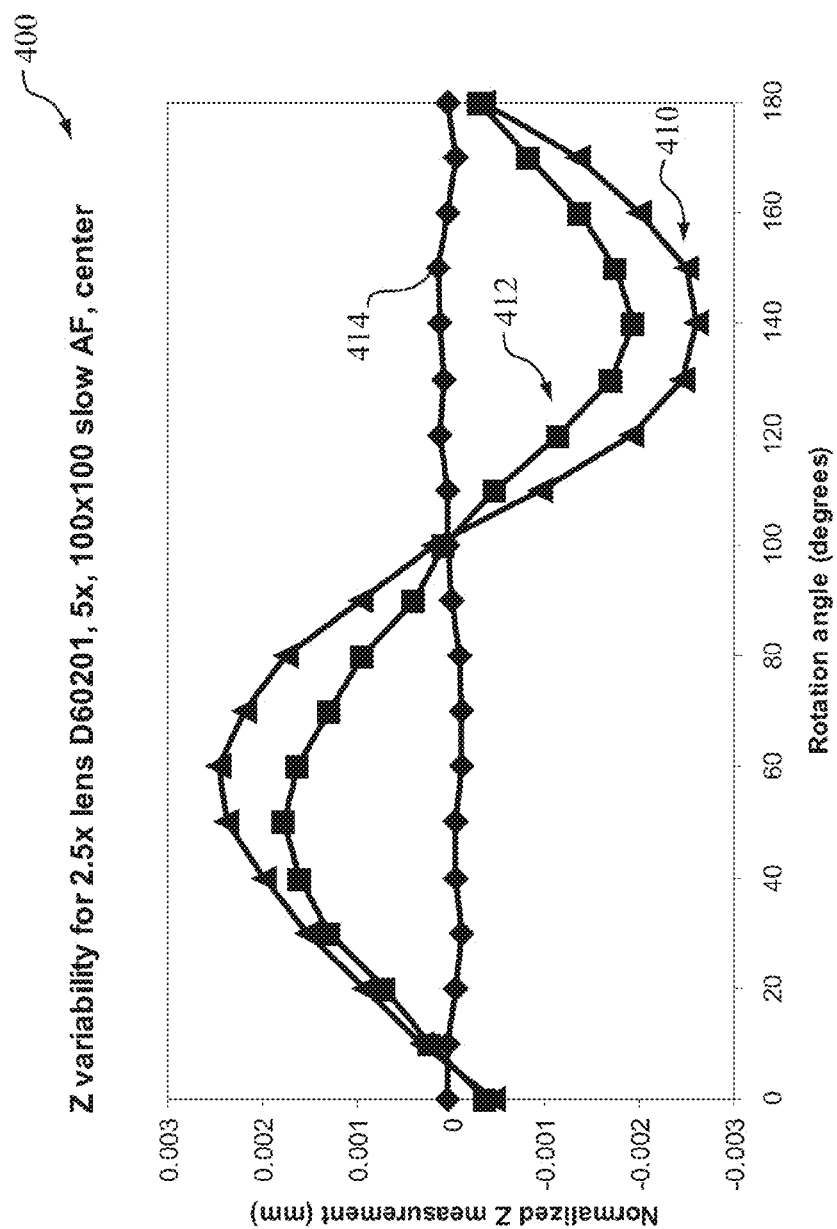
FIG. 4 is a graph illustrating the Z-variability for measurements as a function of the orientation of the surfaces of FIGS. 3A-3D.

FIG. 4 is a graph 400 illustrating the variability of Z-height measurement results for the surfaces of FIGS. 3A-3D. The three graph lines 410, 412 and 414 are based on raw data that was all taken at the same location in the field of view. The raw data have been normalized by assigning the average value of each set of points (less the 180 degree point, which is nominally redundant to the zero degree point) to a value of zero in the graph 400. For reasons described further below, this means the graph lines 410, 412, and 414, in effect, approximately reflect the astigmatism error component present in each of the raw data Z-measurements. The graph line 410 illustrates the Z-height measurement variation for the ideal striped surface pattern of FIGS. 3A and 3B at various orientations (rotation angles), while the graph line 412 illustrates the Z-height measurement variation for the textured surface of FIG. 3C at various orientations (rotation angles), and the graph line 414 illustrates the Z-height measurement variation for the isotropic surface of FIG. 3D at various orientations (rotation angles).

The varying height measurements of the graph lines 410, 412, and 414 are obtained with a conventional autofocus tool. The measurements are taken at a consistent region of interest location in the field of view as the nominal orientation of each surface pattern is rotated over 180°. The graph lines 410, 412, and 414 illustrate that astigmatism errors cause varying Z-height measurements for anisotropic surface patterns (graph lines 410 and 412) as they are rotated through 180°, and that astigmatism errors do not significantly affect Z-height measurements for isotropic surface patterns (graph line 414). As shown in FIG. 4, the Z-height measurements for the graph lines 410 and 412, corresponding to the ideal striped and textured surfaces, respectively, show significant Z value variations as a function of orientation, with the "stronger" directional pattern (the ideal stripe pattern—graph line 410) showing larger astigmatism errors than the "weaker" directional pattern (the directional texture pattern—graph line 412). More specifically, the graph line 410 shows a Z-height variation of approximately 5 microns, while the Z-height variation for the graph line 412 is approximately 3.7 microns, as compared to the graph line 414 for the isotropic surface, which shows a small Z-height variation of approximately 0.26 microns.

The present application provides a method for correcting astigmatism errors. In preferred embodiments, the method also corrects static optical errors, if any. As will be described in more detail below with regard to FIGS. 5 and 6, error calibration data (e.g., look-up tables) are prepared for each particular lens combination and/or particular magnification. In one embodiment, the calibration data may include a set of Z-height measurement corrections including corrections for astigmatism errors over a 0-180° range of orientations of a directional pattern, for multiple spots in a lens' field of view. The calibration data may also include Z-height measurement corrections for static optical errors for multiple spots in a lens' field of view. In a preferred embodiment, the calibration data may include a set of Z-height measurement corrections including corrections for anisotropic errors over a 0-180° range of orientations of a directional pattern, for multiple spots in a lens' field of view. Then, as will be described in more detail below with respect to FIGS. 7-10, during an autofocus Z-height measurement, a Z correction is computed and applied. The Z correction may be determined according to interpolated calibration data reconstructed from the calibration look-up table(s) to correspond to a current location in the field of view. The Z correction may include an adjustment, weighting, or selection of the magnitude of an anisotropic error correction, or an astigmatism error correction, based on a histogram of the gradient directions (representing the orientation angle content characteristics of the directional surface features) present in the current autofocus tool region of interest.

Figure 5:
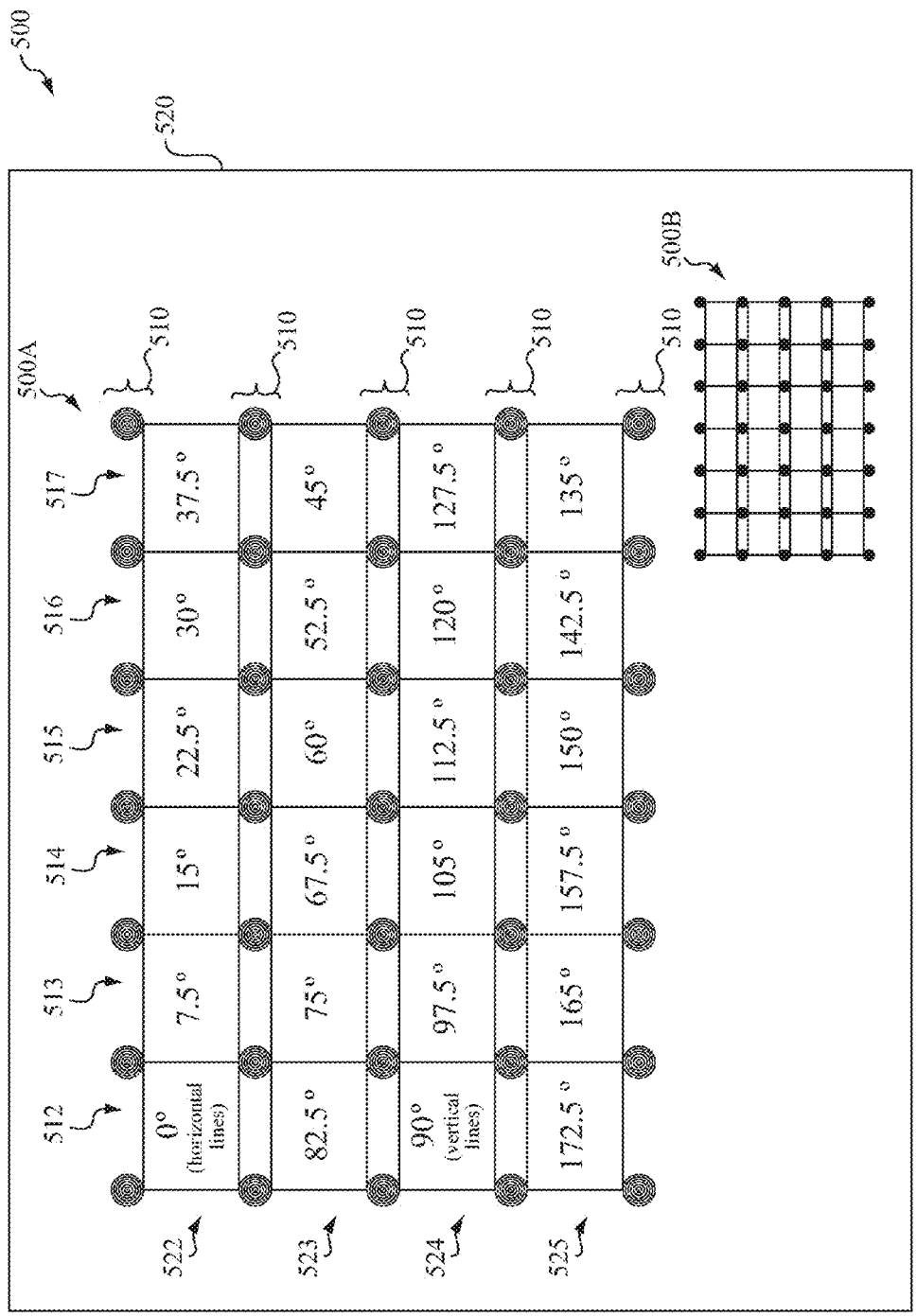
FIG. 5 is a diagram illustrating one exemplary calibration target formed in accordance with the present application.

FIG. 5 is a diagram schematically illustrating a calibration target 500 formed and usable in accordance with the present application. The calibration target 500 may comprise a flat substrate 520 that includes target element groups 500A and 500B. The target element group 500A includes a 6×4 grid of anisotropic target elements that are used for generating astigmatism error calibration data, as described further below. More specifically, the target element group 500A includes a 6×4 grid of rectangular target elements arranged in columns 512-517, and rows 522-525.

In one embodiment, each of the rectangular anisotropic target elements may include a striped surface pattern (for example, a pattern similar to that shown in FIGS. 3A and 3B) oriented at a specific angle. For example, the "0°" rectangular target element in column 512 and row 522 may include horizontally oriented stripes, while the 90° rectangular target in column 512 and row 524 may include vertically oriented stripes. Each of the other rectangular target elements contains an identical striped pattern oriented at the respective angle indicated in FIG. 5. Together, they cover a 0°-180° range of orientation angles in discrete steps of 7.5 degrees. Since the 180° direction is equivalent to the 0° direction, no additional 180° target element is included in this embodiment. In various other embodiments, the step size can vary depending on a desired granularity of the anisotropic, or astigmatism, error calibration data or look-up tables. In FIG. 5, the granularity is 7.5°. It will be understood that all of the rectangular target elements include striped surface patterns (not shown), respectively oriented at the illustrated degree numbers. Thus, even though the 15° rectangular target element in column 514 and row 522 is illustrated as having the number "15°," it will be understood that in the actual embodiment, the rectangular target element will actually include a striped surface pattern oriented at 15°. In other embodiments, the anisotropic target elements may have other types of directional patterns, for example, a texture pattern, or a striated texture pattern, or an anisotropic pattern chosen to match a pattern that is frequently encountered on an inspection workpiece.

The anisotropic calibration targets described above are general-purpose astigmatism error calibration targets. Another type of anisotropic calibration target may be particularly useful for calibrating errors that may otherwise be present in an "edge focus" type of autofocus operation, as opposed to the "surface autofocus" that is generally assumed herein. An edge focus operation may find a Z-height that maximizes the intensity gradient across an edge, for example, rather than the more general area-based contrast measures that are typically used for surface autofocus operations. In an embodiment that emphasizes correction of edge-focus astigmatism errors, a single straight edge (a border between a light zone and a dark zone) may be used as an anisotropic target element. Because such a target element is asymmetric, the range of orientation angles used for calibration is preferably 0°-360°, rather than the 0-180° range previously described.

The target element group 500A also includes a set of 35 isotropic target elements 510. As described in greater detail below, each respective isotropic target element 510 may be used for finding an "isotropic measurement Z-height", also referred to as an "isotropic measurement", at their respective locations. It may be convenient to use the center of an isotropic target element as the reference point for its location. If desired, the astigmatism error components included in adjacent anisotropic target element measurements can be isolated by subtracting a coinciding interpolated isotropic measurement as described below, to provide astigmatism error calibration data.

In operation, since astigmatism errors are minimized or absent when measuring isotropic patterns, e.g., the isotropic target elements 510, performing autofocus measurements on these patterns provides isotropic measurements that are nominally free of astigmatism errors. In one exemplary set of operations for determining true and/or reference Z-height values for various locations on the calibration target 500, if the same autofocus region of interest position within the field of view (e.g., the center of the field of view) is used to measure each of the isotropic patterns 510, the static optical error components will be nominally the same for all such measurements. Thus, this procedure will provide the raw Z-height measurements at the locations of the isotropic patterns 510 on the calibration target 500 that each contain only the same "common mode" static optical errors. Thus, the differences between such Z-height measurements are nominally due only to true Z-height differences in various portions of the calibration target substrate surface. Thus, one set of such isotropic Z-height measurements taken at the same point in the field of view, may be used as a set of true Z-height values throughout the calibration target, reflecting the position, tilt and/or distortion of the calibration target.

In one embodiment, isotropic targets may be omitted from the calibration target 500, and an isotropic measurement of a different type may be provided for any set (constant) location in the field of view, by averaging a set of anisotropic measurements made over the range of orientation angles, to provide a Z-height measurement average value wherein the astigmatism error component(s) have, in effect, been removed by the averaging. This type of isotropic measurement may then be used in the same manner as the type of isotropic measurement described above.

In either case, since the X-Y position of each isotropic measurement may be precisely known, additional true Z-height values may be estimated between the actual measurement locations. If bilinear interpolation is used, the estimated true Z-height values may reflect any global and/or local tilt of the calibration target. If higher order, e.g., biquadratic, or other more complex interpolation schemes are used, curved distortions of the calibration target may be more accurately reflected.

It will be appreciated that a reference or "zero" Z-plane may be chosen somewhat arbitrarily, provided that all other Z-measurements are measured relative to this plane. Thus, any one set of true Z-height values determined at the same point in the field of view, as outlined above, may be used as reference Z-height values throughout the calibration target, reflecting the position, tilt and/or distortion of the calibration target. It may be convenient to use the center of the field of view as the point in the field of view that provides the reference Z-height values for the calibration target. It should be appreciated that the reference Z-height values may be treated as though they are free of both astigmatism errors and static optical errors.

In one embodiment according to this application, anisotropic error calibration data may be determined at various locations throughout the field of view. A description of one exemplary embodiment of this process begins here with an exemplary set of operations for determining a single anisotropic error calibration value, for one orientation angle, at one location in the field of view.

To determine a single anisotropic error calibration value, first one of the anisotropic target elements described above may be positioned to fill the field of view with its anisotropic pattern at its respective orientation angle. Then, the center of a focus region of interest is positioned at a desired location in the field of view (this assumes the center of a region of interest is used as the reference point for its location.) Then an anisotropic measurement is obtained at that location in the field of view, e.g., by autofocusing the focus region of interest. The difference between an anisotropic measurement at a respective orientation angle at that location in the field of view and a reference Z-height value at that same location in the field of view, may provide the anisotropic error calibration value that should be associated with that respective orientation angle at that location in the field of view.

The anisotropic error calibration steps described above may be repeated at that same location in the field of view for each respective anisotropic target at its respective orientation angle, to provide a complete set of anisotropic error calibration data corresponding to that location in the field of view. The characteristics of such a set of anisotropic calibration data, collected for a single location in the field of view, may be better understood based on the description of FIG. 6, below.

The entire set of anisotropic error calibration operations described above may then be repeated at a number of desired locations throughout the field of view, to provide complete sets of anisotropic error calibration data corresponding to each of those desired locations. Anisotropic error calibration values or data corresponding to any of the respective orientation angles may then be estimated at other unmeasured locations in the field of view, by using various interpolation techniques analogous to those indicated above or described further below. Generally, the anisotropic error "shape" represented by the anisotropic error values corresponding to the same orientation angle, but at different locations in the field of view, may be more complex than the shape of the calibration target surface. Thus, higher-order types of interpolation may provide better accuracy. One example of respective sets of anisotropic error calibration data at respective locations in the field of view is described below with reference to FIG. 7.

Static optical errors may be determined, if desired. In one exemplary set of operations for determining the static optical errors to be associated with a desired location in the field of view, a respective isotropic target element, having a respective known reference Z-height value, is positioned at the desired location in the field of view. Next, a focus region of interest is set at that location in the field of view, and a new isotropic measurement is obtained at that location in the field of view. The difference between the known reference Z-height of that isotropic target element and the newly obtained isotropic measurement Z-height is the static optical error to be associated with that location in the field of view. If desired, this process may be repeated at that location in the field of view using additional isotropic target elements having respective known reference Z-height values, and the results may be averaged to provide a more refined value for the static optical error at that location in the field of view. In any case, the resulting static optical error may be stored as static optical error calibration data corresponding for that location in the field of view, if desired.

The static optical error calibration process described above may be repeated at respective locations throughout the field of view, to provide respective static optical error calibration data corresponding to those locations throughout the field of view. Static optical error calibration values or data may then be estimated for other unmeasured locations in the field of view by using various interpolation techniques analogous to those indicated above, but to interpolate the static optical errors in this case. Generally, the static optical error "shape" may be more complex than the shape of the calibration target surface, so higher order types of interpolation may provide better accuracy.

If static optical errors are determined at various locations throughout the field of view, then astigmatism error calibration data may also be determined at various locations throughout the field of view, if desired. Complete sets of astigmatism error calibration data corresponding to each desired location in the field of view may be determined in the manner described above for determining anisotropic error calibration data, except instead of subtracting a coinciding reference Z-height value from each anisotropic measurement at each location, a coinciding isotropic measurement value is subtracted from each anisotropic measurement at each location. The characteristics of a set of astigmatism calibration data, collected for a single location in the field of view, may be better understood based on the description of FIG. 6, below.

In various embodiments, an anisotropic error value corresponding to the location and orientation angle content of a focus region of interest, may be subtracted from a raw Z-height measurement based on that focus region of interest, to provide a corrected Z-height measurement value. A corrected Z-height measurement value is nominally the same as the true Z-height value of the measured region of a workpiece. Alternatively, it should be appreciated that subtracting both a static optical error value and an astigmatism error value corresponding to the location and orientation angle content of a focus region of interest, is equivalent to subtracting an anisotropic error value corresponding to the location and orientation angle content of a focus region of interest. Thus, in various embodiments according to this application, the error calibration data may be prepared and applied in different forms, with the same result.

It will be appreciated that even if astigmatism error calibration data and static optical error calibration data are separated, it is generally advantageous to apply both an astigmatism error correction and a static optical error correction, to determine a corrected Z-height measurement value. However, in general, using either of the corrections alone will still provide at least partially corrected Z-height measurement values that are more independent of surface characteristic and/or the measurement location in the field of view than raw Z-height measurements. Thus, using either of the corrections alone may still provide certain benefits in various applications. For example, in some particularly well-crafted precision machine vision inspection systems, static optical errors may be insignificant, and the use of astigmatism error calibration and correction operations alone may be the simplest and most advantageous alternative.

It will be appreciated that the error calibration operations outlined above with reference to FIG. 5 are exemplary only, and many variations are possible. The various values determined above are all based on various combinations of isotropic and anisotropic measurement values. Generally, all of the various required isotropic and anisotropic measurement values may be obtained in any efficient (or inefficient) order, and subsequently processed to provide the desired anisotropic error calibration values, astigmatism error calibration values, or static optical error calibration values, etc., in any functionally equivalent manner.

Furthermore, although the error calibration data described above generally comprises stored error values, the error calibration data could alternatively comprise the various measurement values used to determine those error values. In one such embodiment, the different types of measurement values may be stored in one or more look-up tables, and are later processed to correct raw Z-height measurements, as needed. In another embodiment, the different types of measurement values or errors may be stored as analytical expressions describing different "surfaces" corresponding to the different types of measurements or errors. For example a reference Z-height surface, an isotropic measurement surface, a number of anisotropic measurement surfaces corresponding to different orientation angles, etc. All of the foregoing data forms may be considered a type of Z-height error calibration data that characterizes a variation in Z-height measurement results based on a focus region of interest, in relation to a variation in the orientation angle of the anisotropic image content in the focus region of interest. In any case, Z-height errors may be corrected in raw measurements by the proper use of any of these forms of data. Thus, each is considered to be a form of stored error calibration data. In various embodiments, any isotropic or anisotropic measurement can be repeated as many times as desired, and the results averaged to provide a more reliable and/or repeatable value that may be used instead of a single measurement value. These and other variations will be apparent based on this disclosure.

It will be understood that the target element group 500B, shown in FIG. 5, includes elements similar to those of the target element group 500A, although on a smaller scale. The target element group 500B is thus conveniently utilized in the same manner as previously described for the target element group 500A, but with a lens arrangement having a higher magnification than that for which the target element group 500A is typically used.

Each of the anisotropic target elements in the target element groups 500A and 500B is designed to be slightly larger than the field of view of the lens at the lowest magnification for which the target is designed, with the directional pattern oriented at the designated angle. The density of the lines or features within the anisotropic target elements is selected to provide good calibration in the autofocus regions of interest at all magnifications for which the target is designed. More specifically, the lines or features are designed to not be too thin (which can cause aliasing with the camera pixels) and are also designed to have enough cycles in the autofocus region of interest to provide a "strong" anisotropic pattern in the autofocus region of interest. In one specific example, the target element group 500A is intended to work well with a 100×100 pixel autofocus region of interest (assuming a field of view size of 640×480 pixels) at 1× and 2× turret lens assembly settings with a 2.5× objective lens. In this example, the target element group 500B would be intended to work well with a 100×100 autofocus region of interest at a 6× turret position (the target element group 500B is 3 times smaller than the target element group 500A).

It will be appreciated that the features, arrangements and/or aspect ratios of the target element groups 500A and 500B of FIG. 5 are illustrative only, and can differ from those shown. For example, in one embodiment, generally, the size of each of the anisotropic target elements depends on the total lens magnification and/or field of view for which the target element group is to be used. Each of the anisotropic target elements is made slightly larger than the largest intended field of view. This constraint allows the use of commercially available multipoint autofocus tools or operations to rapidly collect anisotropic measurements for a particular orientation angle, over the entire field of view.

The number of anisotropic target elements can be smaller or larger, depending on the selected granularity of the look-up tables used for the astigmatism correction. The calibration target 500 has a granularity of 7.5°, but the granularity can be smaller or larger, depending on the desired accuracy and speed of calibration. Due to the smooth nature of the astigmatism error curves, it is generally sufficient in various embodiments to use granularity for collecting the data in 5°, 7.5°, 10° or 15° intervals. The number of anisotropic target elements can generally be computed as 180°/granularity.

In one embodiment where the anisotropic target elements comprise periodic line patterns, it is desirable to select the line pitch so that an autofocus region of interest much smaller than the field of view (e.g., 100×100 pixels in 640×480-pixel field of view) will contain at least 2-3 full cycles, but at the same time so that the lines are not too fine (e.g., not thinner than 5 pixels) to prevent aliasing with the pixel pitch, which could skew the calibration results. In one example embodiment, the line pitch used in the target element group 500A is selected to provide about 3 full cycles in a 91×91 autofocus area at 5× magnification, with about 7.5-pixel line width at 2.5× magnification. The scaled version of the target element group 500B, to be used at 15× magnification, provides the same number of cycles in the autofocus region of interest (about 3) as given by the target element group 500A for the 5× magnification. The ratio of the line thickness to space thickness in line patterns can be 1:1, but the ratio may also vary.

The isotropic target elements 510 can also contain different patterns than the concentric circles shown in FIG. 5. In one embodiment, any pattern without dominant gradient (edge) direction (i.e., with a uniform gradient direction histogram) may be utilized. The number of isotropic patterns can be increased or decreased, or they may be omitted and an average of anisotropic measurement values may be used to provide their function, as previously described.

In one embodiment according to this application, a calibration target such as that shown in FIG. 5 is not used. The following calibration procedure has the disadvantage that it is more labor intensive and requires more equipment, nevertheless, suitable error calibration data results. In this embodiment, a rotary table is positioned in the machine vision inspection system field of view, with its rotation axis aligned nominally parallel to the Z-axis of the system. A flat surface including an anisotropic pattern, such as that used for one of the anisotropic target elements of the calibration target 500, is leveled parallel to the X-Y plane of the machine vision inspection system. The anisotropic pattern may have a size that fills the field of view, regardless of its orientation angle. To obtain anisotropic measurements for a desired location in the field of view, the rotation axis of the rotary table is positioned at that desired location. Then, by rotating the rotary table in discrete steps according to a set of orientation angles such as those previously described with reference to FIG. 5, a set of anisotropic measurements is taken at that location in the field of view. This process is repeated at each desired location in the field of view, with the rotation axis positioned at each desired location. As explained previously, the set of anisotropic measurements at each location in the field of view may be averaged such that the effect of the astigmatism error components is cancelled, to provide, in effect, an isotropic measurement at that location in the field of view. These anisotropic and isotropic measurements may be used in the same manner as the anisotropic and isotropic measurements previously described with reference to the operations associated with FIG. 5. All of the same calibration data may be derived from such measurements.

Figure 6:
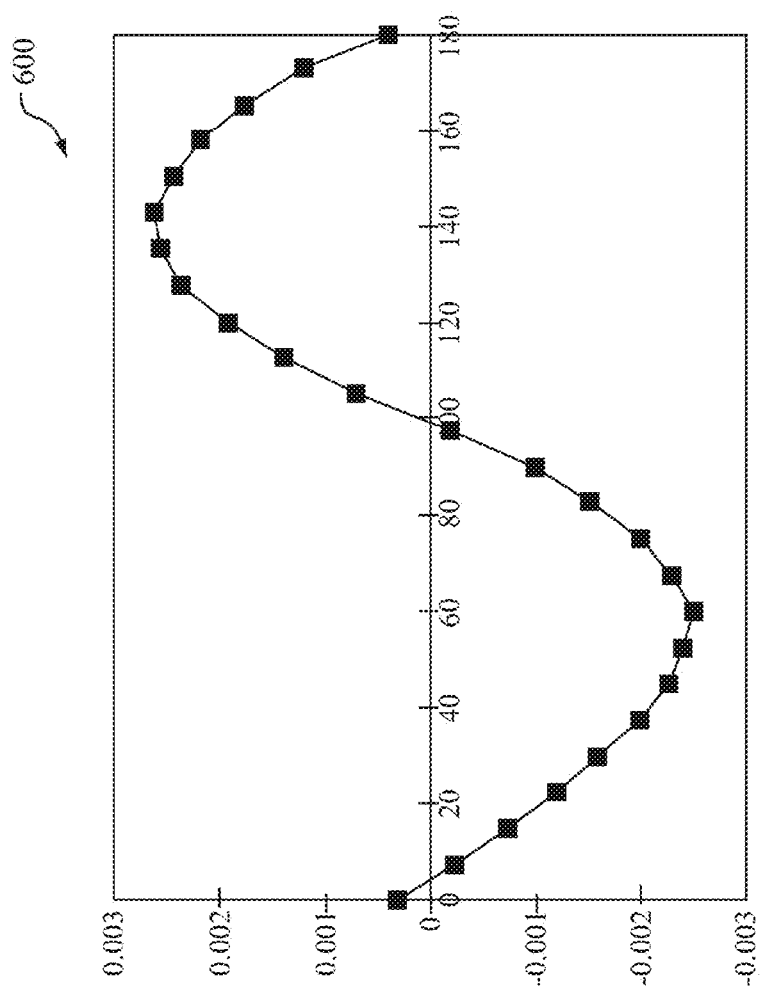
FIG. 6 is a graph of one exemplary group of astigmatism error calibration data that are determined using the calibration targets of FIG. 5.

FIG. 6 is a diagram presenting astigmatism error calibration data 600 that may be obtained as previously described with reference to FIG. 5, and stored as a look-up table or in any other convenient form. More specifically, FIG. 6 includes astigmatism error data points, which correspond to various orientation angles of a striped anisotropic target element, at a particular location for a focus region of interest in the field of view. The astigmatism error calibration data may be used to determine a Z-height adjustment that should be applied to a Z-height measurement on a workpiece in order to correct or eliminate the astigmatism error component, when using a focus region of interest located at the same location in the field of view as that used to obtain the error calibration data. When the focus region of interest contents have approximately the same directional content as the striped anisotropic target element, the Z-height adjustment, that is, the astigmatism error correction value, may be taken directly from the graph, at the orientation angle corresponding to the contents of the focus region of interest. For example, a maximum positive error correction value of approximately 2.5 microns is shown for an orientation angle of approximately 140°, while a maximum negative error correction of approximately 2.5 microns is shown for a rotation of approximately 60°.

It should be appreciated that anisotropic error calibration data which corresponds to various orientation angles of the same striped anisotropic target element, at the same particular location for a focus region of interest in the field of view, would look identical to the astigmatism error calibration data 600, except the error calibration data (the curve) would be shifted in the vertical direction by an amount of the static optical error at that location. Such anisotropic error calibration data may be used to determine a Z-height adjustment that should be applied to a Z-height measurement on a workpiece in order to correct or eliminate anisotropic errors (combined astigmatism and static optical errors), when using a focus region of interest located at the same location in the field of view as that used to obtain the error calibration data. When the focus region of interest contents have approximately the same directional content as the striped anisotropic target element, the Z-height adjustment, that is, the anisotropic error correction value, may be taken directly from the data, for the orientation angle corresponding to the contents of the focus region of interest.

FIG. 7 shows an illustrative example of sets of anisotropic error calibration data analogous to FIG. 6, collected for nine locations in a field of view 700. In one embodiment, nine sets of anisotropic error calibration data are the minimum number necessary for estimating anisotropic error calibration values at other locations using biquadratic interpolation. In other embodiments, sets of anisotropic error calibration data may be provided at more or fewer locations, depending on the amount of variation expected between the various sets of data, and the desired anisotropic error correction accuracy. Bicubic interpolation may require sets of anisotropic error calibration data collected for sixteen locations.

As shown in FIG. 7, the nine sets of anisotropic error calibration data at the various locations within the field of view 700 are represented by graphs 710-790. The graphs 710, 730, 770, and 790 are based on anisotropic measurements at the four corners of the field of view, while the rectangular graphs 720, 740, 760, and 780 are based on anisotropic measurements at the middles of the sides of the field of view, and the rectangular graph 750 is based on anisotropic measurements at the center of the field of view. The particular anisotropic measurements reflected in FIG. 7 were collected using a 100×100 (square) autofocus tool region of interest located approximately as shown. It will be understood that graphs 710-790 are for illustration purposes only, to symbolically represent what the anisotropic error calibration results may be at those locations within the field of view 700. As will be described in more detail below with respect to FIGS. 8A-8C, a rectangular portion 795 illustrates that for additional locations within the field of view 700, interpolation between adjacent sets of error calibration data may be utilized to estimate anisotropic error calibration values for correcting Z-height measurement results for astigmatism and static optical errors at any location in the field of view.

Since in small neighborhoods the error surface may be approximately "piecewise planar", using bilinear interpolation of the sets of anisotropic error calibration data belonging to four closest field of view locations is in some implementations sufficient. However, in some embodiments, for better accuracy, it is desirable to use more than nine lookup tables and biquadratic interpolation of the nine closest sets of anisotropic error calibration data.

Figure 8A:
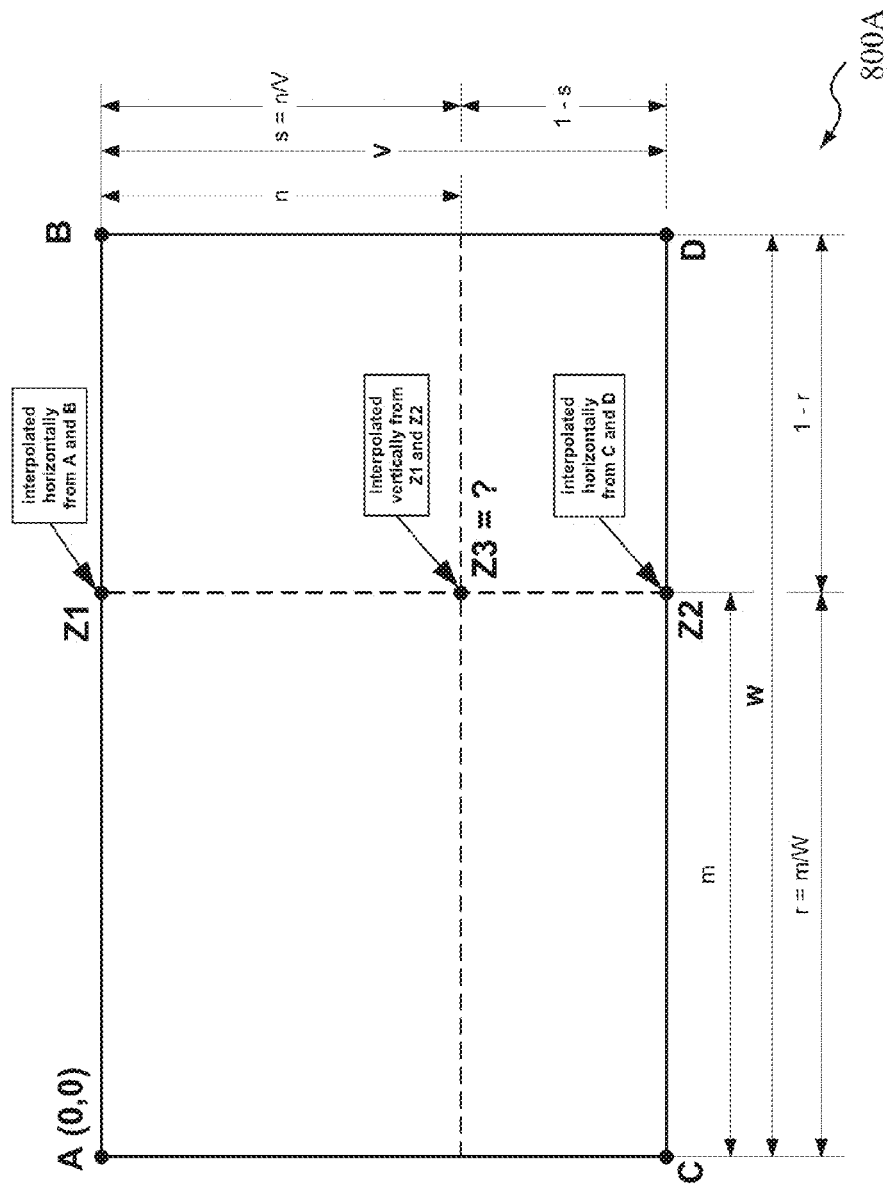
FIGS. 8A-8C are diagrams illustrating exemplary interpolation techniques that may be utilized for determining error corrections for locations between discrete calibration locations in the field of view of the diagram of FIG. 7.
Figure 8B:
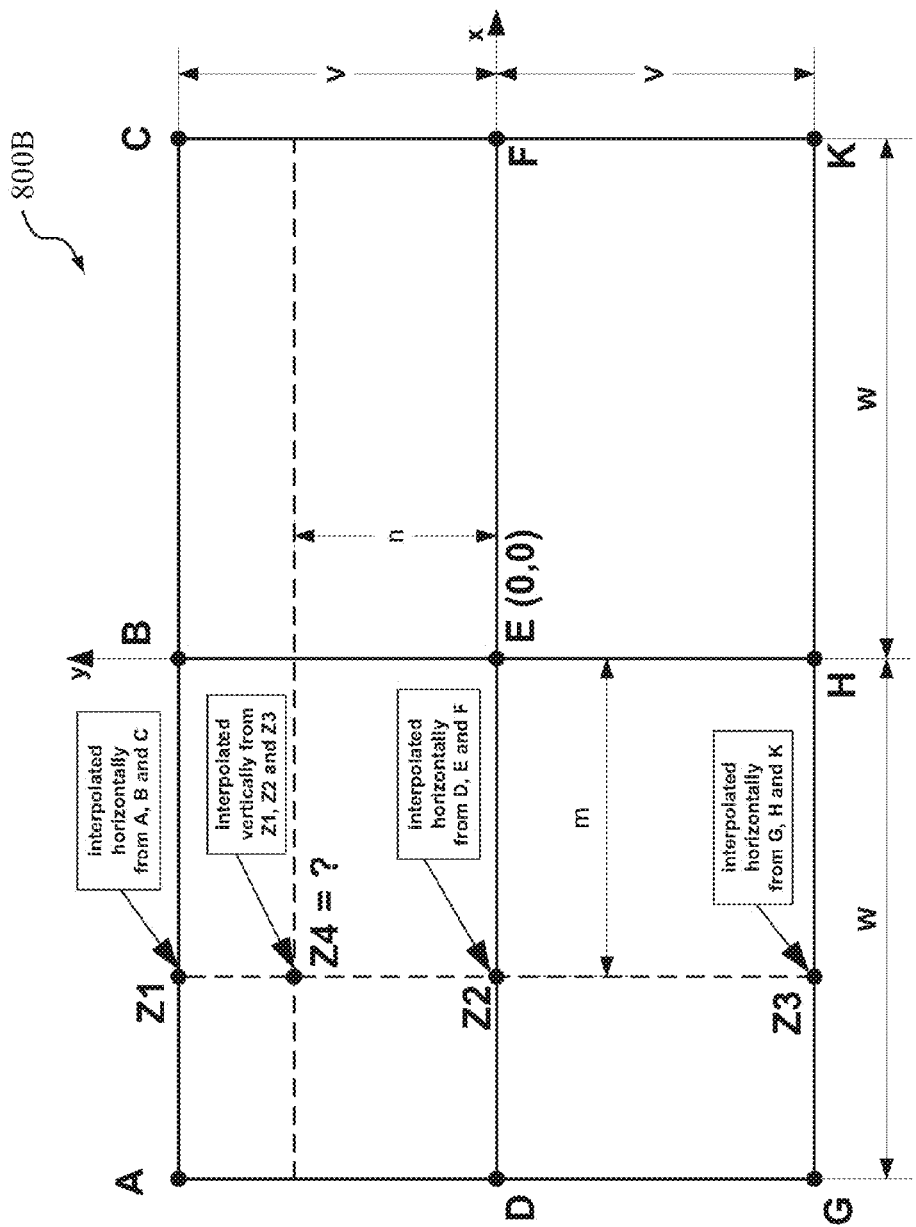
Figure 8C:
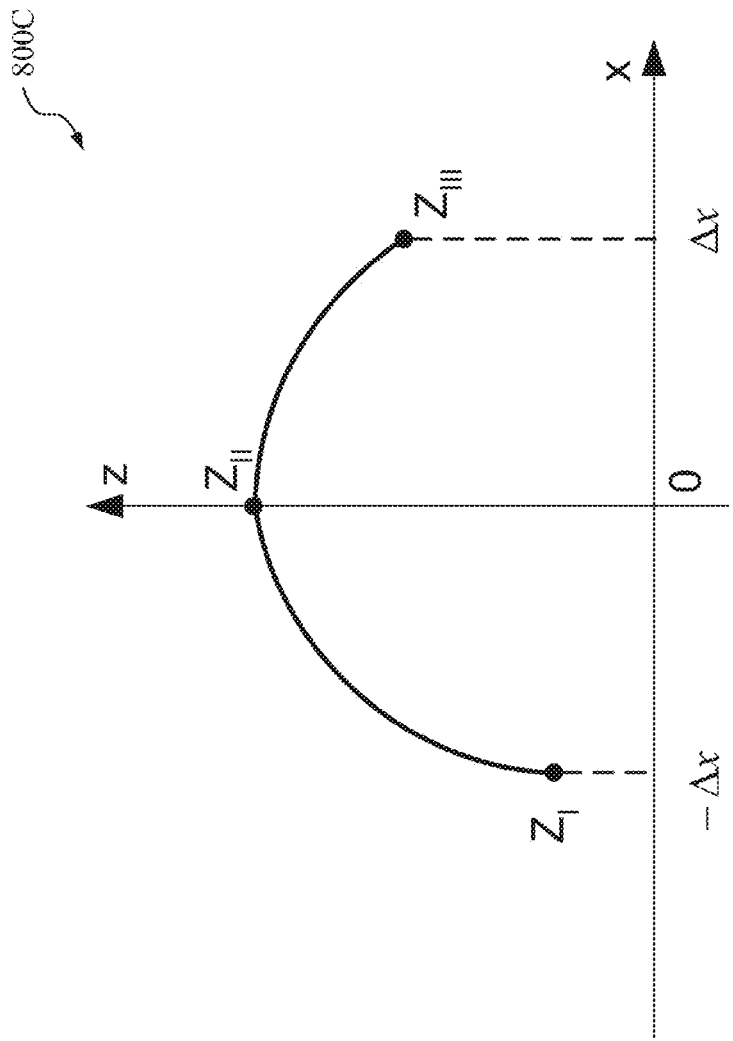

FIGS. 8A-8C are diagrams illustrating various interpolation techniques. In one embodiment, bilinear interpolation is utilized to compensate for the calibration target tilt/warp/sag, and at runtime biquadratic interpolation is utilized with respect to error calibration look-up tables collected in the field of view to estimate a look-up table for the current autofocus region of interest location within the field of view.

FIG. 8A shows the concepts of a bilinear interpolation scheme. Four points A, B, C and D correspond to measurement locations on a rectangular grid in the field of view. The labels A, B, C and D of these four points are in this case also representing the values to be interpolated. In this particular example, the values are assumed to be Z-height measurement values, but the same principles may be applied to any type of values. The horizontal pitch of the rectangular grid is W and the vertical pitch is V. The pitches W and V do not have to be equal, that is, the grid does not have to be square, but it may be. It is desired to estimate (recover) the interpolated value (Z) at a point Z3, marked with the question mark in FIG. 8A. The position of point Z3 is expressed in relation to point A, which is treated as the origin of the temporary local coordinate system. The point Z3 has a horizontal distance m and a vertical distance n from point A.

The process of bilinear interpolation of the four points A, B, C, and D consists of two steps. The first step is interpolating in the horizontal direction, using point pairs (A, B) and (C, D), to obtain two horizontally interpolated points Z1 and Z2 (see FIG. 8A). The second step is interpolating in the vertical direction, using the pair of interpolated points (Z1, Z2) computed in the previous step, to obtain the final interpolated value Z3. Alternatively, the process can start from interpolating in the vertical direction and then horizontally. The result does not depend on which direction of interpolation is considered first.

If auxiliary ratios r and s (see FIG. 8A) are used, where r=m/W and s=n/V, points Z1 and Z2 can be horizontally interpolated using the basic linear proportions (weighted averages):

$$Z1=(r-1)A+rB \quad \text{(Eq. 1)}$$

$$Z2=(r-1)C+rD \quad \text{(Eq. 2)}$$

And after computing Z1 and Z2, the final desired result (Z value) is vertically interpolated using the proportion (weighted average):

$$Z3=(1-s)Z1+sZ2 \quad \text{(Eq. 3)}$$

Z3 is therefore a result of bilinear interpolation of the four initial values (A, B, C and D) at the location within the rectangular grid specified by the ratios r and s (derived from the grid pitch and the location of the point Z3 within the grid). It will be appreciated that this interpolation method may be used for any type of values associated with the location/points A, B, C and D, e.g., anisotropic measurements, isotropic measurements, reference Z-height values, static optical error values, anisotropic error values or astigmatism error values corresponding the same angular orientation, etc.

FIG. 8B shows the concepts of a biquadratic interpolation scheme. The basic principle of the biquadratic interpolation is similar to the one used in bilinear interpolation of FIG. 8A, i.e., the interpolation is first performed horizontally, then vertically. The only difference is that instead of interpolating points with straight lines, the interpolation is done with parabolas. This requires more interpolation points, i.e., values at three locations are required for interpolation in each direction, and so 9 instead of 4 points are used for biquadratic interpolation.

As shown in FIG. 8B, nine points A, B, C, D, E, F, G, H, and K correspond to measurement locations on a rectangular grid in the field of view. The labels of these nine points are also representing the values to be interpolated. In this particular example, the values are assumed to be Z-height measurement values. The label K is used instead of I only to improve readability. The horizontal pitch of the rectangular grid is W, and the vertical pitch is V. It is desired to compute (recover) the interpolated value (Z) at point Z4, marked with the question mark in FIG. 8B. The position of point Z4 is expressed in relation to point E, which is treated as the origin of the temporary local coordinate system. The point Z4's horizontal coordinate with respect to point E is m and its vertical coordinate with respect to the point E is n. The coordinates (m,n) can be positive or negative, depending on the relative position of point Z4 and the direction of the coordinate system (x,y) axes shown in FIG. 8B.

The process of biquadratic interpolation of the nine points A, B, C, D, E, F, G, H, and K consists of two steps. The first step is interpolating in the horizontal direction, for each set of horizontally aligned points (A, B, C), (D, E, F) and (G, H, K), to obtain three horizontally interpolated points Z1, Z2 and Z3 (see FIG. 8B). The second step is interpolating in the vertical direction, using the three interpolated points (Z1, Z2, Z3) computed in the previous step, to obtain the final interpolated value Z4. Alternatively, the process can start from interpolating in the vertical direction and then horizontally.

In order to interpolate points Z1, Z2, Z3 and Z4 in FIG. 8B, the parameters of parabolas passing through these points are computed, which is slightly more complex than for linear interpolation. Equations for fitting a single parabola to three points are described below with respect to FIG. 8C, after which the full biquadratic interpolation equations for FIG. 8B are presented.

FIG. 8C shows a segment of a parabola passing through three points with given Z (vertical coordinate) coordinates equal to $Z_I$, $Z_{II}$ and $Z_{III}$. The equation of the parabola is:

$$f(x) = ax^2 + bx + c \quad \text{(Eq. 4)}$$

and $$f(-\Delta x) = Z_I \quad \text{(Eq. 5)}$$

$$f(0) = Z_{II} \quad \text{(Eq. 6)}$$

$$f(\Delta x) = Z_{III} \quad \text{(Eq. 7)}$$

from which the parameters a, b and c of the parabola can be computed according to known methods. The results are:

$$c = Z_{II} \quad \text{(Eq. 8)}$$

$$b = \frac{Z_{III} - Z_I}{2\Delta x} \quad \text{(Eq. 9)}$$

$$a = \frac{Z_I + Z_{III} - 2Z_{II}}{2(\Delta x)^2} \quad \text{(Eq. 10)}$$

Therefore, the complete equation of the parabola passing through the three points shown in FIG. 8C can be written as:

$$f(x) = \frac{Z_I + Z_{III} - 2Z_{II}}{2(\Delta x)^2} x^2 + \frac{Z_{III} - Z_I}{2\Delta x} x + Z_{II} \quad \text{(Eq. 11)}$$

Using EQUATION 11, the Z coordinate of a point with an arbitrary x location can be estimated (interpolated). It will be appreciated that this interpolation method may be used for any type of values associated with the locations/points A, B, C, D, E, F, G, H, and K.

Returning to the biquadratic interpolation of FIG. 8B, by treating the points B, E and H as centers of the horizontal parabolas and substituting Δx in EQUATION 11 with the horizontal grid pitch W, the values $Z_I$, $Z_{II}$ and $Z_{III}$ with the corresponding horizontal point trio ((A, B, C), (D, E, F) or (G, H, K)) and using the horizontal coordinate m of point Z4 as the x variable with respect to the center locations of the horizontal parabolas:

$$Z1 = \frac{A + C - 2B}{2W^2} m^2 + \frac{C - A}{2W} m + B \quad \text{(Eq. 12)}$$

$$Z2 = \frac{D + F - 2E}{2W^2} m^2 + \frac{F - D}{2W} m + E \quad \text{(Eq. 13)}$$

$$Z3 = \frac{G + K - 2H}{2W^2} m^2 + \frac{K - G}{2W} m + H \quad \text{(Eq. 14)}$$

As the final step of the biquadratic interpolation, the value Z4 can be interpolated by fitting a vertical parabola to the three points estimated (interpolated) above. In this case, the values $Z_I$, $Z_{II}$ and $Z_{III}$ of EQUATION 11 are substituted with Z1, Z2, Z3, the Δx is substituted with the vertical grid pitch V, and the x variable by the vertical coordinate n of point Z4 with respect to the center location of the vertical parabola (Z2). The final equation to compute Z4 is:

$$Z4 = \frac{Z3 + Z1 - 2Z2}{2V^2} n^2 + \frac{Z1 - Z3}{2V} n + Z2 \quad \text{(Eq. 15)}$$

In one embodiment of an error calibration method according to this application, the calibration target of FIG. 5, and the various anisotropic and isotropic measurement techniques and error calibration data determining techniques described with reference to FIGS. 5 and 6, and one or more of the interpolation techniques described with reference to FIGS. 7 and 8, may be used to provide error calibration data used for correcting anisotropic errors, or astigmatism error components and/or static optical error components included in raw Z-height measurements obtained when inspecting a workpiece at a desired location in the field of view. The value used for inspection purposes is then the corrected Z-height measurement obtained by correcting the anisotropic errors, or astigmatism error components and/or static optical error components. All the error calibration steps outlined above may be repeated for each objective lens and power turret position combination used by a machine vision inspection system (since the anisotropic errors, astigmatism errors and static optical errors differ between the various objective lenses and power turret positions).

A machine vision inspection system may generally be programmed to automatically perform step and repeat anisotropic and isotropic calibration target measurements, and determine all required error calibration data values, according to previously outlined principles, for example. The automatic operations may include determining all the error calibration data values corresponding to one lens combination and/or magnification, and then automatically changing the magnification and repeating the error calibration operations using a different target element group of the appropriate size for that magnification.

Figure 9A:
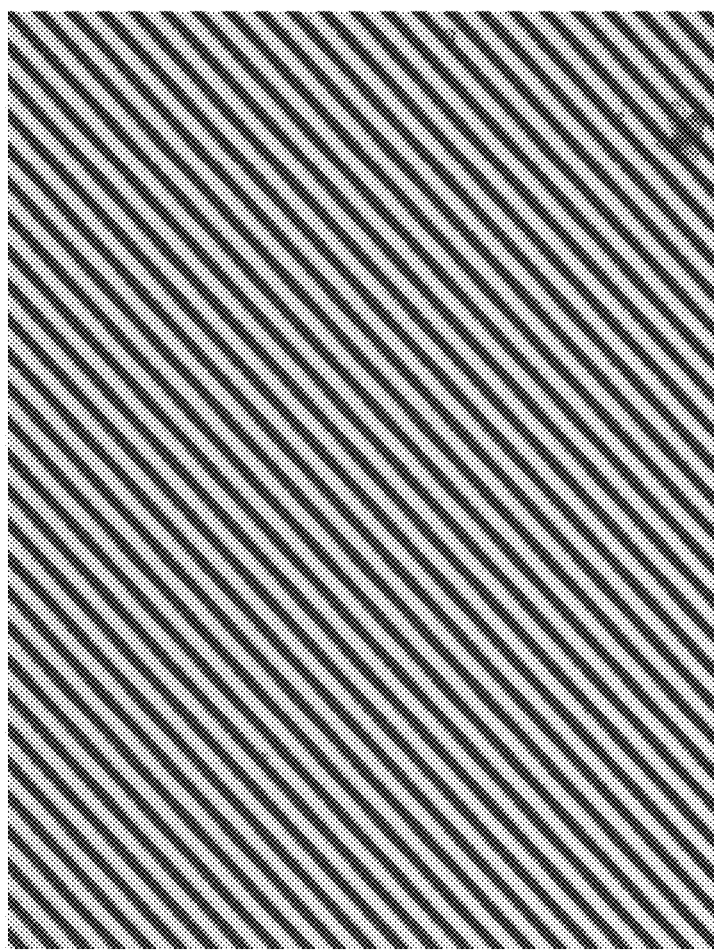
FIGS. 9A-9D are diagrams illustrating histogram results for one exemplary uniformly striped surface.
Figure 9B:
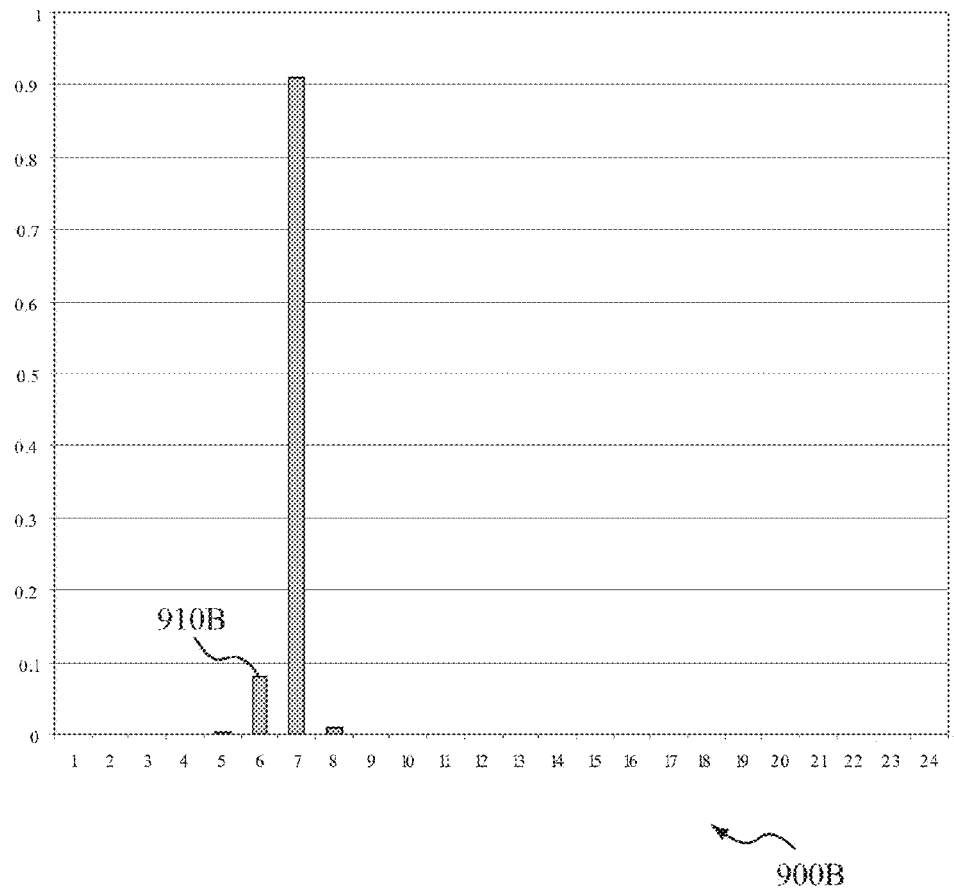

FIGS. 9A-9D illustrate the formation of an edge (or gradient) angle histogram for an ideal striped surface present in a focus region of interest. As will be described in more detail below, histograms may be utilized as part of the Z-height correction process. As shown in FIG. 9A, an ideal striped surface 900A has a nominal orientation angle, as will be described in more detail below with reference to FIGS. 9B and 9D. As shown in FIG. 9B, a histogram is formed by determining the actual edge angles associated with the various striped portions of the surface 900A of FIG. 9A. The various edge angles may be determined by known gradient direction analysis methods. The gradient direction, which is simply rotated 90 degrees relative to the corresponding edge orientation angle, may be used instead of the edge orientation angle as the basis for a histogram, if desired. The horizontal axis may be determined corresponding to a desired angle "step size". The vertical axis may be determined as a normalized frequency of occurrence for each angular step. The histogram 900B of FIG. 9B illustrates that since the edges of the striped portions of the surface are relatively consistent and parallel, the histogram shows most of the occurrences occurring at approximately the same orientation angle, with some slight deviation.

Figure 9C:
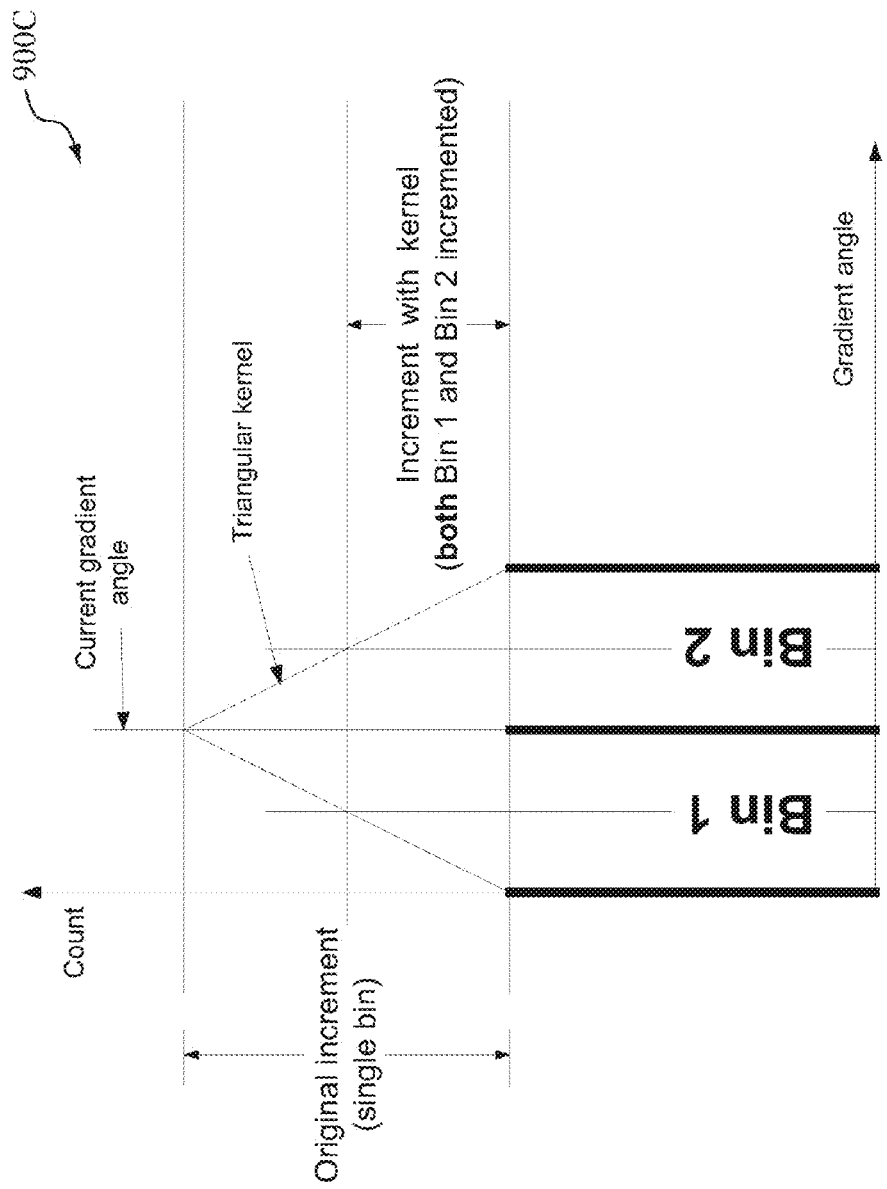
Figure 9D:
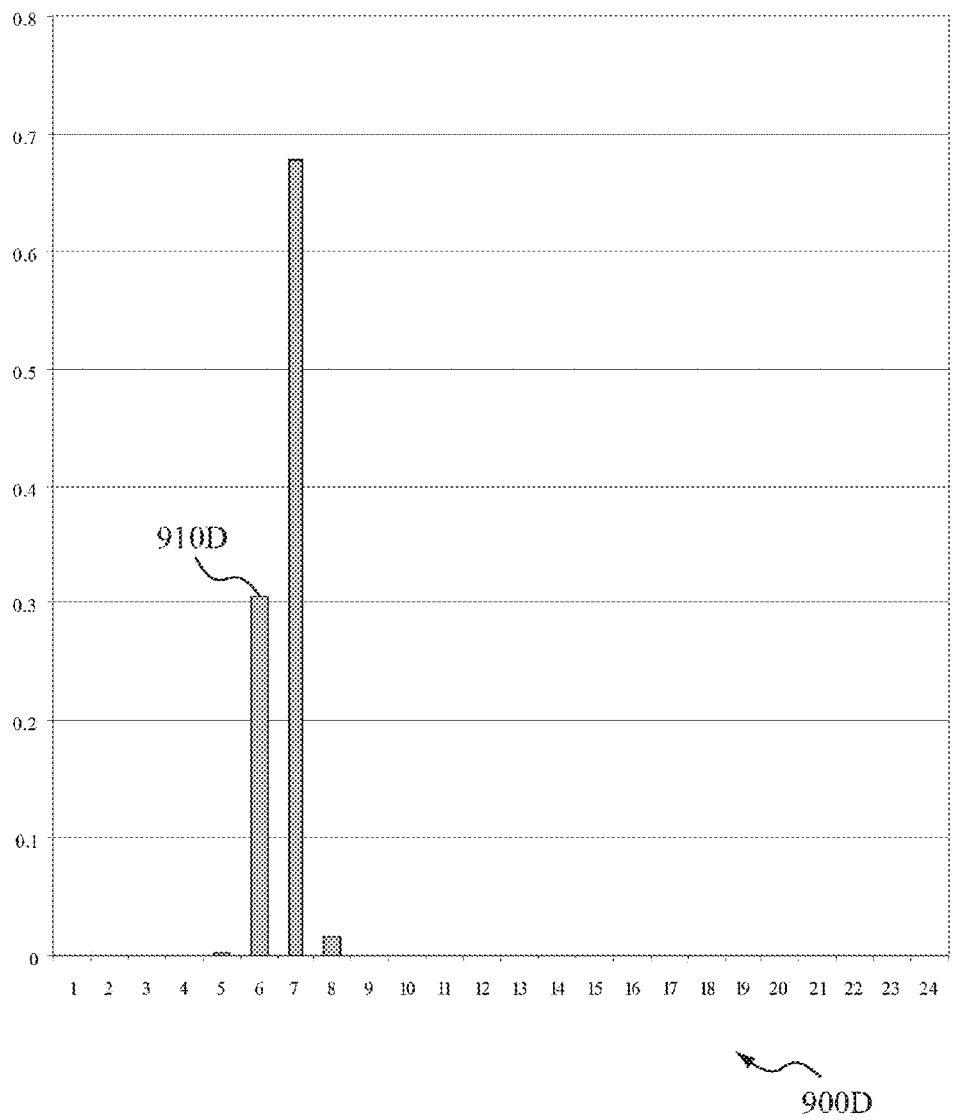

FIG. 9C is a diagram 900C illustrating the utilization of a triangular kernel as applied to "in between" angles during the formation of the histogram for the striped surface 900A. As described in more detail below, this may result in a histogram that more accurately reflects the distribution of edge (or gradient) angles. FIG. 9D illustrates the more accurate histogram that is formed through the utilization of the triangular kernel of FIG. 9C. The histogram of FIG. 9D is considered to be more accurate than the histogram of FIG. 9B, which did not use the triangular kernel, in that the higher value of the bin 910D (the sixth bin) in the histogram of FIG. 9D, as compared to the bin 910B (the sixth bin) of FIG. 9B, better reflects the actual nominal orientation angle of the pattern (which is actually "in between" the centers of the two histogram bins).

Figure 10A:
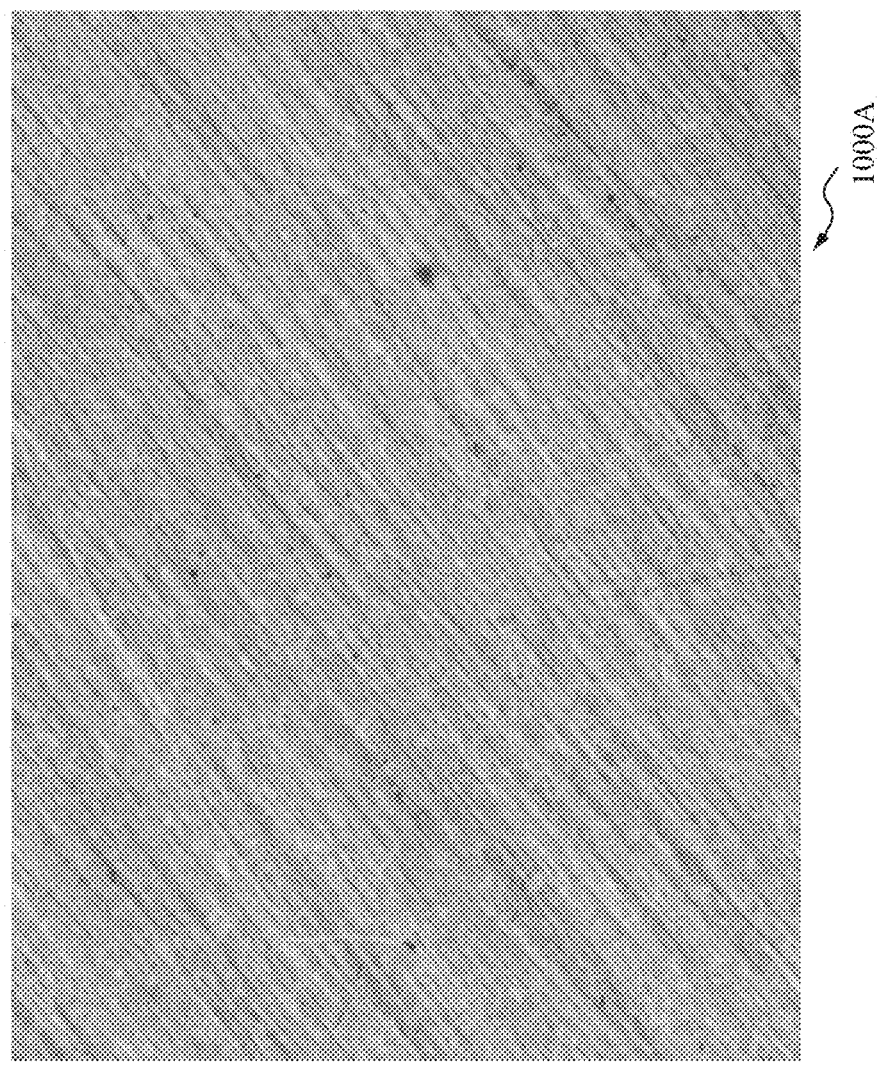
FIGS. 10A-10B are diagrams illustrating histogram results for one exemplary non-uniform textured surface.
Figure 10B:
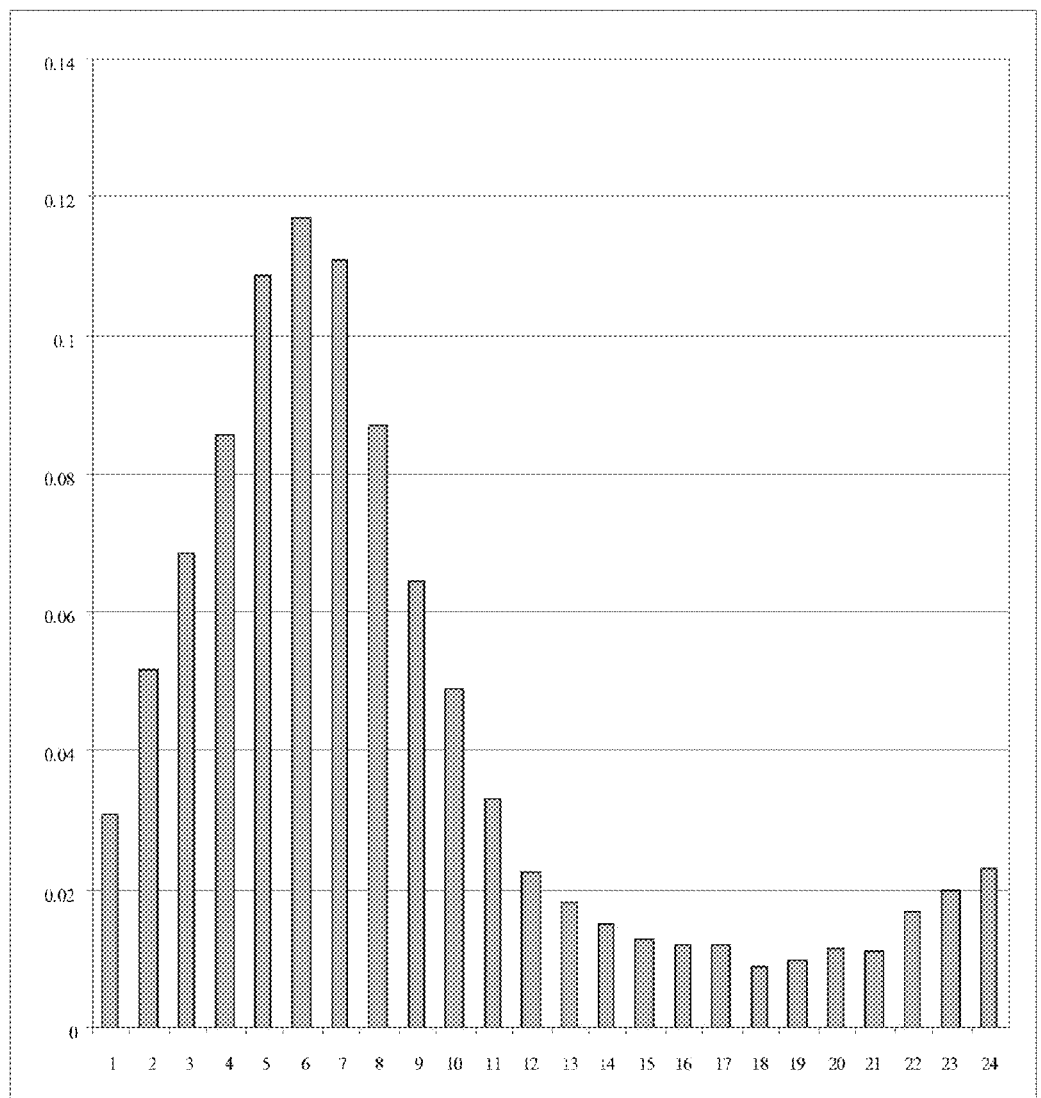

FIGS. 10A and 10B illustrate the formation of a histogram for a textured surface. As shown in FIG. 10A, the textured surface 1000A, which may correspond to a focus region of interest, includes texture features that are generally distributed over a relatively narrow range of orientation angles, and also includes a few features that fall outside the relatively narrow range. As shown in FIG. 10B, the histogram 1000B for the textured surface 1000A illustrates that there is a distribution of feature orientation angles, which reaches a peak in the angular range of the sixth bin of the histogram, and then tapers off to a lower normalized frequency for the bins at larger angular values of the histogram. As will be described in more detail below, this distribution of angular orientations illustrates part of the utility of histograms, in that in order to determine appropriate astigmatism error corrections for different directional or anisotropic surfaces, it is desirable to adapt the astigmatism error correction to the different directions of the feature edges included in a focus region of interest.

In one embodiment, histograms such as those shown in FIGS. 9D and 10B are formed by computing gradient magnitudes and directions for all pixels in an autofocus tool region of interest. The gradient magnitude is understood to be equal to the absolute value of the gradient, herein. In one embodiment, the computed directions are perpendicular to gradient directions in order to make them consistent with the edge direction data in a look-up table such as that of FIG. 6. The pixels for which gradient magnitudes are smaller than a certain (low) noise threshold may be discarded from consideration in embodiments where it is desirable to deal only with relatively "strong" edges, as compared to image noise or surface aberrations. If the image noise is significant, the region of interest could be additionally smoothed with a spatially-small averaging filter before the gradient magnitude and direction computation. The histogram H of the gradient directions is then created for all the remaining pixels. The histogram H is then normalized so that all its bins sum to 1.

It will be appreciated that in one embodiment, the option of discarding the low-gradient pixels and/or smoothing the region of interest image before computing gradients is not critical, since random (noise) gradient directions obtained for pixels with very weak gradients (most likely due to image noise) may form a uniform distribution (all gradient directions equally likely) and therefore affect all the histogram bins equally, without changing its shape or nominal value. Nevertheless filtering out the pixels with very weak gradient magnitudes may in some implementations improve the performance of the algorithm. In one embodiment, the gradient directions may be computed using a Sobel operator, for example, or any other known method for determining gradient directions throughout the focus region of interest.

In one embodiment for adapting an anisotropic (or astigmatism) error correction to a particular surface in the focus region of interest, with a gradient histogram H for a focus region of interest at a location in the field of view, and a look-up table L (similar to that represented in FIG. 6, for example) corresponding to that location in the field of view, a total or adapted anisotropic (or astigmatism) error correction C, which may be used for correcting the raw Z position determined by a conventional autofocus operation, may be computed as:

$$C = \sum_{a=0}^{N-1} H_a L_a \qquad \text{(Eq. 16)}$$

where N is the number of bins in the histogram (equal to the number of entries in the look-up table L), $H_a$ is the value of the a-th bin in the histogram and $L_a$ is the anisotropic (or astigmatism) error correction value (positive or negative) stored at the corresponding orientation angle or value of the look-up table L.

One important relationship is:

$$\sum_{a=0}^{N-1} H_a = 1 \qquad \text{(Eq. 17)}$$

which corresponds to normalizing the histogram.

Intuitively, the adapted anisotropic (or astigmatism) error correction is a weighted sum of anisotropic (or astigmatism) corrections corresponding to different edge orientation angles, with weights proportional to the "directional edge content" of the surface within the autofocus region of interest. Therefore, the directional texture characteristics of the measured surface (represented as the gradient direction histogram H) are used to influence the relative contributions of the anisotropic (or astigmatism) error corrections for different edge orientation angles. The above formula provides a method for determining reasonable anisotropic (or astigmatism) error correction values for all types of surfaces such as those with clearly defined directional structure (e.g., an "ideal" stripe pattern, such as that illustrated in FIGS. 3A and 3B or a textured pattern such as that illustrated as shown in FIG. 3C) as well as isotropic surfaces with no dominant gradient direction (e.g., an isotropic pattern such as that illustrated in FIG. 3D). It should be appreciated that determining an astigmatism error correction value according to this technique, and adding the static optical error correction value for the same location, produces an overall error correction result that is equivalent to determining the anisotropic error correction value according to this procedure for the same location.

In a further embodiment for adapting an anisotropic (or astigmatism) error correction to a particular surface in the focus region of interest, each histogram bin value, determined as previously described for example, can be further adjusted based on the gradient magnitudes of pixel contributing to the bin. A gradient magnitude may generally correspond to the sharpness, or "strength", of an edge. In one embodiment, a histogram bin is incremented by 1 (exponent of 0.0 applied to the absolute value of the gradient) for each pixel with a gradient angle within the bin's range. In another embodiment, a histogram bin is incremented by the square root of the absolute value of the gradient (exponent of 0.5 applied to the absolute value of the gradient) of each pixel with a gradient angle within the bin's range. In yet another embodiment, a histogram bin is incremented by the absolute value of the gradient (exponent of 1.0 applied to the absolute value of the gradient) of each pixel with a gradient angle within the bin's range. Incrementing the bin by the absolute value of the gradient emphasizes the stronger edges, which most likely have the strongest influence on the autofocus algorithm (contrast computation). However, due to the fact that the autofocus region of interest is a 2D structure and the gradient angle histogram is a 1D array, the influence of a single pixel on a contrast-type focus metric within a focus region of interest is smaller than its influence on the gradient angle histogram. This may lead to overcorrection if only a small number of high-gradient pixels are present in the region of interest. Thus, in some embodiments or applications it is desirable to increment the histogram bins by a fractional power of the absolute value of the gradient for the pixels in each bin. In one specific implementation, an exponent of 0.5 is utilized, which results in incrementing the histogram bins by the square root of the absolute values of the gradients, which has been found to produce desirable results.

In the previous discussion of histogram determination, a histogram is formed by computing gradient magnitudes and directions for all pixels in an autofocus tool region of interest. However, in another embodiment, a histogram may be formed by computing gradient magnitudes and directions for a sub-sample of pixels that are distributed relatively uniformly throughout a focus region of interest.

The previously described methods of error calibration and correction are generally described as applied to Z-height measurements determined based on surface focus operations. However, "edge focus" methods or tools are also commonly available in machine vision inspection systems. Handling of anisotropic or astigmatism errors arising during edge focus operations can be done in a manner similar to that described previously, the difference being to replace each instance of a surface focus operation with the edge focus operation, both during calibration procedures and during workpiece inspection operations. Once the error calibration data is determined and stored, the process of determining the gradient directions within the region of interest, creating the histograms and computing the total adapted Z correction does not significantly slow down an autofocus operation in various embodiments. The process is not computationally intensive and the autofocus region of interest is usually only a small fraction of the entire field of view. In one example embodiment, the observed slow down of autofocus in an actual implementation ranges from 1% to 3% and depends on the selected autofocus speed (more slowdown for higher speed, lower accuracy, autofocus operations) and autofocus region of interest size (more slowdown for larger regions of interest).

The present application is intended to provide a corrected Z-height measurement value that is independent of workpiece surface characteristics and their orientation angle, and also independent of the measurement location in the field of view. In some embodiments, corrected Z-height measurements may deviate from those that would correspond to the actual or theoretical best focus position. For this reason, it is generally desirable to output the corrected Z-height measurements values as inspection measurement results, not to actually incorporate the various error corrections physically into an autofocus operation, or to move the machine vision inspection system to a corrected Z-height value. For example, a primary purpose of an autofocus operations is frequently just to provide a sharply focused image that provides a good basis for X and Y measurements. Adjusting physical positioning or movement operations according to the various error corrections would thus be counterproductive for this purpose. In some embodiments, the Z-height correction of output values may be switched on and off manually or automatically. The switching of the Z correction on and off could be done automatically depending on the type of the autofocus tool run by the user. Some commercially available machine vision inspection systems include an "autofocus tool with point", which would use "Z correction on", since the returned or output measurement values are the (X,Y,Z) coordinates to be used for dimensional measurements, or the like. In contrast, an "autofocus tool without point" could use "Z correction off", since the primary goal of this tool may be obtaining sharp images for X and Y measurements (no measurement coordinates are returned).

Figure 11A:
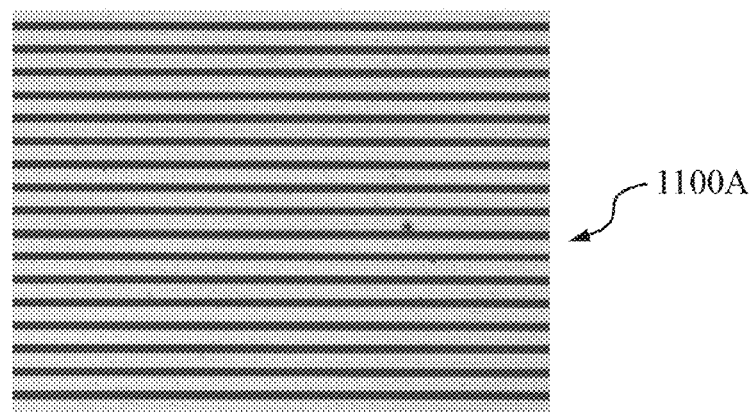
FIGS. 11A-11B are diagrams illustrating uncorrected and corrected measurement results for a striped surface.
Figure 11B:
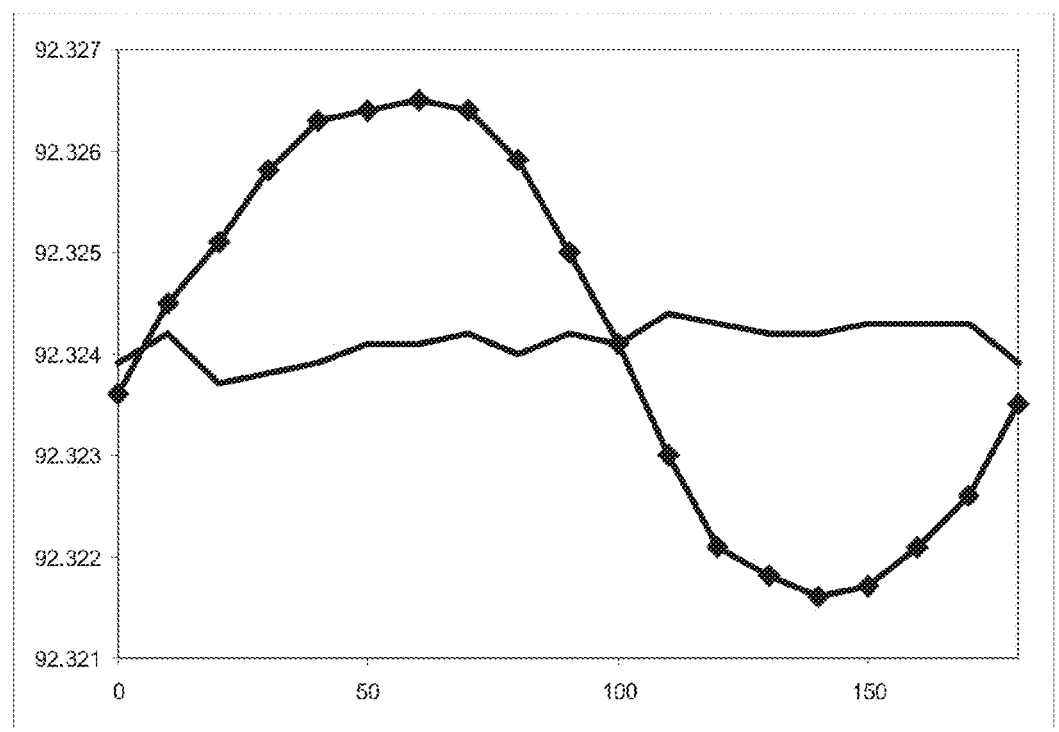
Figure 12A:
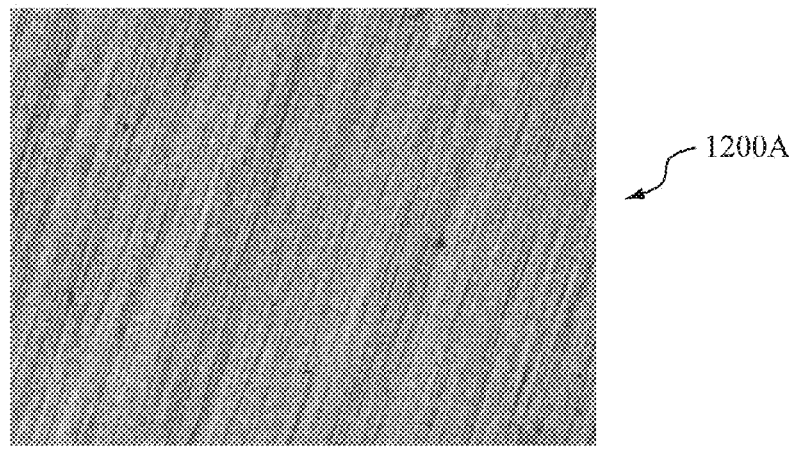
FIGS. 12A-12B are diagrams illustrated uncorrected and corrected measurement results for a textured surface.
Figure 12B:
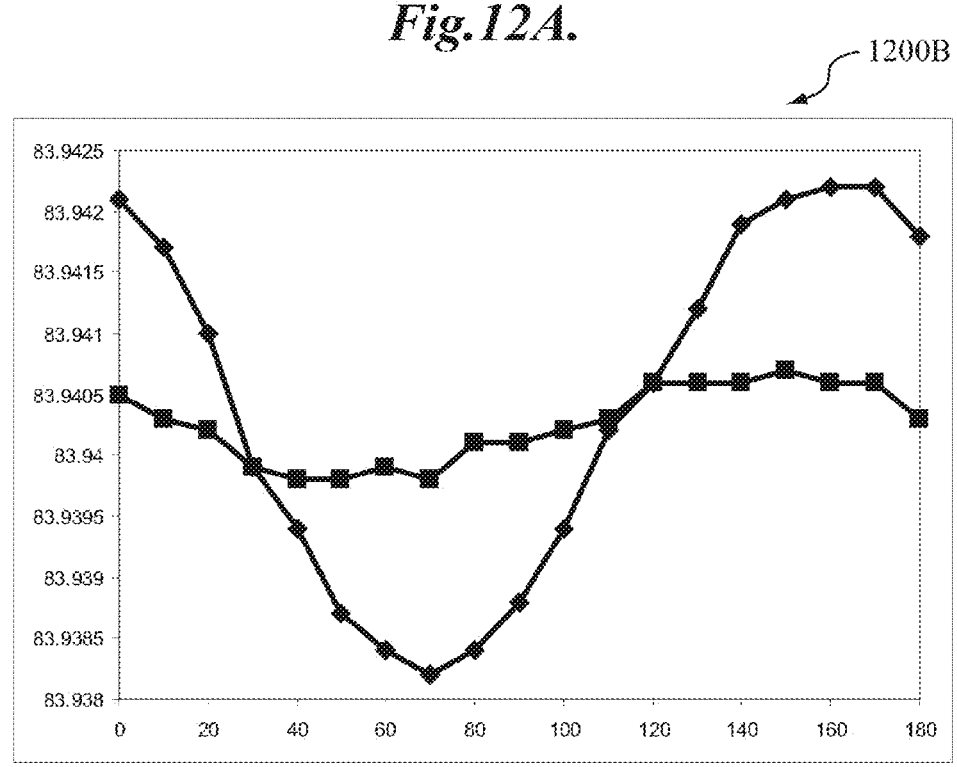
Figure 13A:
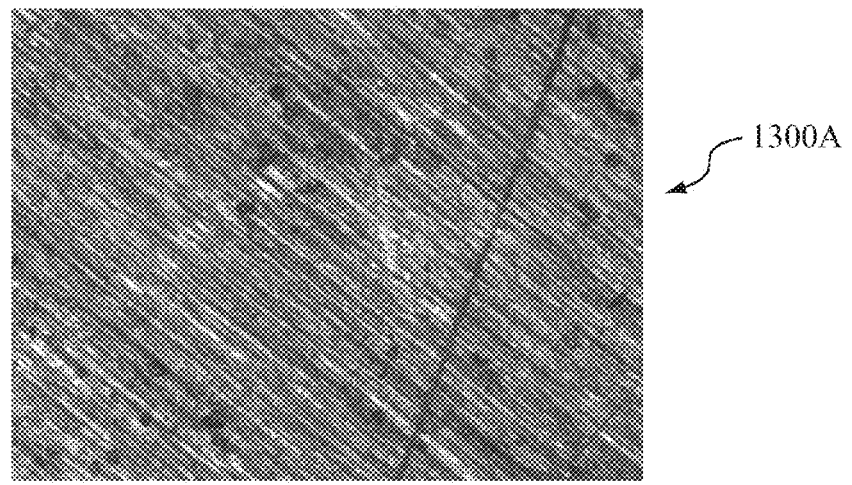
FIGS. 13A and 13B are diagrams illustrating uncorrected and corrected measurement results for a rough textured directional surface including an abnormally-oriented scratch.
Figure 13B:
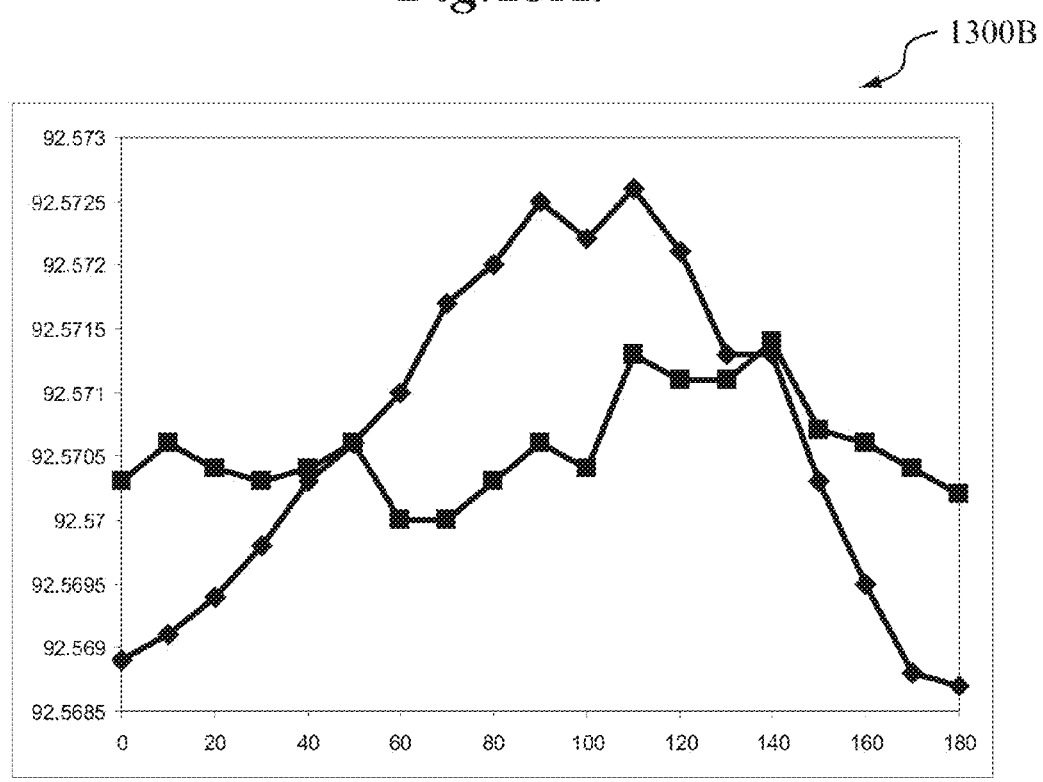

FIGS. 11-13 are diagrams illustrating uncorrected and corrected Z-height measurement results for different surfaces. FIGS. 11A, 12A, and 13A are diagrams of example surfaces including an ideal striped surface 1100A, a directionally textured surface 1200A, and a rough textured surface 1300A, respectively. FIGS. 11B, 12B, and 13B are graphs 1100B, 1200B, and 1300B, respectively, of uncorrected and corrected Z-height measurement results for each of the respective surfaces for various orientation angles at a fixed location in the field of view. In each case the vertical axis units are millimeters and the horizontal axis shows the orientation angle in degrees. As shown in FIG. 11B, for the striped surface 1100A of FIG. 11A, the corrected Z-height measurement results provide a Z-height variation of only 0.7 microns over the full range of orientation angles, as compared to the original 4.9 micron Z-height variation of the uncorrected measurement results. As shown in FIG. 12B, for the textured surface 1200A of FIG. 12A, the corrected measurement results show a Z-height variation of only 0.9 microns over the full range of orientation angles, as compared to a 4.0 micron Z-height variation in the uncorrected measurement results. As shown in FIG. 13B, for the rough textured surface 1300A of FIG. 13A, the corrected measurement results provide a Z-height variation of only 1.4 microns over the full range of orientation angles, as compared to an original 3.9 micron Z-height variation for the uncorrected measurement results. Thus, in these specific examples, for various anisotropic surfaces, the anisotropic error correction method (or equivalently, the astigmatism+static optical error correction method) of the present application has reduced the Z-height astigmatism error component by approximately 40% to 80%.

Any static optical errors included in the data sets shown in the FIGS. 11B-13B do not contribute to the variations of each data set, because the measurement location in the field of view is the same throughout each set. That is, a static optical error, if any, contributes equally to each measurement. Nevertheless, in other tests that analyzed static optical error components, measurement variations at various locations in the field of view due to uncorrected static optical errors have been on the order of a few microns or more, and have been reduced very significantly by the error calibration and correction techniques described previously.

Figure 14:
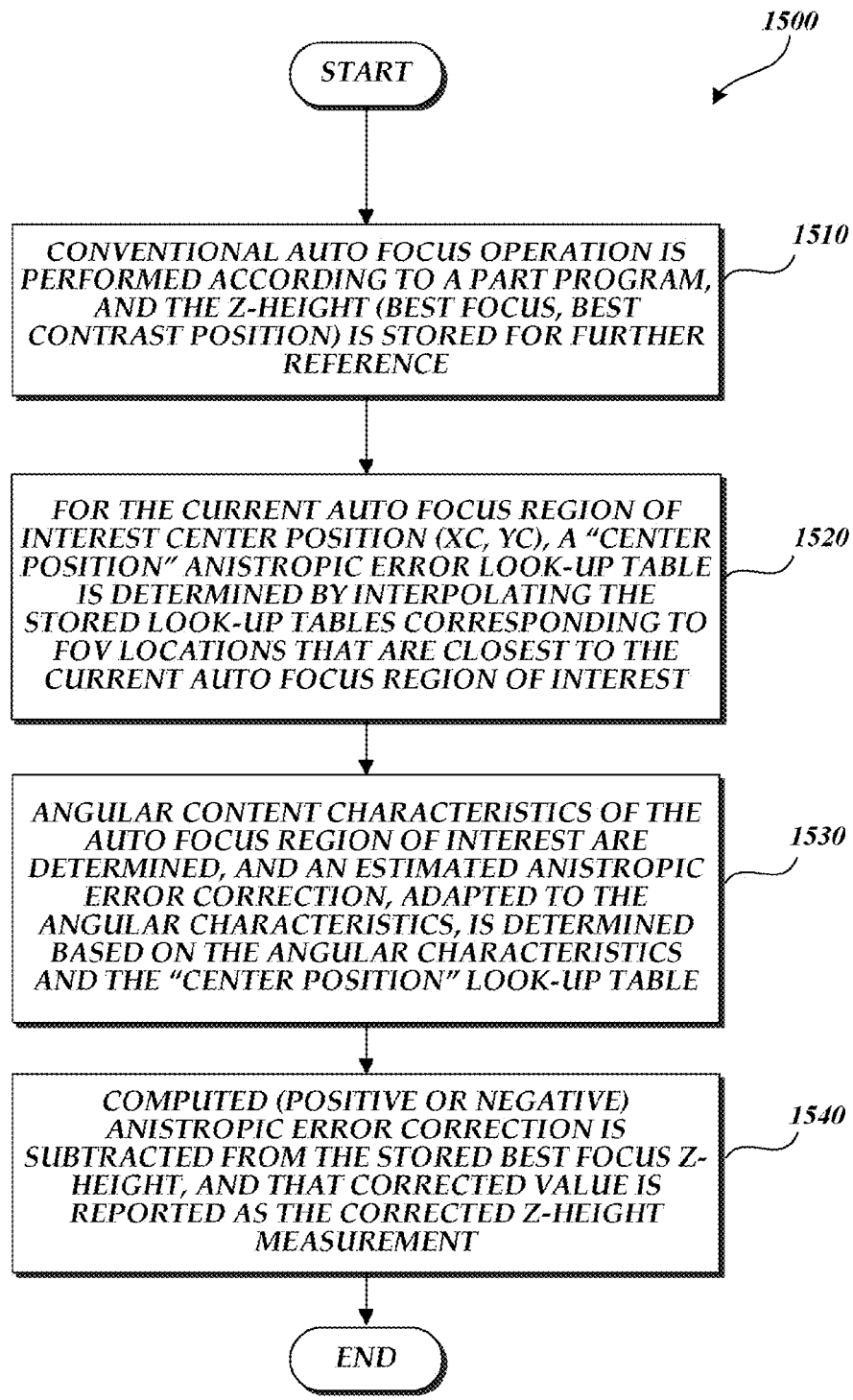
FIG. 14 is a flow diagram illustrative of one exemplary routine for a run-time operation for producing corrected Z-height measurements in accordance with the present application.

FIG. 14 is a flow diagram illustrative of one exemplary run-time routine 1500 for using stored anisotropic error look-up tables, determined according to methods previously described with reference to FIG. 5 and elsewhere herein, to determine an anisotropic error correction value for a Z-height measurement performed on a workpiece surface located in an autofocus region of interest. Various aspects of this method may be better understood by referring to the description of various anisotropic error correction value determining operations described above with respect to FIGS. 7-10. As shown in FIG. 14, at a block 1510 a conventional autofocus operation is performed according to a part program, and the resulting raw Z-height measurement (e.g., the best focus, best contrast position) is stored for further reference. At a block 1520, for a current autofocus region of interest center position (e.g., XC, YC), an estimated anisotropic error look-up table is determined for this location by interpolating the stored look-up tables that are for field of view locations closest to the current autofocus region of interest. Various applicable interpolation techniques may be utilized, such as bilinear, biquadratic, or bicubic interpolation. It is noted that bilinear interpolation requires at least four stored look-up tables, biquadratic interpolation requires nine look-up tables and bicubic interpolation requires sixteen look-up tables.

At a block 1530, the angular content characteristics, that is, the orientation angle content characteristics, of the surface image in the autofocus region of interest are determined or characterized, and an estimated anisotropic error correction adapted to the particular surface in the autofocus region of interest is determined based on the angular content characteristics and the anisotropic error look-up table estimated at the block 1520. In one embodiment, the angular content characteristics may be embodied in an angular content histogram similar to one of those previously described, and the adapted anisotropic error correction is determined as previously described with reference to EQUATIONS 16 and 17. At a block 1540, the computed (positive or negative) correction is subtracted from the Z-height measurement stored at block 1510, and the corrected Z-height value may be reported as a corrected Z-height measurement.

Figure 15:
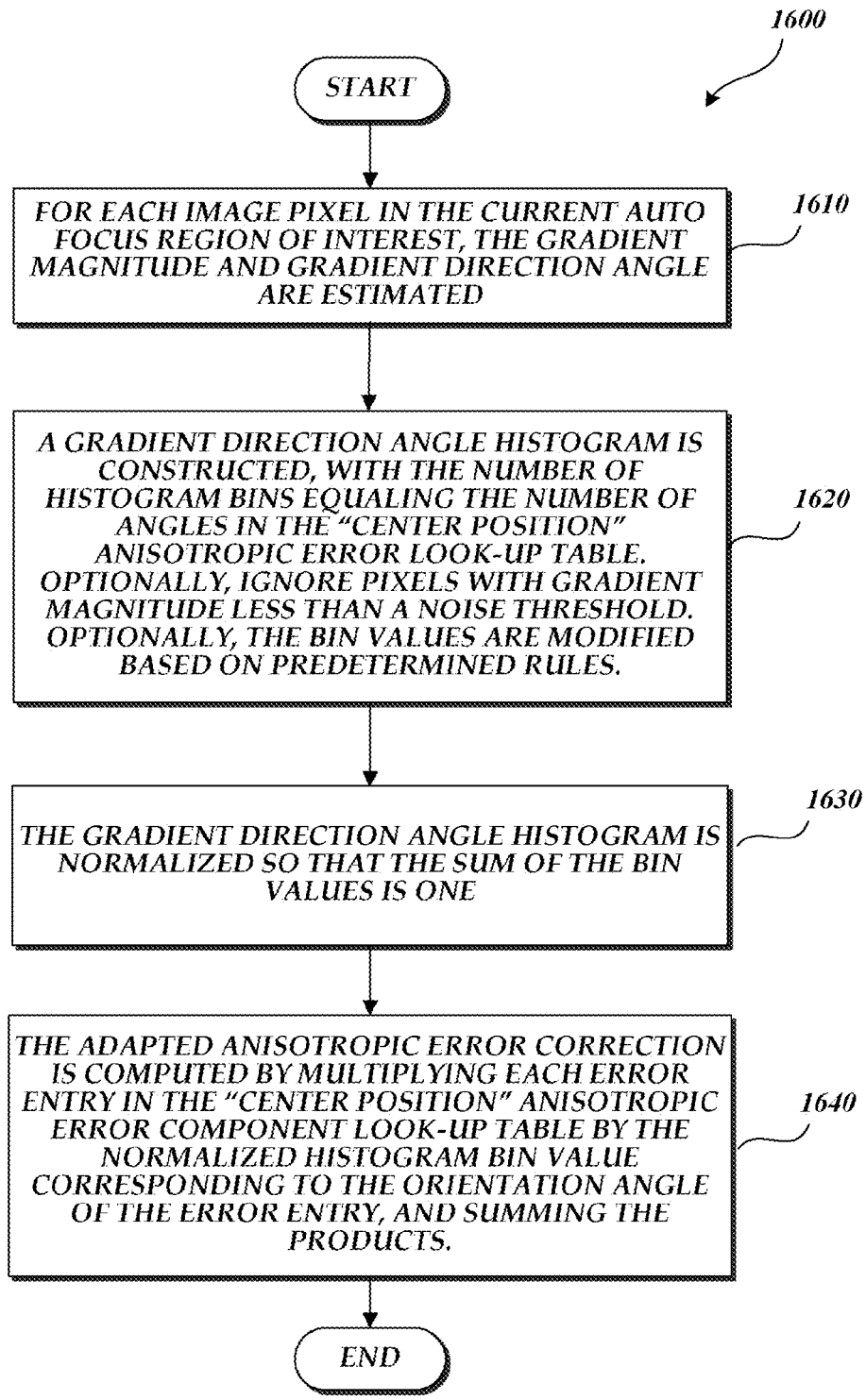
FIG. 15 is a flow diagram illustrative of one exemplary routine for performing the angular characteristics determination and look-up table reconstruction operations of FIG. 14.

FIG. 15 is a flow diagram illustrative of one exemplary routine 1600, which may be utilized to perform the operations of the block 1530 of FIG. 14. At a block 1610, for each image pixel in the current autofocus region of interest, the gradient magnitude and gradient direction angle are determined. In one embodiment, a Sobel operator or a similar known operator may be used to determine the gradient magnitude and angle. At a block 1620, in a first embodiment a gradient direction angle histogram is constructed using the absolute values of the determined gradients. In another embodiment, each bin of the gradient direction angle histogram is further incremented, for each pixel in the bin, by the absolute value of the gradient of the pixel raised to a predetermined power (exponent value) between zero and one. In a modification of the second embodiment, before incrementing, pixels are disregarded which have an absolute gradient magnitude smaller than a specified threshold T. In another embodiment, the absolute value of the gradient of each pixel may be raised to a predetermined power (exponent), and a histogram compiled based on those values, to make the effect of a single "directional" pixel on the Z-correction closer to the effect of that pixel on the autofocus contrast computation. The predetermined power may be determined by analysis or experiment. Typically, it may fall in the range of zero to two. In one embodiment, it may be set at 0.5. In any of these embodiments, the number of histogram bins may be made to be equal to the number of orientation angles used for the anisotropic error calibration look-up table determined at block 1520, and their center values may correspond to those orientation angles. A triangular or other kernel (effectively a kernel estimator) may be utilized while compiling and incrementing the histogram bins in order to obtain a smoother histogram and reduce undesirable effects due to bin discretization.

At a block 1630, the histogram determined at block 1620 is normalized so that the sum of its bin values is 1. At a block 1640, an anisotropic error correction adapted to the particular surface in the autofocus region of interest is determined by multiplying each orientation angle entry from the anisotropic error look-up table determined at block 1520 of FIG. 14 by the bin value corresponding to that orientation angle in the normalized histogram determined at block 1630, and summing the resulting products.

Figure 16:
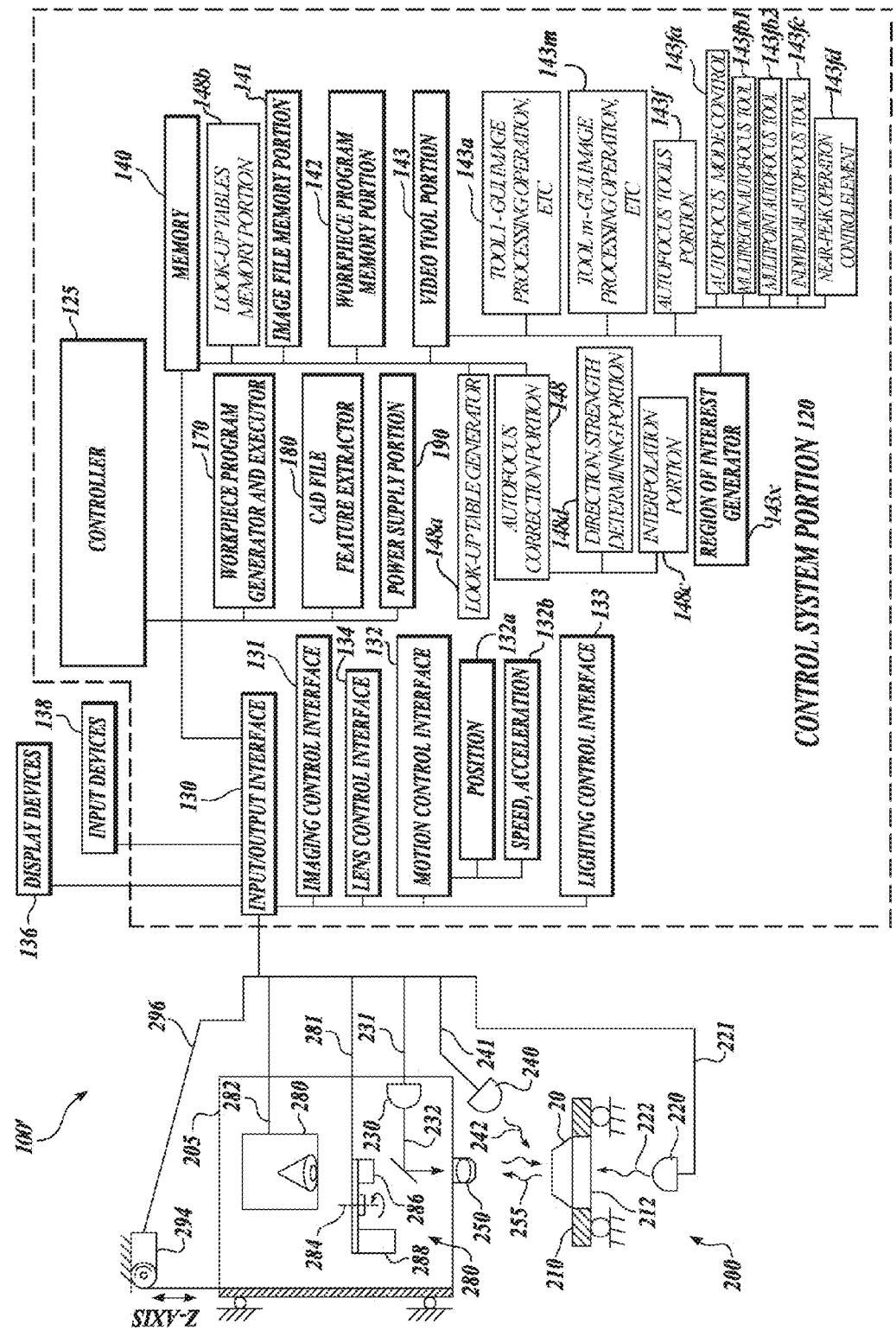
FIG. 16 is a diagram of a control system portion and a vision components portion of a machine vision inspection system similar to FIG. 2 and also including an autofocus tools portion, a set of autofocus tools, and a near-peak operations control element.

FIG. 16 is a diagram of a control system portion 120 and a vision components portion 200 of a machine vision inspection system 100', similar to FIG. 2, and also including a more explicitly illustrated autofocus tools portion 143$f$, which includes a various autofocus tools, a near-peak operation control element, and related elements. In one embodiment, one or more of the autofocus tools 143$f$b1, 143$f$b2, 143$f$c, etc. of FIG. 16 may correspond to the autofocus tool 145 of FIG. 2, as will be described in more detail below. It will be appreciated that the remaining components of FIG. 16 are similar to the components of FIG. 2 and may be understood by analogy, unless otherwise indicated below.

As shown in FIG. 16, in various embodiments according to this application, the video tool portion 143 includes the autofocus tools portion 143$f$, which provides various operations and features related to multi-region and multi-point autofocus operations, as will be described in more detail below. Certain portions of the autofocus tools portion 143$f$ for the multi-region autofocus operations are described in more detail in U.S. patent application Ser. No. 11/489,030, filed Jul. 18, 2006, (the '030 Application) which is commonly assigned and hereby incorporated by reference in its entirety. In one embodiment, the autofocus tools portion 143$f$ may include an autofocus mode control 143$f$a, video tools such as a multi-region autofocus tool 143$f$b1, a multi-point autofocus tool 143$f$b2, and/or an individual autofocus tool 143$f$c, and a near-peak operation control element 143$f$d. Briefly, the individual autofocus tool 143$f$c performs operations associated with providing a single Z-height measurement for a single overall or primary region of interest of the tool (e.g., a comprehensive region of interest bounded by a video tool region of interest boundary in a graphical user interface). The individual autofocus tool 143$f$c may also autofocus the camera and report the Z height of the camera position corresponding to best focus. The multi-region autofocus tool 143$f$b1 may perform similar Z height measurement operations associated with providing multiple respective Z-height measurements for multiple respective primary regions of interest indicated by the multi-region autofocus tool (e.g., as described in the '030 Application). The multi-point autofocus tool 143$f$b2 may perform similar Z height measurement operations associated with providing multiple respective Z-height measurements for multiple respective secondary regions or sub-regions of interest, which may be associated with respective measurement points located within a primary region of interest indicated by the multi-point autofocus tool.

The autofocus mode control 143fa performs operations, as outlined herein, to determine and/or control which of the autofocus tools (e.g., the multi-region autofocus tool 143fb1, the multi-point autofocus tool 143fb2, or the individual autofocus tool 143fc) and/or tool modes is activated. The near-peak operation control element 143fd is generally intended to identify images that are sufficiently focused such that they may be used for Z height correction operations according to this application, and also to govern, or assist in governing, certain conditional data storage and/or processing operations, based on whether a focus characterization for a current region or subregion of interest that is analyzed for a "current" image of image stack is better than a previously determined focus characterization for that region or subregion of interest. In some embodiments, the near-peak operation control element 143fd may comprise distinct circuits and/or routines that provide the various functions associated with a near-peak operation control element as outlined herein. However, it should be appreciated that in other embodiments those near-peak operations and control functions and may alternatively be provided by elements which are merged with and/or indistinguishable from other parts of control system portion 120.

In some embodiments, the near-peak operation control element 143fd may be used to reduce or minimize memory requirements, and certain data storage and/or processing operations, in order to efficiently provide corrected Z height measurements for a large number of measurement positions. Generally, the best focus characterization will occur at a focus position that is near to the peak of a focus curve. The name of the "near-peak" operation control element 143fd reflects the emphasis that is placed on storage and/or analysis of data proximate to, or corresponding to, the peak of a focus curve, in various embodiments. The generic determination and use of focus curves in relation to autofocus and height measurement operations is generally known in the art, for example, as described in detail in U.S. Pat. No. 7,030,351, which is hereby incorporated by reference in its entirety.

It should be appreciated that alternative configurations are possible for the autofocus tools portion 143f. For example, the multi-region autofocus tool 143fb1, the multi-point autofocus tool 143fb2, and the individual autofocus tool 143fc may include mode control functions such that a separate mode control portion 143fa may be omitted. Alternatively, the autofocus tools portion 143f may provide one or more generic autofocus tool elements, and the mode control portion 143fa may provide operations that govern the user interface and interrelationships of the generic autofocus tool elements in a manner that depends on whether multi-region autofocus tool behavior, multi-point autofocus tool behavior, or individual autofocus tool behavior, is desired. In such a case, the circuits, routines, or applications that provide the operations of the multi-region autofocus tool 143fb1, multi-point autofocus tool 143fb2, and/or the individual autofocus tool 143fc, may be merged and/or indistinguishable. More generally, this application may be implemented in any now known or later-developed form that is operable in conjunction with the machine vision inspection system 100 to provide the features disclosed herein in relation to various autofocus Z height measurement operations.

For the operation of the multi-region autofocus tool 143fb1, the multi-region autofocus mode provides multiple respective Z height measurements that correspond to multiple respective primary regions of interest (ROI) of the tool. During a learning mode of operation, a new multi-region set of primary regions of interest may be defined and/or displayed when the user selects (or continues in) the multi-region autofocus tool mode of operation as the current mode of operation and defines a first member region of interest of the new multi-region set. The user may then define a second member region of interest of the set while the current mode of operation is the multi-region autofocus tool mode. The user may interrupt the multi-region autofocus tool mode and perform an operation unrelated to this mode. The user may subsequently resume the multi-region autofocus tool mode and define additional members of the set. Generally, the set members corresponding to a particular instance of the multi-region autofocus tool 143fb1 may all be defined and represented (e.g., by respective region of interest boundaries in a graphical user interface of the multi-region autofocus tool 143fb1) in a single image or field of view. Thus, all of the respective Z height measurements associated with a particular instance of the multi-region autofocus tool 143fb1 may be determined based on a single, global, image stack. The multi-region autofocus tool 143fb1 may be best suited for faster measurement of multiple discrete surface regions in a field of view, each of which may tend to be at a distinct Z height.

For the operation of the multi-point autofocus tool 143fb2, the multi-point autofocus mode provides multiple respective Z height measurements that correspond to multiple respective secondary regions or sub-regions of interest, which may be associated with measurement points located within a primary region of interest indicated by the multi-point autofocus tool (e.g., by a "global" region of interest boundary in a graphical user interface of the multi-point autofocus tool 143fb2). For example, in some embodiments, the operations of the multi-point autofocus tool 143fb2 automatically or semi-automatically subdivide an indicated region of interest into a grid of Z height measurement points, where each measurement point is surrounded by an automatically defined subregion of interest associated with that point. In various embodiments, the sub-regions of interest (also referred to as secondary regions of interest) are not displayed to the user. In any case, Z. height measurement determined for a particular measurement point is based on the subregion of interest associated with that point (e.g., a 5×5 pixel subregion centered at the measurement point). In some embodiments the size of a subregion associated with a particular measurement point may depend on the density of the surrounding measurement point grid (e.g., a grid pitch of 50 pixels, 10 pixels, or 5 pixels or less, etc.). In some embodiments, a user may select the measurement point grid spacing in pixels, or X and Y measurement units, or implicitly as a number of points to be returned within the primary region of interest.

It will be appreciated that while both secondary or sub-regions of interest and global, overall or primary regions of interest may be referenced as "regions of interest" or ROIs herein, that when the multi-point autofocus tool is being discussed the "regions of interest" or "ROIs" that are referred to are generally the respective sub-regions of interest associated with the respective Z height measurement points, unless otherwise indicated explicitly or by context. During a learning mode of operation, a new multi-point global region of interest may be defined and/or displayed when the user selects the multi-point autofocus tool mode of operation as the current mode of operation and draws or defines a boundary of the multipoint autofocus tool primary region of interest. A number (e.g., "n×m") of Z height measurement points and/or sub-regions of interest are then defined within the primary region of interest, either by the user, or based on automatic default values. Generally, the primary region of interest corresponding to a particular instance of the multi-point autofocus tool 143fb2 may all be defined and represented (e.g., by respective region of interest boundary in a graphical user interface of the multi-point autofocus tool 143fb2) in a single image or field of view. Thus, all of the respective Z height measurements associated with the respective measurement points and/or subregions of a particular instance of the multi-point autofocus tool 143fb2 may be determined based on a single image stack. The multi-point autofocus tool 143fb2 may be best suited for fast measurement of a large number of measurement points that define the contours or 3D shape of a surface region within a field of view.

The "autofocus" operations used to determine the respective Z heights associated with the respective regions of interest of a multi-region tool or respective subregions of interest of a multi-point tool may include analyzing a set (or "stack") of images over a Z-height search range that is estimated or defined to include a plurality, or all, of the expected Z-height values corresponding to the multi-region or multi-point tool. The stack of images may be acquired during continuous motion over the Z-height search range. The search range may be set to a default range, or defined by a user, or defined based on operations during a learn mode (e.g., based on the Z-height positions used while defining a multi-region or multi-point set, or by one or more automatic autofocus operations, or the like). A default search range may also be determined based at least partially on a current optical configuration.

As previously indicated, in some embodiments, the near-peak operation control element 143fd may be used identify images that are sufficiently focused such that they may be used for Z height correction operations according to this application, and in some embodiments to assist in governing certain conditional data storage and/or processing operations, with the underlying intent of reducing memory requirements, and/or certain data storage and/or processing operations, in order to efficiently provide corrected Z height measurements for a large number of measurement positions. The near-peak operation control element 143fd may operate in the context of a multi-region autofocus mode and/or tool, or the context of a multipoint autofocus mode and/or tool. In some embodiments, the operation of the near-peak operation control element 143fd may be based on whether a focus characterization (e.g., an image sharpness metric) for a current region or subregion of interest for a "current" image of an image stack is better than a previously determined focus characterization for that region or subregion of interest in a different image of the image stack. A better "current" focus characterization indicates that the corresponding "current" image corresponds to a height that is closer to the best focus peak of a focus curve, in comparison to previously analyzed images, as described in greater detail below.

As outlined previously, various difficulties may arise with regard to analyzing the Z height of multiple regions and/or subregions of interest with high throughput (e.g., for multi-region or multi-point autofocus tools), and particularly when considering memory and/or processing operations required for correcting each Z height for anisotropic errors according to this application. For example, it should be appreciated that when multiple regions of interest are being analyzed there is no longer a single "in focus" position or "best focus" Z-height that universally applies to each region and/or subregion of interest, since each of the multiple regions and/or subregions of interest can have different heights. Furthermore, it may be impractical to move the workpiece stage or camera repeatedly to provide separate image stacks, and/or separate final "best focused" autofocus images for each region and/or subregion of interest, because providing the necessary mechanical motion is generally the most time-consuming (throughput limiting) aspect of an autofocus height determination. Furthermore, in some embodiments or applications, the amount of memory and/or hardware operations required for analyzing multiple regions and/or subregions of interest may become impractical, or at least undesirably slow, in relation to reasonable throughput expectations and real-time inspection operations. Thus, to avoid mechanical motion bottlenecks in various embodiments, it may be advantageous for a single global image stack to be acquired and used as the basis for an entire multi-region and/or multi-subregion height determination process, as described in greater detail below. In addition, it may be advantageous in various embodiments to base the orientation angle analysis operations outlined herein (in relation to respective Z height corrections) on respective image portions available within the global image stack, rather than on portions of additional "best possible" images acquired separately at the best possible focus position (e.g., separate images acquired at the determined Z-height or focus curve peak position).

With regard to determining respective Z height corrections based on respective image portions available within the global image stack, it should be appreciated that while a best possible focus image (e.g., one acquired at a focus curve peak) may allow the most accurate or repeatable determination of the orientation angle content characteristic that is used as the basis for Z height correction, in some embodiments or applications the orientation angle content characteristic may be determined or estimated with sufficient accuracy based on any sufficiently focused image. As previously indicated, the near-peak operation control element 143fd (e.g., a circuit or routine) may identify such sufficiently focused images and or govern related operations, for example as outlined below. In some embodiments the near-peak operations control element 143fd may also be associated with determining the corresponding orientation angle content characteristic and/or Z height correction.

In some embodiments, a suitable sufficiently focused image portion may be insured by the near-peak operations control element 143fd selecting from the global image stack an image portion that has a focus metric that exceeds a threshold value known to correspond to relatively good focus (e.g., as established by experiment or analysis). In other embodiments, a sufficiently focused image portion may be insured by selecting from the global image stack the image portion that has the highest focus metric available for that portion in comparison to other images in the image stack. In other embodiments, a sufficiently focused image portion may be insured by selecting the image portion included in an image of the image stack that is sufficiently close, or closest, to an uncorrected best focus Z height that has been determined for that portion. These alternative embodiments are described in greater detail below. In any case, it will be appreciated that any of the aforementioned methods may provide an angular content characteristic based on a region or subregion of interest from an image corresponding to a Z height that is proximate to the best focus uncorrected Z-height for that region of interest, which may provide a sufficiently accurate Z height correction in various embodiments or applications according to this application.

In some embodiments, the near-peak operation control element 143fd determines if the current focus characterization is better than a previously determined "running best" focus characterization, (e.g., it has focus metric value that is greater than a previously determined "running best" focus metric value), then it is stored or otherwise identified as the new "running best" focus characterization for that region or subregion of interest. In some embodiments, after the entire global image stack has been analyzed for a region or subregion of interest, the final running best focus metric may be used to identify the best focused image in the image stack (for the corresponding region or subregion of interest), which may then be used to determine the corresponding orientation angle content characteristic that is used for determining the corresponding Z height correction. In other embodiments, when a new "running best" focus characterization is determined corresponding to a particular region or subregion in a particular image of the stack, that condition may trigger near-peak operation control element 143fd to store the corresponding portion of that particular image for potential later use for Z height correction. In such embodiments, the stored new "running best" data may supersede similar previously stored running best data, which may then be deleted to conserve memory, e.g., as described below with respect to FIG. 18A.

It will be appreciated that in such embodiments, the stage does not need to be moved back to a "best focus" position in order to acquire an image that is sufficiently focused for characterizing the angular content of a region or subregion of interest. Rather, the angular content may be characterized and the Z-height correction determined for a region or subregion of interest based on the corresponding stored "running best" focus characteristic and/or image data.

In some embodiments, further memory savings may be achieved by storing a lesser amount of data associated with derived "running best" angular content characteristics (e.g., angular content histograms, or weighting coefficients, etc.), or even the resulting Z-height corrections for a region or subregion of interest, rather than storing the running best image portions themselves. Some example embodiments that employ this principle are described below with respect to FIGS. 18B and 18C.

It will be appreciated that each of the conditional operation methods outlined above, in comparison to prior art methods, may result in significantly reduced memory and storage requirements as images are acquired and processed during autofocus Z height determining operations. That is, image data (e.g., region or subregion data in various images in an image stack) may be suppressed or deleted at the earliest advantageous time (e.g., sequentially, during analysis), rather than acquired and retained until an entire image stack is completely analyzed. In one particular example embodiment, for non-overlapping regions or subregions of interest, the total amount of simultaneously stored information may be small enough to not exceed the size of a single image. In practice, these considerations may be especially important due to certain existing practical hardware/software limitations (e.g., application memory allocation limits imposed by 32-bit operating systems.) Other alternatives to overcome these limitations may be technically and practically unappealing (e.g., requiring non-standard hardware and/or software approaches). In addition, the conditional operation methods outlined above may also significantly reduce processing time and increase throughput for Z height determining operations, particularly when providing anisotropic error correction for Z heights in multi-point auto focus tools with large number of measurement points or subregions. Furthermore, the methods in certain embodiments integrate well with current autofocus tools (e.g., multi-region or multi-point autofocus tools in certain existing products). For example, adding operations related to maintaining a running maximum for a focus metric and managing the conditional storage of related image data, or angular content characteristics or histograms, together with all the necessary processing functions, is compatible with existing software objects and/or autofocus routines in certain QVPAK® vision inspection systems described above. Specific exemplary implementations of the methods of the present application that are advantageous for efficient determination of corrected Z height measurements for a large number of measurement positions will be described in more detail below with respect to FIGS. 17 and 18A-18C.

Figure 17:
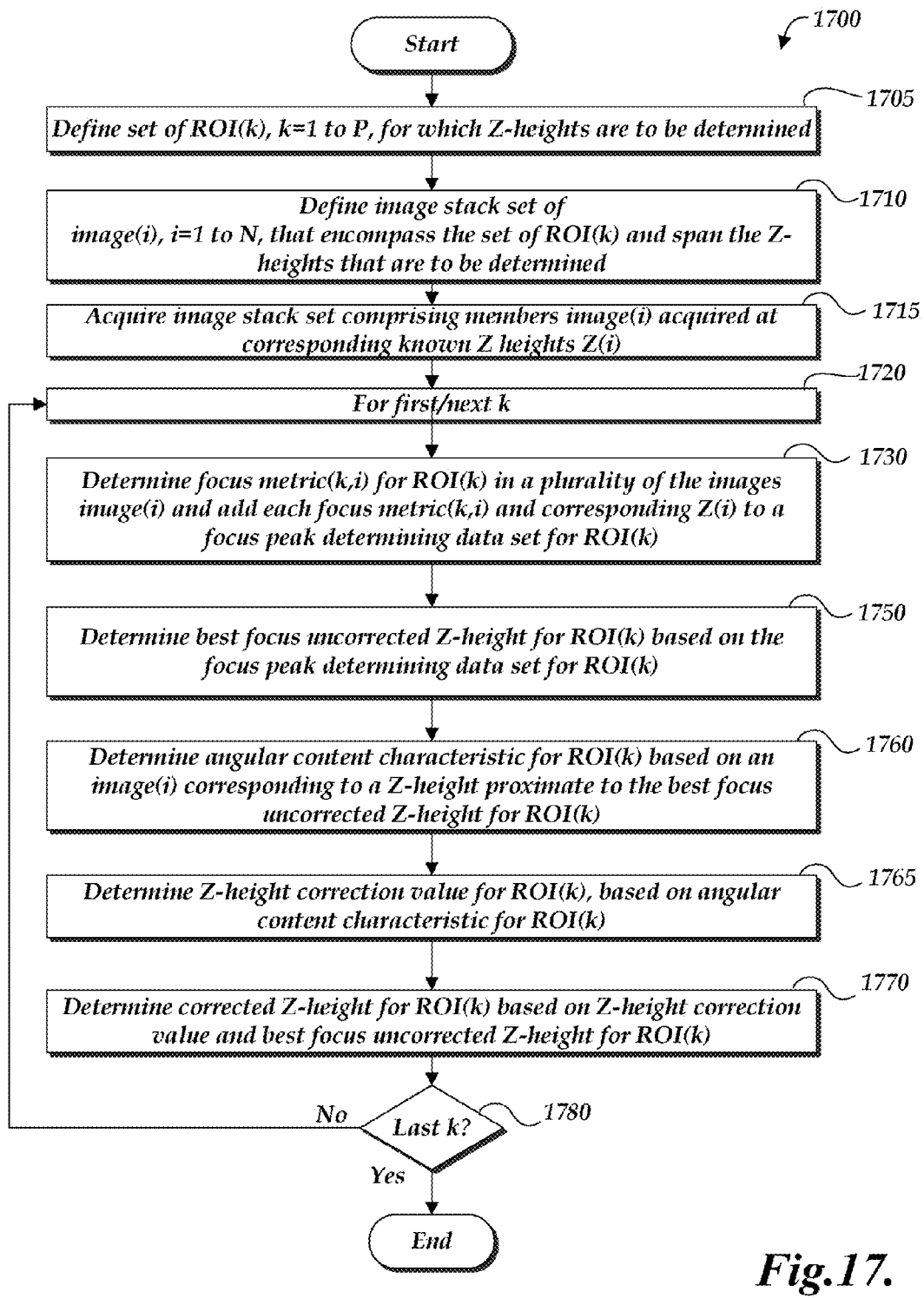
FIG. 17 is a flow diagram illustrative of one generic exemplary routine for defining a set of regions of interest to be measured and producing corrected Z-height measurements in accordance with the present application.

FIG. 17 is a flow diagram illustrative of one generic exemplary routine 1700 for defining a set of regions of interest ROI(k) to be measured and producing corrected Z height measurements in accordance with the present application. At a block 1705, a region of interest (ROI) set is defined or selected comprising regions of interest ROI(k), for k=1 to P, for which Z-heights are to be determined. It will be appreciated that as described above the regions of interest ROI(k) may comprise primary regions of interest (e.g., in the case of the multi-region autofocus tool 143fb1) or may comprise secondary or sub-regions of interest (e.g., in the case of the multi-point autofocus tool 143fb2.) At a block 1710, an image stack set of images is defined, comprising images(i), for i=1 to N. The field of view of the image stack set may encompass the set of regions of interest ROI(k), and the Z range of the image stack set generally spans the Z heights that are expected for the set of regions of interest ROI(k). At a block 1715, an image stack set is acquired, comprising members image(i) acquired at corresponding known Z heights Z(i). A Z height Z(i) is the Z-height indicated by the machine vision inspection system at the time of acquisition of image(i), and corresponds to the focused object plane location of image(i), regardless of whether or not a workpiece surface is actually located at that focused object plane.

In some embodiments, it may be advantageous if the operations of other blocks are executed partially in parallel with block 1715, that is, image analysis operations may begin at any convenient time after one or more regions or subregions of one or more initial images have been acquired. At a block 1720, a processing loop begins for processing operations related to the first/next regions of interest ROI(k), for k=1 to P.

At a block 1730, a focus metric (k,i) is determined for the current regions of interest ROI(k) for a plurality (e.g., most or all) of the images in the image stack set, and each such focus metric (k,i) and corresponding Z(i) is added to a focus peak determining data set (e.g., a focus curve data set). As outlined previously, in one embodiment the focus metric may comprise one or more quantitative focus metric for the region of interest ROI(k) in the image(i), for example an image sharpness or contrast metric.

At a block 1750, a best focus uncorrected Z-height is determined for the current region of interest ROI(k) (that is, for a surface or surface portion in the current region of interest ROI(k)) based on the focus peak determining data set established at block 1730. For example, the uncorrected Z-height may correspond to the peak of a curve fit to the focus peak determining data set. At a block 1760, an angular content characteristic is determined for the region of interest ROI(k) for an image(i) corresponding to a Z-height proximate to the best focus uncorrected Z-height for the region of interest ROI(k) (e.g., sufficiently proximate to the best focus uncorrected Z-height such that it is a sufficiently focused image, as outlined previously). Various specific embodiments of operations usable to identify an image(i) corresponding to a Z-height proximate to the best focus uncorrected Z-height for the region of interest ROI(k) are described below with respect to FIGS. 18A-18C. As described above, in one embodiment the angular content characteristic may be determined based on a gradient (edge) angle histogram. At a block 1765, a Z-height correction value is determined for the region of interest ROI(k), based on the angular content characteristic determined for the region of interest ROI(k) at block 1760. As described above, the determination of the Z-height correction value in certain embodiments may involve weighting stored direction dependent calibration data based on the angular content characteristic. At a block 1770, a corrected Z-height is determined for the region of interest ROI(k) (that is, for a surface or surface portion in the current region of interest ROI(k)) based on the Z-height correction value established at block 1765 and the best focus uncorrected Z-height for the region of interest ROI(k) established at block 1750. At a block 1780, a determination is made as to the current regions of interest ROI(k) is the last ROI(k) to be processed. If there are additional regions of interest ROI(k) to be processed, then the routine returns the beginning of the region of interest ROI(k) processing loop at block 1720, otherwise the routine ends. It will be appreciated that the embodiment shown in FIG. 17 is exemplary only, and not limiting. For example, it will be appreciated that in various other embodiments it is possible to perform various operations associated with the blocks 1730-1765 in an order other than that illustrated. In any case, it will be appreciated that the routine 1700 (as well as the routines 1700'-1700''', described below) may provide an angular content characteristic and resulting Z-height correction based on a sufficiently-focused near-peak image (that is, an image near a peak focus height) from the image stack, rather that requiring one or more additional images to be acquired at a best focus height. Accordingly, such routines and/or the included operations may significantly reduce operation time related to motion and image acquisition in various embodiments according to this application. Memory requirements for image storage may also be reduced.

Figure 18A:
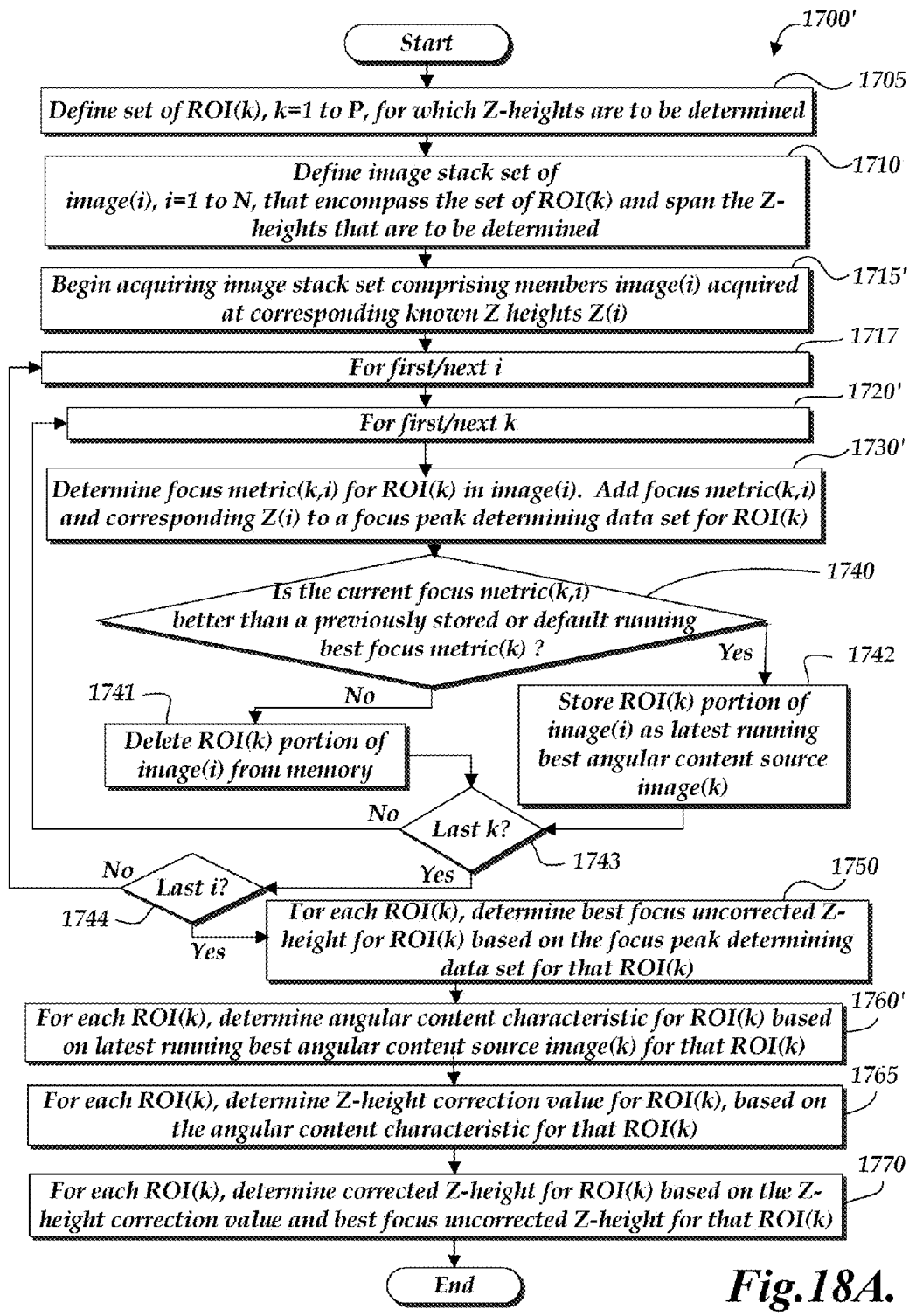
FIGS. 18A-18C are flow diagrams illustrative of specific embodiments of exemplary routines analogous to the routine of FIG. 17.
Figure 18B:
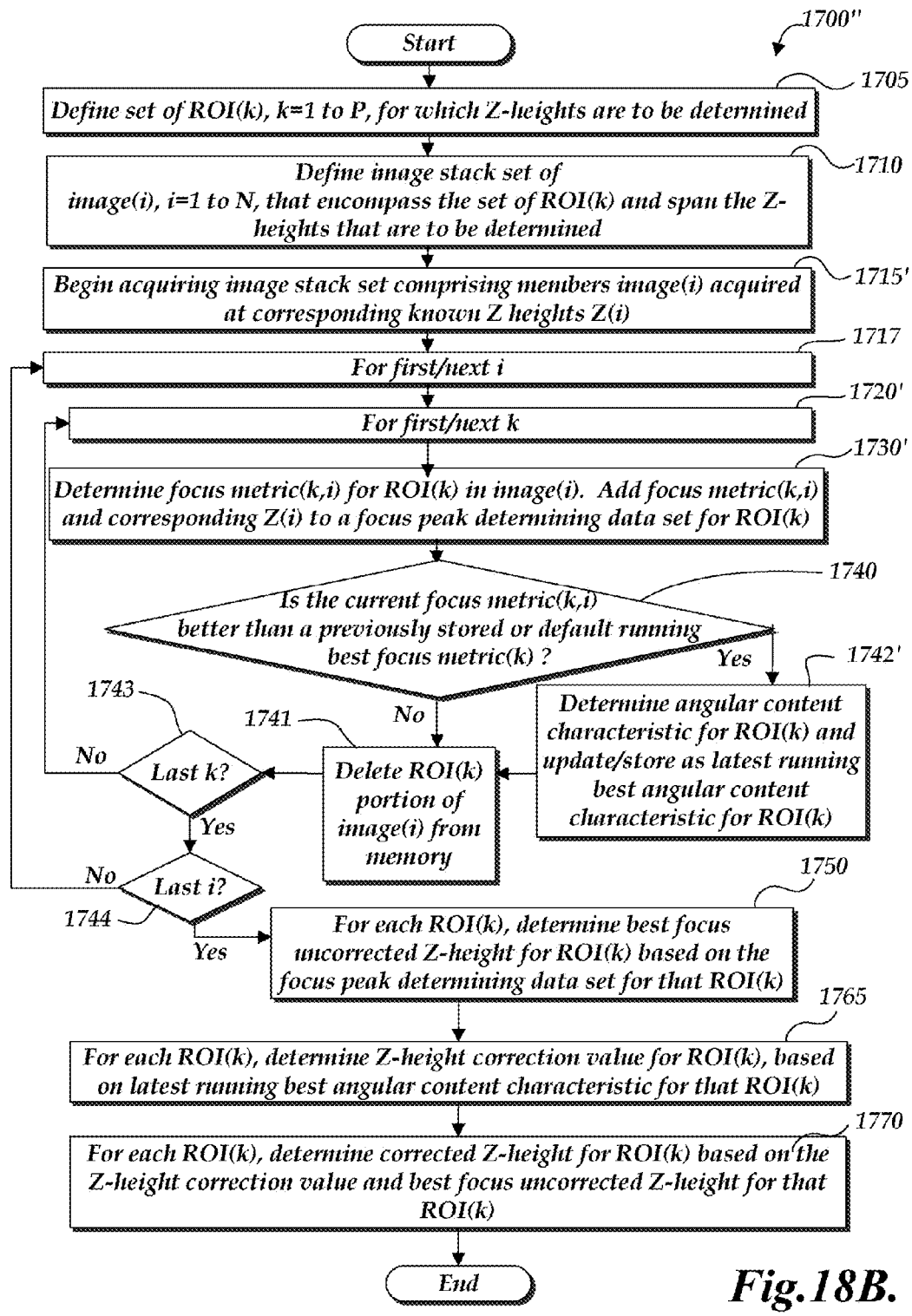
Figure 18C:
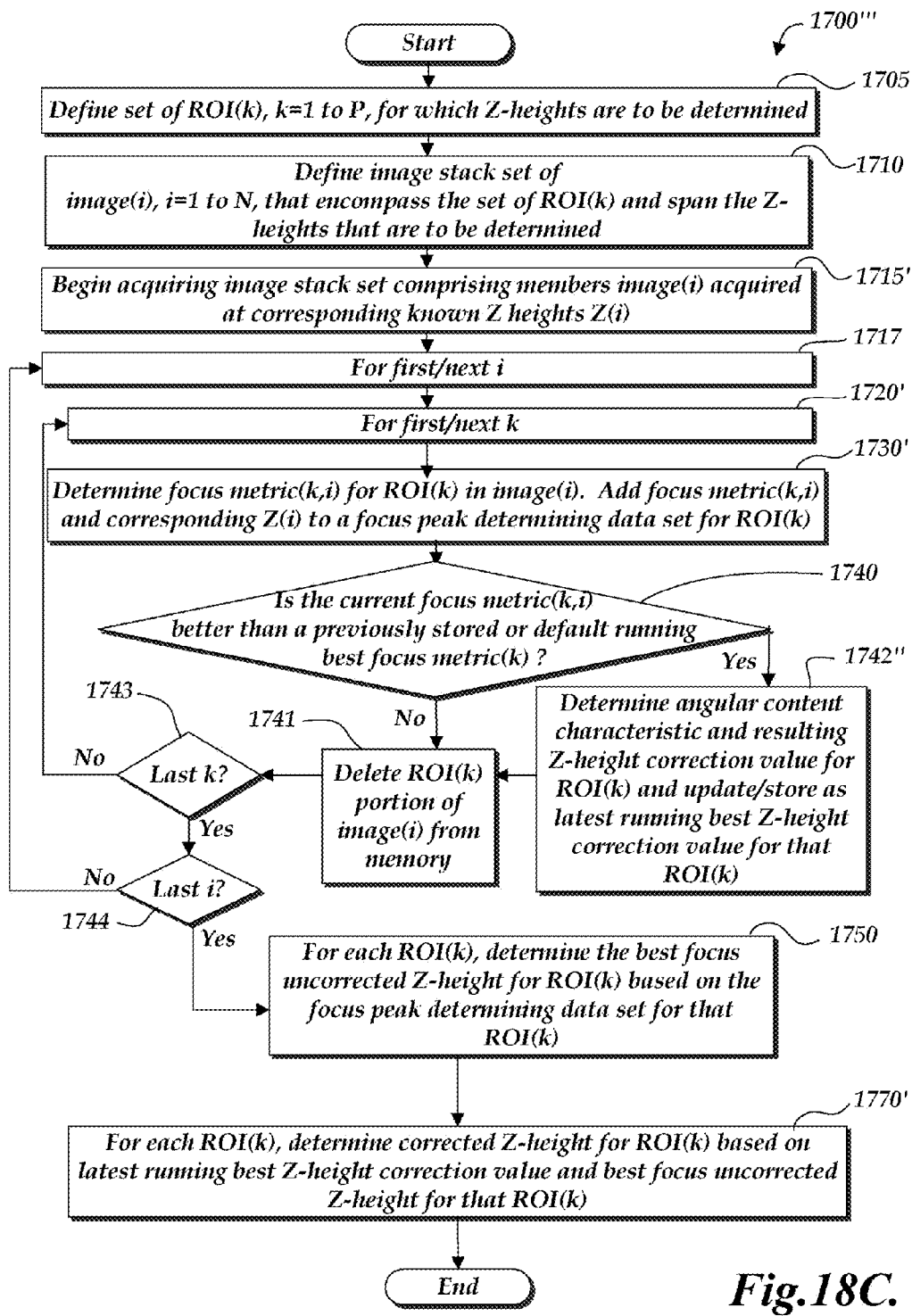

FIGS. 18A-18C are flow diagrams illustrative of specific embodiments of exemplary routines which analogous to, or instances of, the routine of FIG. 17. It will be appreciated that certain blocks and operations of FIGS. 18A-18C are similar or analogous to certain blocks and operations of FIG. 17, and/or analogous to one another. Similar or analogous blocks or operations are identically or similarly numbered in FIG. 17 and FIGS. 18A-18C (e.g., 1760' is similar to 1760). In such cases, some such blocks need not be specifically described below, and may be understood by analogy, except as otherwise indicated.

FIG. 18A is a flow diagram illustrative of a specific embodiment of an exemplary routine 1700' for defining a set of regions of interest ROI(k) to be measured and producing corrected Z-height measurements in accordance with the present application. The routine 1700' explicitly includes conditional operations that efficiently process and store near-peak data, as described in greater detail below. The routine 1700' starts, and blocks 1705 and 1710 may be similar or identical to those previously described with reference to FIG. 17. At a block 1715', operations are begun in order to acquire an image stack set comprising members image(i) acquired at corresponding known Z heights Z(i). At a block 1717, a processing loop for image analysis operations on the first/next image(i) may begin at any convenient time after a one or more regions or subregions of the first/next image(i) have been acquired. Thus, in the routine 1700', various operations (e.g., operations within the loop operation 1720'-1743) are executed in parallel with acquiring the image stack set, in order to conserve operation time and/or memory. At a block 1720', a processing loop begins for processing operations related to the first/next regions of interest ROI(k), for k=1 to P in the current image(i).

At a block 1730', a focus metric (k,i) is determined for the current regions of interest ROI(k) in the current image(i), and each such focus metric (k,i) and corresponding Z(i) is added to a focus peak determining data set (e.g., a focus curve data set). At a decision block 1740, a determination is made as to whether the current focus metric(k,i) is better than a previously stored or default running best focus metric(k). The default running best focus metric may in some embodiments be a threshold value for the focus metric that is indicative of an image that is sufficiently focused to be used for determining angular content characteristics for Z height correction. In some embodiments, the default level may be determined or established for a particular region or sub-region of interest of a particular workpiece type, during learn mode operations, and stored in a related part program or the like. If it is determined at decision block 1740 that the current focus metric(k, i) is not better than the previously stored or default running best focus metric(k), then the routine continues to a block 1741, where the current region of interest ROI(k) portion of the current image(i) is deleted from memory. It will be appreciated that if the current focus metric(k,i) is not better than a previously stored or default running best focus metric(k), then it does not qualify as "near-peak" data that is usable for Z-height correction. Accordingly, it need not be further analyzed, and it may be suppressed or deleted. If it is determined at decision block 1740 that the current focus metric(k,i) is better than a previously stored or default running best focus metric(k), then the routine continues to a block 1742, where the region of interest ROI(k) portion of the current image(i) is stored as the new running best angular content source image (k). The final running best angular content source image(k) (e.g., after exiting the process loop ending at block 1744) may be used at block 1760', as described below. From either block 1742 or 1741, operation may continue at a decision block 1743 where a determination is made whether there are any more regions of interest ROI(k) to be processed for the current image(i). If so, operation returns to block 1720', otherwise operation continues to decision block 1744. At decision block 1744, a determination is made whether there is another image (i) to be processed. If so, operation returns to block 1730', otherwise operation continues to block 1750.

At block 1750, for each ROI(k) (e.g., for k=1 to P), the best focus uncorrected Z-height is determined for that ROI(k) based on the focus peak determining data set established at block 1730' for that ROI(k). Operation then continues to a block 1760' where, for each ROI(k), an angular content characteristic is determined for that ROI(k) based on the latest running best angular content source image(k) established at block 1742 for that ROI(k). Operation then continues to block 1765 where, for each ROI(k), an Z height correction value is determined for that ROI(k) based on the angular content characteristic established at block 1760' for that ROI(k). Operation then continues the block 1770 where, for each ROI(k), a corrected Z-height is determined for that region of interest ROI(k) based on the Z-height correction value established at block 1765 and the best focus uncorrected Z-height established at block 1750, for that region of interest ROI(k). Once the corrected Z-height is determined for each desired ROI(k) at block 1770, the routine ends.

It may be appreciated that in some embodiments the operations outlined above with reference to blocks 1740-1742 may be included in or comprise portions of a near-peak operations control element (e.g., the near-peak operations control element 143*fd*, outlined previously.) In some embodiments, operations related to blocks 1760, 1760' and/or 1765 may also be included in or comprise portions of a near-peak operations control element. The primary differences between the embodiments of FIGS. 18A-18C are generally included in these blocks, as described below.

FIG. 18B is a flow diagram illustrative of a specific embodiment of an exemplary routine 1700" for defining a set of regions of interest ROI(k) to be measured and producing corrected Z-height measurements in accordance with the present application. Similar to the routine 1700', the routine 1700" explicitly includes conditional operations that efficiently process and store near-peak data, as described in greater detail below. The routine 1700" starts, and blocks 1705-1741 may be similar or identical to those previously described with reference to FIG. 18A. If it is determined at the decision block 1740 that the current focus metric(k,i) is not better than the previously stored or default running best focus metric(k), then the routine continues to a block 1741, described below. If it is determined at decision block 1740 that the current focus metric(k,i) is better than a previously stored or default running best focus metric(k), then the routine continues to a block 1742', where an angular content characteristic is determined for that ROI(k) based on the region of interest ROI(k) portion of the current image(i). At block 1742', that determined angular content characteristic is also stored as the new running best angular content characteristic for that ROI(k). The final running best angular content characteristic for that ROI(k) (e.g., after exiting the process loop ending at block 1744) may be used at block 1765, as described below. From block 1742', operation proceeds to block 1741. At the block 1741, whether arrived at from block 1740 or from block 1742', the current region of interest ROI (k) portion of the current image(i) may be deleted. Arrival at block 1741 from block 1740 indicates that the current focus metric(k,i) is not better than a previously stored or default running best focus metric(k), such that the current region of interest ROI(k) portion of the current image(i) does not qualify as "near-peak" data that may be used for Z-height correction, and may therefore be deleted to conserve memory. Arrival at block 1741 from block 1742' indicates that the relevant angular content characteristic required for Z height correction has already been determined and stored for the current region of interest ROI(k) of the current image(i). Therefore, image data from ROI(k) is no longer needed for the current image(i), and may be deleted to conserve memory.

From block 1741, operation continues at a decision block 1743. Blocks 1743-1750 may be similar or identical to those previously described with reference to FIG. 18A. From block 1750, operation may continue at block 1765 where, for each ROI(k), a Z height correction value is determined for that ROI(k) based on the latest running best angular content characteristic established at block 1742' for that ROI(k). Operation then continues at the block 1770 which may be similar or identical to that previously described with reference to FIG. 18A, after which the routine ends.

FIG. 18C is a flow diagram illustrative of a specific embodiment of an exemplary routine 1700''' for defining a set of regions of interest ROI(k) to be measured and producing corrected Z-height measurements in accordance with the present application. Similar to the routine 1700", the routine 1700''' explicitly includes conditional operations that efficiently process and store near-peak data, as described in greater detail below. The routine 1700''' starts, and blocks 1705-1741 may be similar or identical to those previously described with reference to FIG. 18B. If it is determined at the decision block 1740 that the current focus metric(k,i) is not better than the previously stored or default running best focus metric(k), then the routine continues to a block 1741, described below. If it is determined at decision block 1740 that the current focus metric(k,i) is better than a previously stored or default running best focus metric(k), then the routine continues to a block 1742", where a Z height correction value is determined based on determining the angular content characteristic in the image portion corresponding to the focus metric(k,i). At block 1742", that determined Z height correction value is also stored as the new running best Z height correction value for that ROI(k) in the current image(i). The final Z height correction value for that ROI(k) (e.g., after exiting the process loop ending at block 1744) may be used at block 1770', as described below. From block 1742", operation proceeds to block 1741. At the block 1741, whether arrived at from block 1740 or from block 1742", the current region of interest ROI(k) portion of the current image(i) may be deleted. Arrival at block 1741 from block 1740 indicates that the current focus metric(k,i) is not better than a previously stored or default running best focus metric(k), such that the current region of interest ROI(k) portion of the current image (i) does not qualify as "near-peak" data that may be used for Z-height correction, and may therefore be deleted. Arrival at block 1741 from block 1742" indicates that the required Z height correction has already been determined and stored for the current region of interest ROI(k) of the current image(i). Therefore, image data from ROI(k) is no longer needed for the current image(i), and may be deleted to conserve memory.

From 1741, operation continues at a decision block 1743. Blocks 1743-1750 may be similar or identical to those previously described with reference to FIG. 18A or 18B. From block 1750, operation may continue at block 1770' where, for each ROI(k), a corrected Z-height is determined for that region of interest ROI(k) based on the Z-height correction value established at block 1742" and the best focus uncorrected Z-height established at block 1750, for that region of interest ROI(k). Once the corrected Z-height is determined for each desired ROI(k) at block 1770', the routine ends.

It will be appreciated that in comparison to the routine 1700' of FIG. 18A, the routines 1700" and 1700''' of FIGS. 18B and 18C, respectively, may reduce the amount of memory required for image data, allowing efficient processing for determining corrected Z heights for large numbers of regions or subregions of interest. In some embodiments, image data may be analyzed and deleted so rapidly (e.g., at blocks 1740, 1742', 1742" and 1741) that memory requirements for image data may be limited to that corresponding to a few images or even less (e.g., approximately a single image), even though a much larger stack of images may be acquired and analyzed.

While certain embodiments of the invention have been illustrated and described, numerous variations in the illustrated and described arrangements of features and sequences of operations will be apparent to one skilled in the art based on this disclosure. Various aspects of the invention may be used separately, or in combinations and sequences other than those explicitly disclosed. Thus, it will be appreciated that various changes can be made therein without departing from the spirit and scope of the invention.

The embodiments of the invention in which an exclusive property or privilege is claimed are defined as follows:

1. A method for providing Z-height error calibration data usable to correct Z-height measurements determined by a machine vision inspection system, the method comprising:
   (a) positioning a focus region of interest used for calibration at a calibration location in a field of view of the machine vision inspection system;
   (b) providing anisotropic image content used for calibration;
   (c) positioning the anisotropic image content in the focus region of interest used for calibration;

(d) providing a variation in an orientation angle of the anisotropic image content in the focus region of interest used for calibration;

(e) determining Z-height measurement results based on the focus region of interest used for calibration, the Z-height measurement results including a variation in relation to the variation in the orientation angle of the anisotropic image content in the focus region of interest used for calibration;

(f) determining Z-height error calibration data corresponding to the corresponding calibration location in a field of view, the Z-height error calibration data including a characterization of the variation in Z-height measurement results, in relation to a variation in the orientation angle of the anisotropic image content in the focus region of interest used for calibration; and (g) storing the Z-height error calibration data corresponding to the corresponding calibration location in a field of view in a storage medium accessible by the machine vision inspection system.

2. The method of claim 1, wherein the characterization of the variation in Z-height measurement results characterizes at least one of (a) an astigmatism error component, (b) an astigmatism error component and a static optical error component, and (c) an anisotropic error, included in the Z-height measurement results.

3. The method of claim 1, wherein providing a variation in an orientation angle of the anisotropic image content in the focus region of interest comprises providing a set of orientation angles, separated by evenly spaced steps, over a range from zero degrees up to at least 180 degrees minus one step.

4. The method of claim 3, wherein step (b) comprises providing a calibration target, the calibration target comprising a set of respective anisotropic target elements that provide the anisotropic image content at respective orientation angles, the respective orientation angles including the set of orientation angles separated by evenly spaced steps, over a range from zero degrees up to at least 180 degrees minus one step.

5. The method of claim 4, wherein:
step (d) comprises positioning each of the respective anisotropic target elements corresponding to the set of orientation angles separated by evenly spaced steps over a range from zero degrees up to at least 180 degrees minus one step, such that its anisotropic image content appears in the focus region of interest used for calibration, at its respective orientation angle; and
step (e) comprises determining a Z-height measurement result for each of the positioned respective anisotropic target elements corresponding to the set of orientation angles separated by evenly spaced steps over a range from zero degrees up to at least 180 degrees minus one step.

6. The method of claim 5, wherein determining a Z-height measurement result comprises performing an autofocus operation based on the focus region of interest used for calibration.

7. The method of claim 5, further comprising:
determining a true Z-height for each of the positioned respective anisotropic target elements; and
determining an anisotropic error corresponding to each of the positioned respective anisotropic target elements, based on the Z-height measurement result and the true Z-height determined for each of the positioned respective anisotropic target elements,
wherein step (f) comprises determining Z-height error calibration data that includes a characterization of the anisotropic error, in relation to the set of orientation angles separated by evenly spaced steps over a range from zero degrees up to at least 180 degrees minus one step.

8. The method of claim 7, wherein:
the calibration target further comprises a set of respective isotropic target elements that provide isotropic image content; and
the method further comprises:
positioning each member of the set of respective isotropic target elements such that its isotropic image content appears in the focus region of interest used for calibration; and
determining a set of isotropic Z-height measurements corresponding to the positioned members of the set of respective isotropic target elements, and
using the set of isotropic Z-height measurements in determining the true Z-height for each of the positioned respective anisotropic target elements.

9. The method of claim 1, wherein in step (f) determining Z-height error calibration data comprises:
determining a set of respective anisotropic errors that correspond to a set of respective orientation angles used while determining the Z-height measurement results of step (e); and
determining anisotropic error calibration data that includes a representation of the respective anisotropic errors in relation to the respective orientation angles.

10. The method of claim 9, wherein:
steps (a) through (g) are repeated at a plurality of different calibration locations in the field of view;
an average value of the respective anisotropic errors from all the calibration locations is subtracted from each of the respective anisotropic errors from all the calibration locations to provide respective resulting values; and
in the anisotropic error calibration data, the respective resulting values are used in the representation of the respective anisotropic errors in relation to the respective orientation angles.

11. The method of claim 1, wherein steps (a) through (g) are repeated at a plurality of different calibration locations in the field of view.

12. The method of claim 11, wherein steps (a) through (g) are repeated for a plurality of different optical configurations of the machine vision inspection system.

13. The method of claim 1, wherein providing the anisotropic image content used for calibration comprises providing a calibration target that includes:
a flat substrate; and
a set of respective anisotropic target elements arranged on the flat substrate, each respective anisotropic target element comprising a similar anisotropic feature,
wherein the similar anisotropic feature is arranged at different respective orientation angles in different respective anisotropic target elements.

14. The method of claim 13, wherein the different respective orientation angles include a set of orientation angles separated by evenly spaced steps, over a range from zero degrees up to at least 180 degrees minus one step.

15. The method of claim 13, wherein each of the anisotropic target elements is designed to be slightly larger than the field of view of an optical configuration intended to be calibrated by the anisotropic target element.

16. The method of claim 13, wherein the similar anisotropic feature comprises one of (a) a pattern of parallel lines, (b) a texture pattern, (c) a striated texture pattern, and (d) a single border between a lighter region and a darker region.

17. The method of claim 13, further comprising providing the calibration target with a set of respective isotropic target elements that include a pattern of alternating concentric lighter circles and darker circles.

18. The method of claim 13, further comprising providing the calibration target with a set of respective isotropic target elements that are interspersed with the set of respective anisotropic target elements.

19. The method of claim 18, wherein the set of respective isotropic target elements and the set of respective anisotropic target elements form a first group of elements, the method further comprising providing the calibration target with a second group of elements similar to the first group of elements but wherein all dimensions are scaled by a factor of less than 1.0, relative to the first group of elements.

20. The method of claim 13, wherein the set of respective anisotropic target elements form a first group of elements, the method further comprising providing the calibration target with a second group of elements similar to the first group of elements but wherein all dimensions are scaled by a factor of 0.5 or less, relative to the first group of elements.

* * * * *